(12) United States Patent
Nakajima et al.

(10) Patent No.: US 7,411,712 B2
(45) Date of Patent: Aug. 12, 2008

(54) OPTICAL SCANNER AND IMAGE FORMATION APPARATUS

(75) Inventors: Tomohiro Nakajima, Tokyo (JP); Tomoya Ohsugi, Tokyo (JP); Naoki Miyatake, Kanagawa (JP); Kohji Sakai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/803,991

(22) Filed: Mar. 19, 2004

(65) Prior Publication Data

US 2004/0184127 A1 Sep. 23, 2004

(30) Foreign Application Priority Data

| Mar. 19, 2003 | (JP) | ............................. 2003-076147 |
| Mar. 19, 2003 | (JP) | ............................. 2003-076161 |
| Mar. 20, 2003 | (JP) | ............................. 2003-077728 |

(51) Int. Cl.
*G02B 26/08* (2006.01)

(52) U.S. Cl. ..................................... 359/204

(58) Field of Classification Search .................. 359/204
See application file for complete search history.

(56) References Cited

U.S. PATENT DOCUMENTS

| 5,734,488 | A | 3/1998 | Konno |
| 5,801,746 | A * | 9/1998 | Yamaguchi et al. ......... 347/259 |
| 6,049,408 | A | 4/2000 | Tada |
| 6,088,146 | A * | 7/2000 | Takeshita et al. ............ 359/204 |
| 6,509,995 | B1 | 1/2003 | Suzuki et al. |
| 6,606,179 | B2 | 8/2003 | Suzuki et al. |
| 6,621,512 | B2 | 9/2003 | Nakajima et al. |
| 6,657,765 | B2 | 12/2003 | Hayashi et al. |
| 6,686,946 | B2 | 2/2004 | Masuda et al. |
| 2001/0035943 | A1 * | 11/2001 | Kato ........................... 355/52 |
| 2002/0080428 | A1 | 6/2002 | Suzuki et al. |
| 2002/0145788 | A1 * | 10/2002 | Ohno et al. .................. 359/204 |
| 2002/0171878 | A1 | 11/2002 | Nakajima |
| 2002/0195552 | A1 | 12/2002 | Ueda |
| 2004/0184127 | A1 | 9/2004 | Nakajima et al. |
| 2007/0030538 | A1 | 2/2007 | Hirakawa et al. |

FOREIGN PATENT DOCUMENTS

JP   64-52116   2/1989

(Continued)

OTHER PUBLICATIONS

U.S. Appl. No. 11/740,070, filed Apr. 25, 2007 Sakai et al.

*Primary Examiner*—Euncha P Cherry
(74) *Attorney, Agent, or Firm*—Oblon, Spivak, McClelland, Maier & Neustadt, P.C.

(57) ABSTRACT

An optical scanner has light source units spaced from each other along a first direction and having optical axes parallel to each other. Positions from which the light beams are emitted are spaced from each other by a predetermined distance at least along a predetermined direction. The optical scanner also includes a deflection unit that deflects the light beams together and scans the light beams along a second direction perpendicular to the first direction. The optical scanner also has imaging units that form an image with each of the light beams on a surface and a housing unit that holds the light source units, the deflection units, and the imaging units.

24 Claims, 27 Drawing Sheets

FOREIGN PATENT DOCUMENTS

| | | |
|---|---|---|
| JP | 2-250020 | 10/1990 |
| JP | 04-301613 | 10/1992 |
| JP | 7-43627 | 2/1995 |
| JP | 07-043627 | 2/1995 |
| JP | 8-327922 | 12/1996 |
| JP | 9-179047 | 7/1997 |
| JP | 9-197232 | 7/1997 |
| JP | 10-177145 | 6/1998 |
| JP | 11-64758 | 3/1999 |
| JP | 3049606 | 6/2000 |
| JP | 2000-187175 | 7/2000 |
| JP | 3078830 | 8/2000 |
| JP | 2000-330049 | 11/2000 |
| JP | 2001-296492 | 10/2001 |
| JP | 3222052 | 10/2001 |
| JP | 2002-148551 | 5/2002 |
| JP | 2002-287060 | 10/2002 |

* cited by examiner

MAIN SCANNING

MAIN SCANNING

FIG.28A
FIG.28B
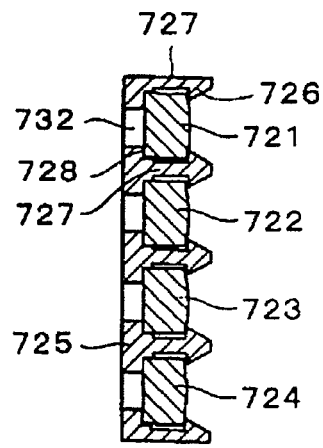
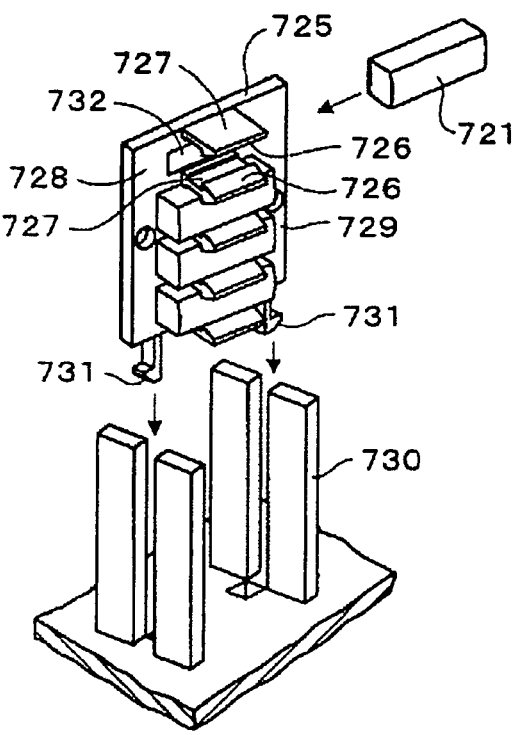
FIG.29A
FIG.29B
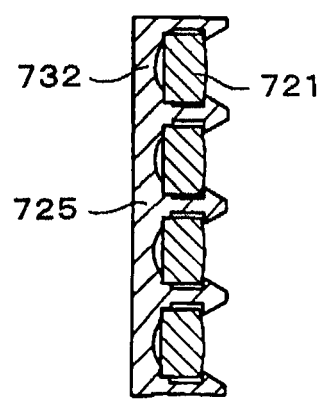
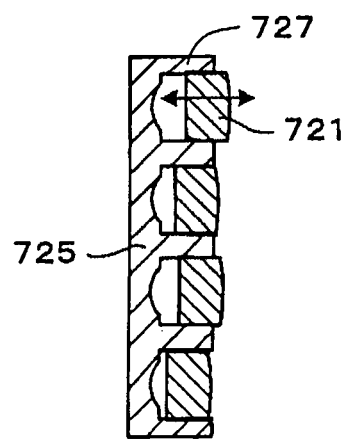

OPTICAL SCANNER AND IMAGE FORMATION APPARATUS

CROSS-REFERENCE TO RELATED APPLICATIONS

The present document incorporates by reference the entire contents of Japanese priority documents, 2003-076147 filed in Japan on Mar. 19, 2003, 2003-076161 filed in Japan on Mar. 19, 2003 and 2003-077728 filed in Japan on Mar. 20, 2003.

BACKGROUND OF THE INVENTION

1) Field of the Invention

The present invention relates to an optical scanner used in an optical writing system, such as digital copying machines and laser printers. The present invention further relates to an image formation apparatus using the optical scanner. More particularly, the present invention relates to an optical scanner suitable for a multi-color image formation apparatus for forming a color image by superposing toner images of a plurality of colors, and an image formation apparatus using the optical scanner.

2) Description of the Related Art

In image formation apparatuses using the Carlson process, formation of latent images, development of the latent images, and transfer of the developed latent images are carried out with rotation of photosensitive drums. For example, multi-color image formation apparatuses include a plurality of photosensitive drums arranged along a transport direction of sheet media onto which images are transferred, and image forming stations for respective colors forming toner images which are to be superposed onto each other. In these image formation apparatuses, differences in time from which the latent image is formed to which the latent image is transferred caused by eccentricity of the photosensitive drums and variation in the diameters of the photosensitive drums, differences in distances between the photosensitive drums, and variation in speed or meandering of transfer members such as transfer belts or conveyor belt which carries the sheet media are generated. As a result, toner images become out of registration and thus colors of the images formed become out of registration or color change is caused. Therefore, image quality is degraded.

Likewise, in optical scanners, which forms latent images on photosensitive drums, if positions at which latent images are formed on the photosensitive drums do not precisely match each other, colors of the images formed become out of registration or color change is caused when the differently colored images are superimposed.

These deviations have been corrected by regularly, for example job by job, detecting positions in a sub scanning direction of detection patterns recorded on transfer members, and adjusting timings at which writing is started, without considering whether the deviations are related to the optical scanners or means other than the optical scanner (see the Japanese Patent Publication No. 3049606, and the Japanese Patent Publication No. 3078830).

Heat generated by the polygon motor or the like causes temperature differences between scanning lenses for different colors in between the corrections, and thus the refracting power changes. Consequently, colors of the images generated become out of color registration due to the deviations in the sub scanning positions and to differences in magnification in the horizontal scanning direction.

Examples in which displacement of scan lines caused by a machining error or thermal deformation of the scanning lens, a deviation in the height of beams incident on the scanning lens, or so-called decentering is corrected have been disclosed. One of the examples in which the displacement is corrected by shifting the scanning lens having a power in the sub scanning direction along the main scanning direction is disclosed in the Japanese Patent Application Laid-open No. 2002-148551. Further, another example in which the optical axis of the scanning lens is shifted with respect to the light beams to correct the displacement is disclosed in the Japanese Patent Application Laid-open No. H11-64758). Moreover, an example of a method of correcting the displacement using means such as inclining the scanning lens on a plane orthogonal to the scanned plane is disclosed in the Japanese Patent Application Laid-open No. S64-52116. In these examples, the degrees of the displacement among jobs are detected, and corrected depending on the degrees detected.

The deviations are now typically seen as more and more scanning lenses are being made of plastic. To prevent the deviations, the imaging unit formed of a scanning lens, which is common to the respective color beams and does not have a converging power in the sub scanning direction, and scanning lenses for the respective color beams, is disclosed for example in the Japanese Patent Application Laid-open Nos. H2-250020 and H7-43627. According to the imaging unit, even if the refracting power changes, the change is commonly shared by the respective color beams. As a result, the colors of the images formed become less out of registration. Since a plurality of light beams corresponding to the respective colors are scanned together by the same surface of the polygon mirror, optical means for gathering the light beams from the light source units and direct the light beams to be incident on the polygon mirror is preferably required as disclosed in the Japanese Patent Application Laid-open Nos. 2001-296492 and H9-179047.

For the arrangement of an optical system before the deflector in the tandem-type image formation apparatus, there is a method of decreasing width occupied by all the light beams in the sub scanning direction by defining the distances between the light beams lined in the sub scanning direction. For example, light beams from a plurality of light sources are superposed on each other in the main scanning direction by a turning mirror such that the light beams can be regarded substantially as a single light beam, and guided to an optical deflector. The turning mirror is placed at a distance in the direction of optical axis between an optical element that condenses the respective the bundle of rays to be substantially linearly long in the main scanning direction on the reflecting surface of the optical deflector, and the optical deflector. Accordingly, by changing the sizes of the reflecting surfaces of the respective mirrors in accordance with the diameters of the bundles of rays in the sub scanning direction on the respective mirrors, and making the distances between the adjacent light beams different, the width occupied by all the light beams in the sub scanning direction is decreased as disclosed in for example the Japanese Patent Publication No. 32222052.

In the multi-color image formation apparatuses in which a plurality of image forming stations are arranged along the transfer direction of the transfer member to superpose colors, if the positions of the latent images transferred by the respective stations do not accurately match each other, colors of the image formed may become out of registration or color change may be caused.

In the optical scanners, however, even if the deviation in the scanning position between the respective stations, which causes the colors to be out of registration, is adjusted before each job, if the number of sheets to be printed in one job increases, since the incident position on the scanning lens varies due to the deformation of the housing resulting from the temperature change, the variation caused until the next correction cannot be prevented, Naturally, printing can be suspended to perform the correction in the middle of a job, but it takes time to correct the curving of the scan lines, in addition to the write start positions in the main scanning direction and the sub scanning direction of the scan lines. Further, it is necessary to record the detection patterns for detecting the deviations on the transfer member to detect the result of the correction. In the meantime, the apparatus cannot be used for the recording, waiting time for printing increases, and thus the efficiency of operation is decreased. Further, if the number of corrections increases, wasteful consumption of the toner increases. Therefore frequent corrections should be avoided.

The scanning position is preferably maintained stable despite of any environmental changes. Some of the above examples in which the common scanning lens is used for the respective color beams are directed to achieve this object. However, according to these examples, the thickness of the polygon mirror for deflecting the beams together is thick. Consequently, the edges of the polygon mirror generate a greater windage that increases the load and the power consumption. Therefore, it is desired to make the polygon mirror thin, and thus it is required to decrease the distances between the respective color beams. It is also necessary to place the optical system including to the light source units and the deflection unit together with respect to the deflection position of the single polygon mirror. However, to avoid interferences between these units, it is required to locate the units away from the polygon mirror. Accordingly, the size of the optical scanner cannot be downsized. It is therefore an object in the art to arrange the light source units such that space is spaced as much as possible.

For decreasing the distances between the respective light beams, the reflective mirror surface of the optical deflector may be decreased according to the above example disclosed by the Japanese Patent Publication No. 32222052. Another example with separating optical means is also disclosed in the Japanese Patent Application Laid-open No. 2000-330049, which includes light source means having a plurality of light emission sources and guides the light beams that have been deflected to the corresponding surfaces to be scanned. However, to separate the deflected light beams so as to be guided to the different surfaces, it is necessary to provide a refracting power in the sub scanning direction of the scanning lens shared by all the light beams, to increase the differences between the adjacent light beams in the sub scanning direction. When the scanning lens shared by all the light beams has the refracting power in the sub scanning direction, the shape of the main scanning cross section changes along the sub scanning direction, and when the incident bundles of rays are displaced in the sub scanning direction, uniformity of the velocities is decreased. The imaging performance in the main scanning direction also deteriorated. Further, when a temperature distribution occurs in the lens due to the generation of heat in the optical deflector, and the shape of the lens changes due to a uniform temperature change, "out of color registration" occurs due to the decrease in the uniformity of the velocities among the respective light beams.

SUMMARY OF THE INVENTION

It is an object of the present invention to solve at least the problems in the conventional technology.

An optical scanner according to an aspect of the present invention includes a plurality of light source units spaced from each other along a first direction, each having an optical axis along which a light beam from the light source unit is emitted, the optical axes being parallel to each other, and a position from which the light beam is emitted, the positions being spaced from each other by a predetermined distance at least along a predetermined direction; a deflection unit that deflects the light beams together and scans the light beams along a second direction perpendicular to the first direction; a plurality of imaging units that form an image with each of the light beams on a corresponding surface to be scanned; and a housing unit that holds the light source units, the deflection units, and the imaging units.

An optical scanner according to another aspect of the present invention includes a plurality of light source units spaced from each other along a first direction, each having an optical axis along which a light beam from the light source unit is emitted; a deflection unit that deflects the light beams together and scans the light beams along a second direction perpendicular to the first direction; a plurality of imaging units that form an image with each of the light beams on a corresponding surface to be scanned; a housing unit that holds the light source units, the deflection units, and the imaging units, the housing unit including a beam converging unit located on the axes between the light source units and the deflection unit, configured to direct the light beams to the deflection unit such that distances between the light beams along the second direction are decreased in a sequence in which the light beams are arranged, and a beam turning unit that turns the light beams scanned by the deflection unit in a sequence corresponding to the sequence.

An optical scanner according to still another aspect of the present invention includes a plurality of light source units spaced from each other along a first direction and configured to emit light beams; a deflection unit that deflects the light beams together and scans the light beams along a second direction perpendicular to the first direction; a plurality of imaging units that form an image with each of the light beams on a corresponding surface to be scanned; and a beam merging unit configured to reflect at least two of the light beams and direct the light beams so as to be incident on the deflection unit closer to each other such that distances between the light beams relative to the second direction are decreased, and substantially along the first direction in the vicinity of an incident position at which the light beams are incident on the deflection unit, wherein the distances from the incident position to respective positions at which the at least two light beams are reflected by the light merging unit are different from each other.

An optical scanner according to still another aspect of the present invention includes a plurality of light source units spaced from each other along a first direction and configured to emit light beams; a deflection unit that deflects the light beams together and scans the light beams along a second direction perpendicular to the first direction; a plurality of imaging units that form an image with each of the light beams on a corresponding surface to be scanned; and a beam merging unit configured to reflect at least one of the light beams and direct the light beam so as to be incident on the deflection unit, closer to each other such that distances between the light beams relative to the second direction are decreased, and substantially along the first direction in the vicinity of an incident position at which the light beams are incident on the deflection unit, wherein the beam merging unit includes a member having a reflection area/areas configured to reflect only the light beam/light beams from a predetermined light source unit/units, and a transmission area/areas configured to pass the light beam/beams from the light source unit/units other than the predetermined light source unit/units.

An optical scanner according to still another aspect of the present invention includes a plurality of light source units spaced from each other along a first direction and configured to emit light beams; a deflection unit that deflects the light beams together and scans the light beams along a second direction perpendicular to the first direction; a plurality of imaging units that form an image with each of the light beams on a corresponding surface to be scanned; a plurality of lens members corresponding to the light beams respectively and configured to converge the light beams at least in the first direction in the vicinity of a reflecting surface of the deflection unit; and a common support member configured to position the lens members respectively along the first direction, and support the lens member as one unit.

An optical scanner according to still another aspect of the present invention includes a plurality of light source units spaced from each other along a first direction and configured to emit light beams; a deflection unit that deflects the light beams together and scans the light beams along a second direction perpendicular to the first direction; a plurality of imaging units that form an image with each of the light beams on a corresponding surface to be scanned, and include a lens shared by the light beams and having no refractive power in the first direction; and a beam merging unit configured to turn at least one of the light beams at a different position, changes distances along the second direction between the light beams incident on the deflection unit such that the distances decreases or become zero.

An image formation apparatus according to an aspect of the present invention includes an optical write unit that forms latent images on image carriers, a development unit that develops the latent images as toner images and; a transfer unit that transfers the toner images onto a sheet of paper, wherein the optical Write unit includes an optical scanner according to any one of the above aspects.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIGS. 14A and 14B are diagrams illustrating adjustment of inclination of focal lines by the rotation of a toroidal lens used for a scanning imaging optical system, wherein FIG. 14A illustrates inclination adjustment, designating the center of the optical axis as a center of rotation and FIG. 14B illustrates adjustment of inclination of a generatrix in the main scanning direction;

FIGS. 15A and 15B illustrate an example in which reflecting mirrors are integrally formed in a beam merging unit applicable to the present invention, wherein FIG. 15A is a plan view, and FIG. 15B is a front elevational view;

FIGS. 28A and 28B illustrate an example of a cylindrical lens holding unit;

FIGS. 29A and 29B are cross sections illustrating an example in which beam passing windows are curved surfaces having a negative curvature;

DETAILED DESCRIPTION

Exemplary embodiments of an optical scanner and an image formation apparatus according to the present invention will be explained with reference to the accompanying drawings.

The first embodiment corresponds to the first to the thirteenth aspect.

Figure 1:
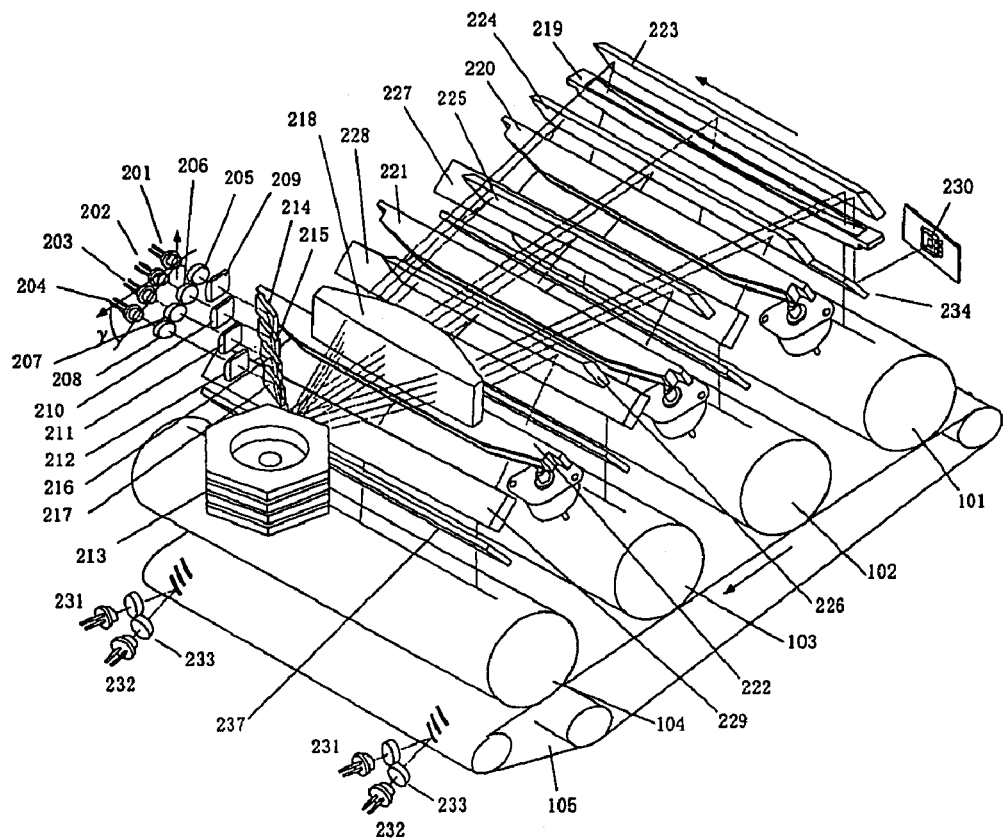
FIG. 1 is a perspective view illustrating the embodiment of an optical scanner according to the first embodiment.
Figure 2:
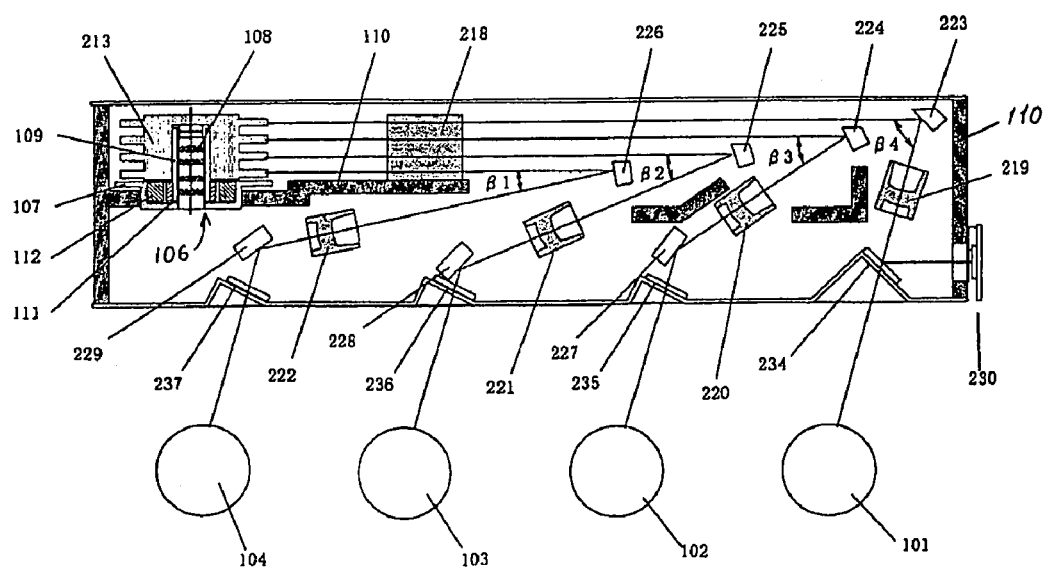
FIG. 2 is a partially sectioned front view of the first embodiment.

FIG. 1 illustrates the embodiment in which optical scanners and write units that write an image on a photosensitive member by the optical scanner are disposed in one direction for four stations. FIG. 2 is a sectional view thereof.

In FIGS. 1 and 2, four photosensitive drums 101, 102, 103, and 104 are arranged along a traveling direction of a transfer belt 105, and constituted so as to be able to form a color image by superposing and transferring toner images of different colors formed on the respective photosensitive drums sequentially onto the transfer belt 105. In the color image formation apparatus, respective optical scanners are integrally formed in an appropriate housing unit, such that all light beams are deflection-reflected and scanned on the same deflection reflecting surface of a single polygon mirror 213.

Semiconductor lasers 201, 202, 203, and 204, as a plurality of light source units, are arranged at an equal interval on a straight line inclined by the amount of γ from a direction corresponding to the main scanning, so that positions of light emission sources are on the same plane, and the light beams emitted from respective semiconductor lasers are converted into parallel beams, respectively, by coupling lenses 205, 206, 207, and 208. Cylindrical lenses 209, 210, 211, and 212, with one face being a plane, and the other face having a common curvature in the sub scanning direction, are arranged on the courses of the respective light beams having transmitted through the coupling lenses. The respective light beams are disposed so that the respective light beams respectively transmit through the cylindrical lens and the optical path length up to a deflection point of a polygon mirror 213 becomes equal to each other. The respective light beams are converged only in the sub scanning direction by the cylindrical lens, so that a line image long in the main scanning direction is imaged in the vicinity of the deflection reflecting surface of the polygon mirror 213.

Reflecting mirrors 214, 215, 216, and 217 are arranged as a beam merging unit, between the cylindrical lenses and the polygon mirror 213 on the path of light beams having transmitted through the cylindrical lenses 209, 210, 211, and 212. These reflecting mirrors are arranged step-wise, adjusted to the height of the respective light beams, so that the respective reflecting surfaces become parallel with each other. The light beam from the semiconductor laser 201 is aligned with the optical path toward the polygon mirror 213 by the reflecting surface 214, the light beam from the laser 202 is made to join the optical path by the reflecting surface 215, with the vertical position being matched therewith, the light beam from the laser 203 is made to join the optical path by the reflecting surface 216, with the vertical position being matched therewith, and the light beam from the laser 204 is made to join the optical path by the reflecting surface 217, with the vertical position being matched therewith. In this manner, the respective reflecting mirrors 214, 215, 216, and 217 are arranged so that the light beams are reflected in order from the far side from the polygon mirror 213, and the respective beams are made to enter into the polygon mirror 213, with the main scanning direction thereof superposed on each other vertically.

When the respective light beams are emitted with a predetermined interval L in the sub scanning direction, the interval S between the respective semiconductor lasers 201, 202, 203, and 204 are arranged so that, in this example, L equals to S·sin γ=5 millimeters. The respective emission axes are parallel with each other, and the deflection reflecting surface of the polygon mirror 213 keeps this interval L, and the light beams are made to enter into the deflection reflecting surface of the polygon mirror 213 from the vertical direction, more accurately, from the vertical direction with respect to the central axis of rotation of the polygon mirror 213. Therefore, the polygon mirror 213 is formed thick in the direction of the central axis of rotation.

In the illustrated example, the polygon mirror 213 is a hexahedral mirror, and has a shape that can further reduce the windage, by providing a peripheral groove in a portion between the light beams which does not contribute to the deflection reflection of the light beams, at a depth, which is slightly smaller than the inscribed circle of the polygon mirror 213. The thickness of one layer of the deflection reflecting surface is about 2 millimeters.

The polygon mirror 213 is rotated, so that the respective light beams are deflection-reflected by the respective deflection reflecting surfaces, and an fθ lens 218 constituting the scanning imaging optical system is arranged on the route of the deflected light beams. The fθ lens 218 is common to the respective light beams, and is formed thick like the polygon mirror 213, and does not have a converging force in the sub scanning direction. The fθ lens 218 is in a non-cylindrical shape having a power in the main scanning direction, so that the light beams move at a constant velocity on the respective photosensitive drum surfaces, with the rotation of the polygon mirror 213. The fθ lens 218 is disposed for each beam, and toroidal lenses 219, 220, 221, and 222 having an optical face tangle error correction function of the polygon mirror 213 are arranged on the route of the respective deflected light beams between the fθ lens 218 and the photosensitive drums 101, 102, 103, and 104. The toroidal lenses 219, 220, 221, and 222 form an optical scanning unit or an imaging unit, respectively, which images the respective light beams in a spot on the surfaces of the photosensitive drums 101, 102, 103, and 104, together with the fθ lens 218, to form an electrostatic latent image respectively on the four photosensitive drums at the same time.

In the respective optical scanning units, a plurality of turning mirrors are arranged so that the optical path lengths of the respective light beams from the polygon mirror 213 to the photosensitive drum surfaces agree with each other, and the incident positions and the incident angles to the respective photosensitive drums arranged at an equal interval become equal. The optical path will be explained for each optical scanning unit below. The light beam emitted from the semiconductor laser 201 is deflection-reflected by the uppermost deflection reflecting surface of the polygon mirror 213, passes through the fθ lens 218, and is reflected by the turning mirror 223 and guided to the photosensitive 101 via the toroidal lens 219, to form a yellow image on the surface of the photosensitive drum 101 as the first optical scanning unit.

The light beam emitted from the semiconductor laser 202 is deflection-reflected by the second-stage deflection reflecting surface of the polygon mirror 213, passes through the fθ lens 218, and is reflected by the turning mirror 227 and guided to the photosensitive 102 via the toroidal lens 219, to form a magenta image on the surface of the photosensitive drum 102 as the second optical scanning unit.

In these optical scanners, the turning mirrors 224, 225, and 226 constitute a beam turning unit, which sequentially separates the beams in sequence in the sub scanning direction along the flow of the beams, such that at first, a beam from the semiconductor laser 204 lastly coupled by the beam merging unit is separated, and then a beam from the semiconductor laser 203 is separated. In the illustrated embodiment, the reflection angle of the respective turning mirrors have the following relationship, so that the optical path goes in under the bottom side of a polygon motor 106, to reduce the size of the whole housing 110:

$\beta1<\beta2<\beta3<\beta4$, $\beta4-\beta1<90°$.

The four optical scanning units are housed in a single housing 110, as illustrated in FIG. 2.

The polygon motor 106 in the illustrated embodiment is a hydrodynamic air bearing type. This hydrodynamic air bearing has a rotor equipped with a fixed shaft 108 arranged in a standing condition on a base 107 fixed to the housing 110, and having herringbone grooves on the outer circumference, and a cylindrical sleeve 109 formed by digging out the central part of the polygon mirror 213, and the cylindrical sleeve 109 of the rotor is inserted into the fixed shaft 108. An annular magnet 111 is disposed at the lower part of the rotor, and the magnet 111 and a magnetic coil 112 opposite to the magnet outside in the circumferential direction form the polygon motor 106, and the polygon mirror 213 is rotated at a high speed together with the rotor, by switching controlling application of an electric current to the magnetic coil 112 corresponding to the rotational position of the magnet 111. The fθ lens and the toroidal lens are fixed to a predetermined position of the housing 110, by bonding, pressing by a plate spring, or the like.

As illustrated in FIG. 2, the respective photosensitive drums 101, 102, 103, and 104 are arranged outside below the housing 110, and dustproof glasses 234, 235, 236, and 237 are arranged in the path of the light beams from the housing 110 to the photosensitive drums. The respective dustproof glasses are mounted to a cover, which covers the bottom side of the housing 110. A synchronous detection sensor 230 that turns back the light beams in a part of the dustproof glass 234 and receives light, on the scanning start side of the image recording region, is disposed in the first optical scanning unit. The write start timing in the main scanning direction is made to agree with each other in the respective scanning units, based on a detection signal of the sensor 230.

The transfer belt 231 is constructed so as to be extended and rotated by three rollers including a drive roller and driven rollers, so that toner images are sequentially transferred from the respective photosensitive drums. At the time of transfer of the toner images, the resist position is aligned by the write start timing in the sub scanning direction, and the respective toner images are superposed on each other.

As explained above, the resist position is regularly adjusted, and a detector that reads the reference position of each image to be formed is disposed at opposite ends in the width direction of the transfer belt. The detector has an LED element 231 for illumination, a photo sensor 232 that receives reflected light from the transfer belt 231, and a pair of condenser lenses 233. Detected patterns formed by respective toner images of a reference color (yellow) and other colors (cyan, magenta, and black) are formed parallel with each other, in the vicinity of the opposite ends in the width direction of the transfer belt 231. In the illustrated embodiment, detected patterns of toner images inclined by 45 degrees from the main scanning direction are formed. The patterns are read, a resist deviation in the sub scanning direction is calculated from the detection timing, and the write start timing in the sub scanning direction is adjusted by the respective optical scanning units based on the detection result, on every other deflection reflecting surface of the polygon mirror, that is, by designating one scan line pitch P as a unit.

Figure 3:
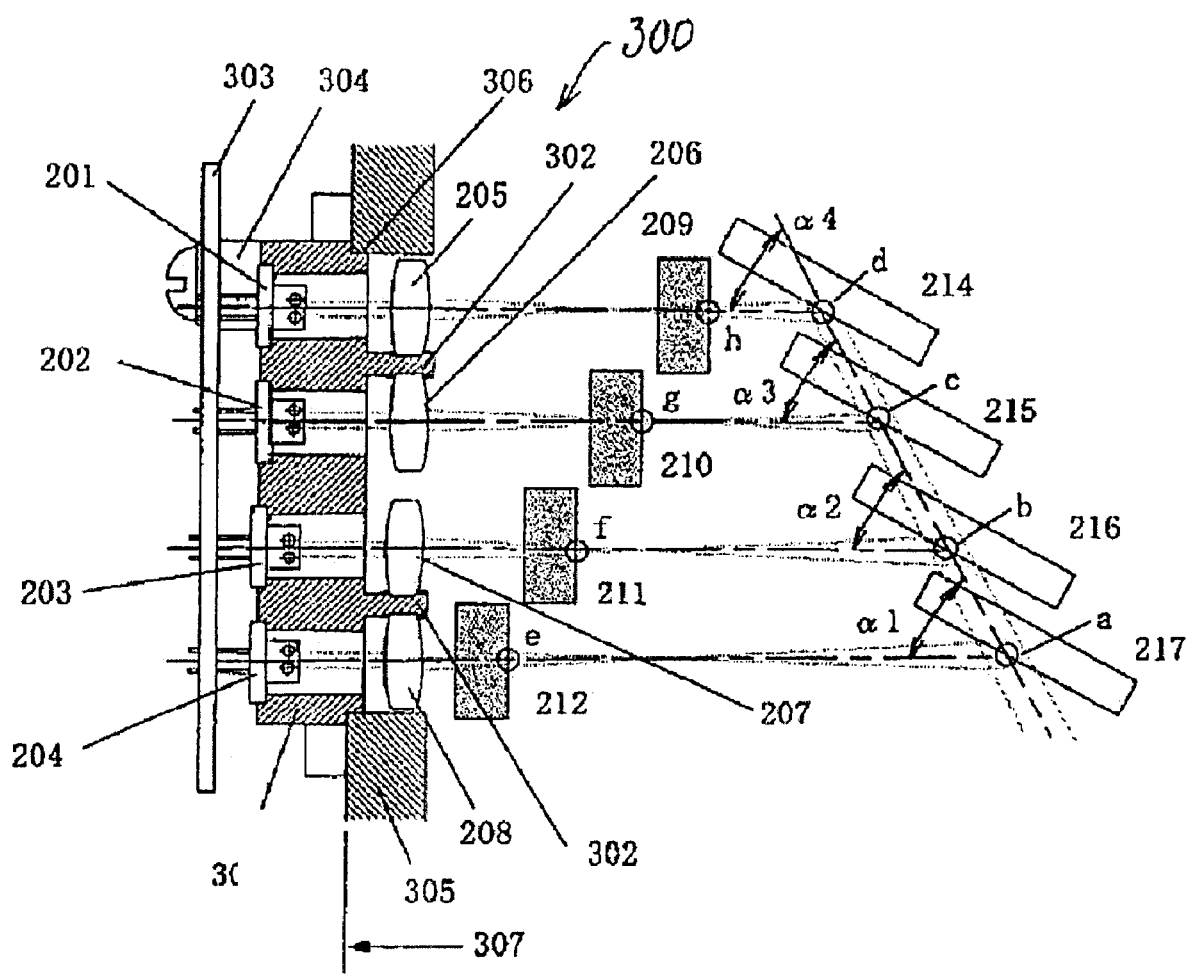
FIG. 3 is a sectional side view illustrating an example of a light source unit applicable to the present invention.
Figure 4:
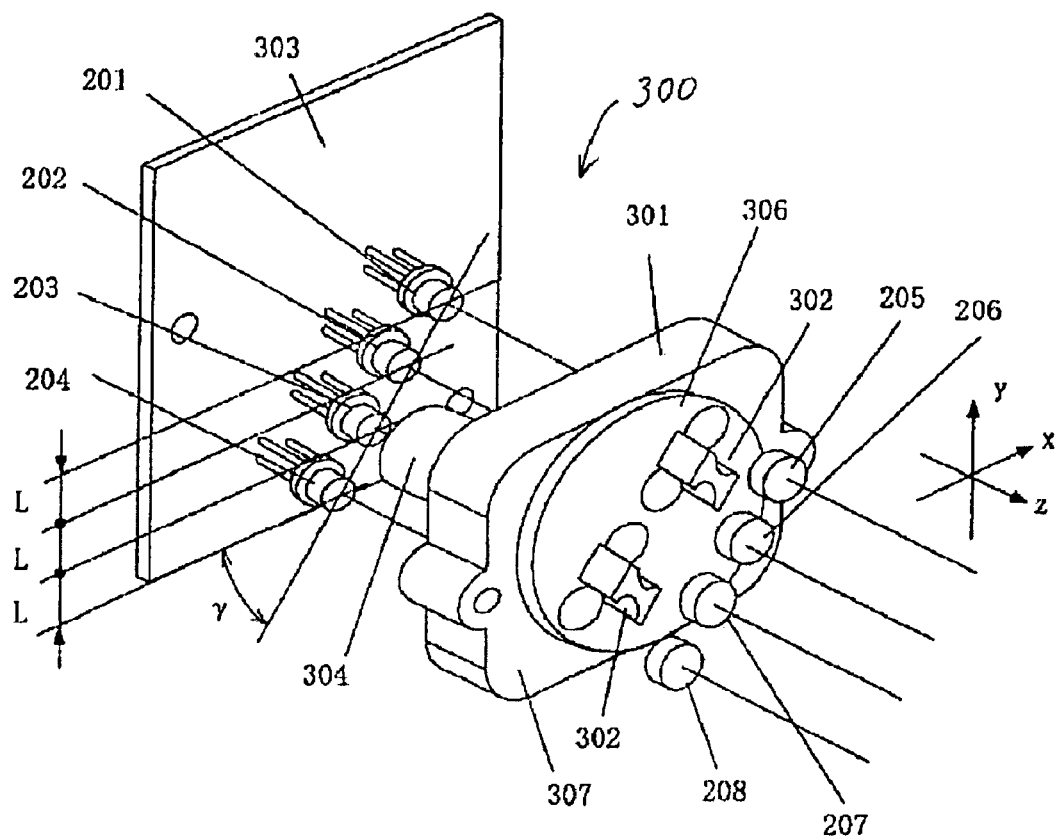
FIG. 4 is an exploded perspective view illustrating the main part of the light source unit.

FIG. 3 is a plan view illustrating a light source section in the first embodiment, and FIG. 4 is an exploded perspective view illustrating an example of a light source unit used in the light source section. In. FIGS. 3 and 4, a so-called semiconductor laser array, in which two light emission sources are formed monolithically at a pitch of several tens micrometers, is used for the semiconductor lasers 201, 202, 203, and 204 constituting a plurality of light source units. The respective semiconductor lasers are press-fitted and fixed to the common support member 301, by fitting the outer circumference of the package so as to be symmetrical with respect to the emission axis. The coupling lenses 205, 206, 207, and 208 are disposed corresponding to each semiconductor laser, and respectively fixed in a semi-circular groove of a protrusion 302, on which the semi-circular grooves are formed back to back on the protrusion 302 provided in the common support member 301. The respective coupling lenses are fixed by filling a ultraviolet (UV) hardening-type adhesive in a gap between outer circumferences of the lenses, with the position on an xy plane (a plane orthogonal to the emission axis) adjusted so that the optical axis agrees with the respective emission axes, and the position in a z direction (direction of optical axis) adjusted so that the emitted beams become parallel beams.

In the illustrated example, the respective light sources are arranged so that the respective beams are emitted in parallel, with an interval L=5 millimeters in the sub scanning direction. A cylindrical pedestal 304 is integrally formed with the support member 301 on the backside thereof. The cylindrical pedestal 304 is fixed by a screw to the surface side of a printed board 303, so that there is a predetermined gap between the respective semiconductor laser fitting portions of the support member 301 and the surface of the printed board 303. Lead terminals extended from the back face of the respective semiconductor lasers are inserted into through holes in the printed board 303, and soldered to a circuit pattern on the printed board 303, thereby forming the light source unit 300 integrally.

The light source unit 300 is positioned in an engagement hole provided on a wall 305 of the housing, in which the polygon mirror, the fθ lens, and the like are held and housed, on the basis of a cylindrical protrusion 306. The light source unit 300 is integrally fixed by screwing to the housing, with an abutting surface 307 orthogonal to the emission axes of light beams bumped against the housing. The cylindrical lenses 209, 210, 211, and 212, and the reflecting mirrors 214, 215, 216, and 217 are disposed so as to satisfy the following conditions:

$$\alpha 1=\alpha 2=\alpha 3=\alpha 4, \text{ and}$$

$$ae=abf=acg=adh.$$

Figure 9:
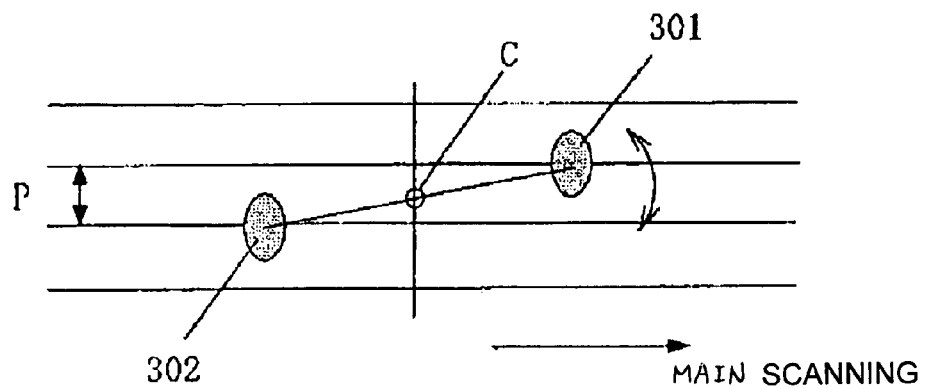
FIG. 9 is a conceptual diagram illustrating adjustment of beam spot intervals by the light source unit.

Here, a distance $\Delta L=ae-dh$ between the cylindrical lenses increases with an increase in the interval between the semiconductor lasers, thereby causing a useless space. However, by bringing $\Delta L$ close to zero, designating focal lengths of the respective cylindrical lenses 209, 210, 211, and 212 as:

$$f1>f2>f3>f4,$$

the cylindrical lenses can be aligned on the same plane orthogonal to the emission axes. In this case, a lateral magnification $\zeta$ in the sub scanning direction is different for each optical scanning unit, and hence the beam spot intervals on the photosensitive surfaces between the light emission sources of the respective semiconductor lasers change. However, at the time of mounting the semiconductor laser on the support member, by changing the angle of inclination $\gamma$ on the xy plane, the beam spot interval can be adjusted as illustrated in FIG. 9.

If it is assumed that the sub scanning lateral magnification of the whole optical system including the coupling lenses, the f$\theta$ lens, and the toroidal lenses is $\zeta$, and the pitch of the light emission source is d, the interval P between the beam spots 301 and 302 in the sub scanning direction can be expressed by:

$$P=\zeta \cdot d \cdot \sin \gamma,$$

and by changing the angle of inclination $\gamma$, a plurality of adjacent lines can be scanned at the same time, according to a pixel pitch P corresponding to the recording density.

In this example, the light source sections corresponding to the respective colors, respectively including a semiconductor laser and a coupling lens, are formed in an integrated light source unit, however, even when the light source unit is individually formed, the similar effect can be obtained, if the directions of the respective emission axes are aligned with each other at the time of holding the housing, and the positions of planes orthogonal to the emission axes, on which the light emission sources are arranged, are made close to each other.

Figure 5:
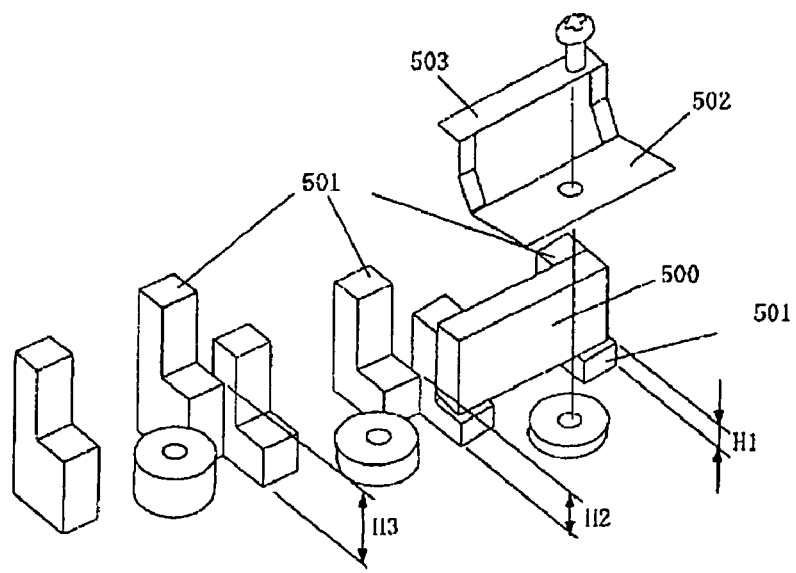
FIG. 5 is an exploded perspective view illustrating an example of a support section of a reflecting mirror in a beam merging unit applicable to the present invention.

FIG. 5 illustrates a support section of the reflecting mirror in the beam merging unit. Each reflecting mirror 500 is installed on an L-shape attachment portion 501 formed on the bottom of the housing, with the reflecting mirror pressed against a vertical plane by a plate spring 502. An upward deviation of the reflecting mirror is regulated by an end bending portion 503 of the plate spring, so that a part of the reflecting mirror does not interfere with the beams passing above the reflecting mirror. The reflecting mirrors can be arranged according to the beam interval in the sub scanning direction, by stepwise changing the installation height H of the respective reflecting mirrors by the L-shape attachment portion 501, and can be supported in the similar method, with the pressing direction aligned to the same side of the. housing.

Figure 15:
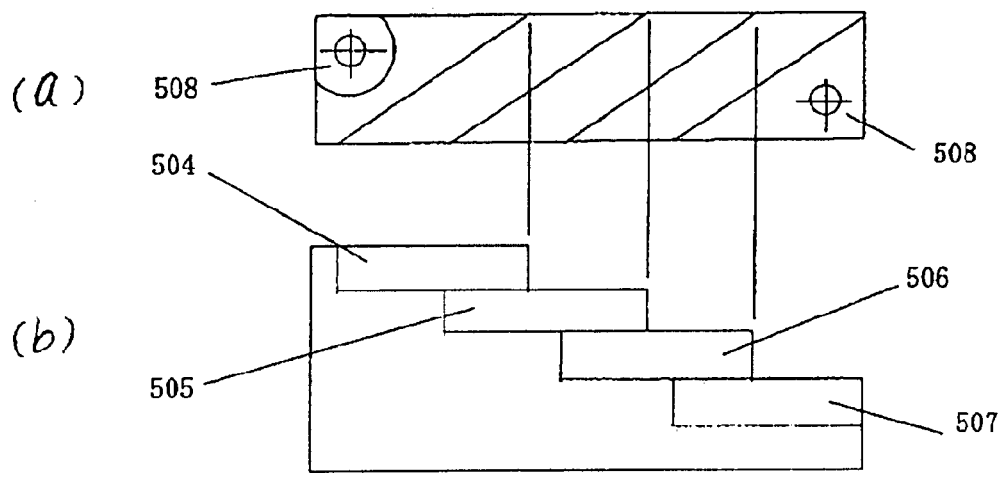

FIGS. 15A and 15B illustrate an example in which reflecting mirrors are integrally formed in a beam merging unit. Four parallel planes are formed by scraping a high-purity aluminum block stepwise, and these four planes are designated as reflecting mirrors 504, 505, 506, and 507. The light beam merging unit including the aluminum block is fixed by screwing to the housing via through holes 508 at the opposite ends of the block, with the bottom bumped against the housing.

Figure 6:
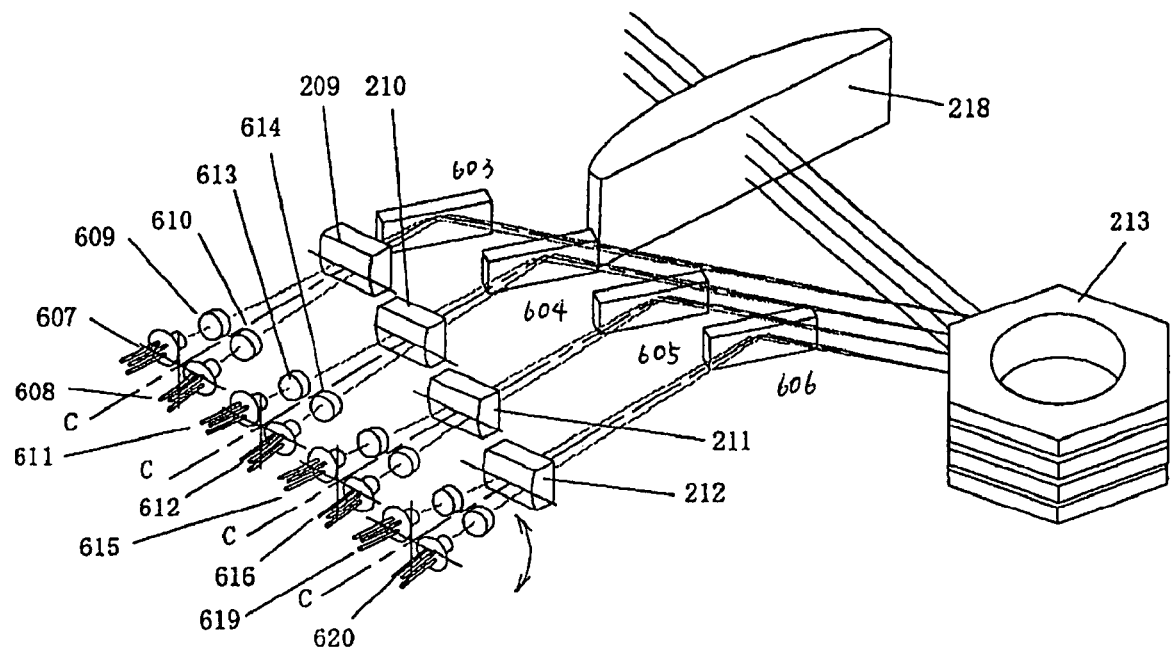
FIG. 6 is a perspective view illustrating another example of the light source unit and the beam merging unit applicable to the present invention.
Figure 7:
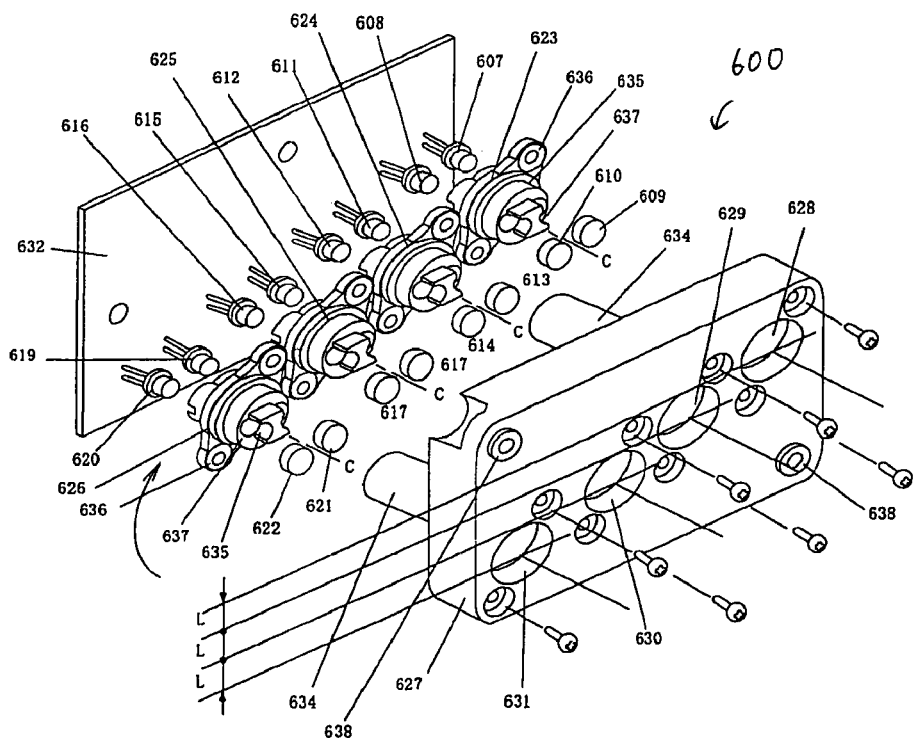
FIG. 7 is an exploded perspective view illustrating another example of the light source unit applicable to the present invention.

FIG. 6 is a block diagram of a light source Unit in another example, illustrating an example having a plurality of semiconductor lasers for each color. FIG. 7 is a perspective view of the light source unit. The configuration of the beam merging unit includes reflecting mirrors 603, 604, 605, and 606 disposed such that the respective planes are parallel with each other, as in the above embodiment. Semiconductor lasers 607, 608, 611, 612, 615, 616, 619, and 620, and coupling lenses 609, 610, 613, 614, 617, 618, 621, and 622 are disposed, two sets each for each color scanning unit, symmetrically in the main scanning direction with respect to the emission axes.

Figure 8:
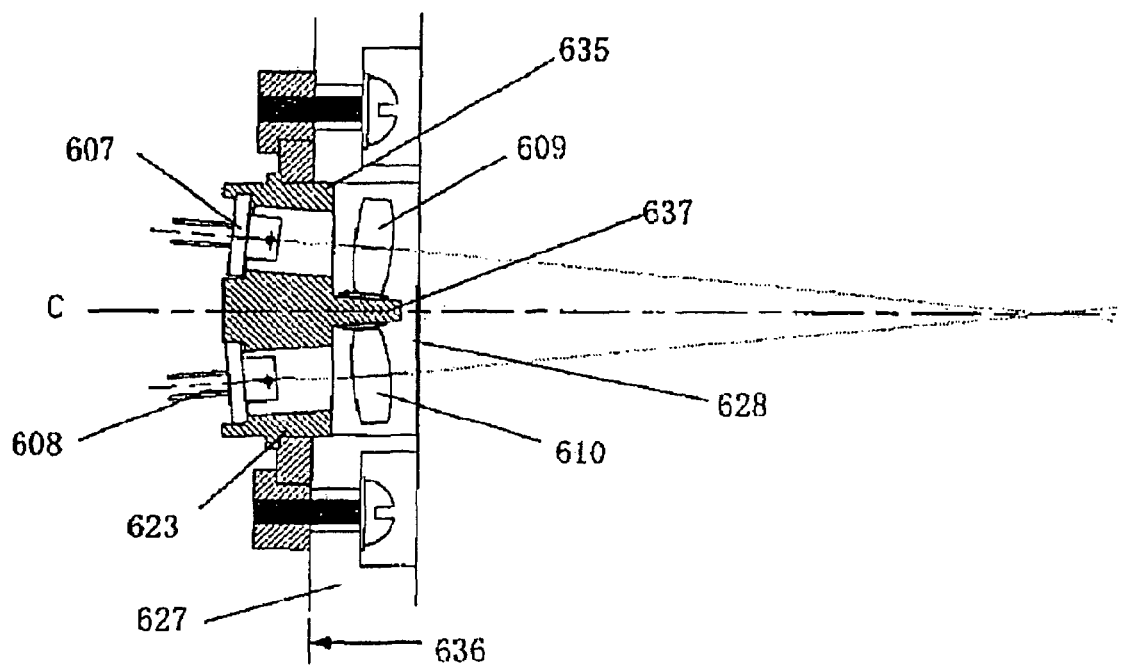
FIG. 8 is a sectional side view illustrating still another example of the light source unit applicable to the present invention.

As illustrated in the cross section in FIG. 8, the outer circumference of the package of the semiconductor lasers forming the light source unit are fitted or press-fitted to the respective support members 623, 624, 625, and 626. The respective coupling lenses are fixed in a semi-circular groove of a protrusion 637, on which the semi-circular grooves are formed back to back on the protrusion, by filling a ultraviolet (UV) hardening-type adhesive in a gap between the outer circumference of the lens and the groove, with the position in the direction of optical axis adjusted so that the emitted beams become parallel beams. The respective optical axes are inclined so as to be in a direction crossing each other with respect to an emission axis C. In this example, the shape of the support member is designed so that this crossing position is in the vicinity of the deflection reflecting surface of the polygon mirror.

A cylindrical portion 635 of each support member is inserted into an engagement hole 628, 629, 630, 631, respectively, formed so that the interval L in the sub scanning direction becomes a predetermined interval, in this example, 5 millimeters, at an equal interval with respect to a base member 627, a pair of flange portions 636 are bumped against an abutting surface (backside of the base member) orthogonal to the emission axis C to position the support member, and a screw is screwed to a screw hole formed in the flange portion from the front side of the base, to fix the respective support members 623, 624, 625, and 626. At the time of fixation, as in the previous example, the beam spot interval can be aligned with a pixel pitch P corresponding to the recording density, by adjusting the amount of inclination based on the cylindrical portion. A printed board 632 having a drive circuit formed thereon is attached by screwing to cylindrical pedestals 634 arranged on the base member 627 in a standing condition, thereby forming the light source unit 600 integrally. The light source unit is screwed to the wall of the housing, with an abutting surface 638 bumped against the wall. The abutting surface (backside of the base member) is formed such that the respective emission axes C are parallel with each other, or in a direction orthogonal to the main scanning direction.

As in the previous example, a semiconductor laser array having a plurality of light emission sources may be used for each semiconductor laser, and by increasing the number of beams for each color scanning unit by the combination thereof, it can be adapted to higher speed and higher density image recording.

Figure 10:
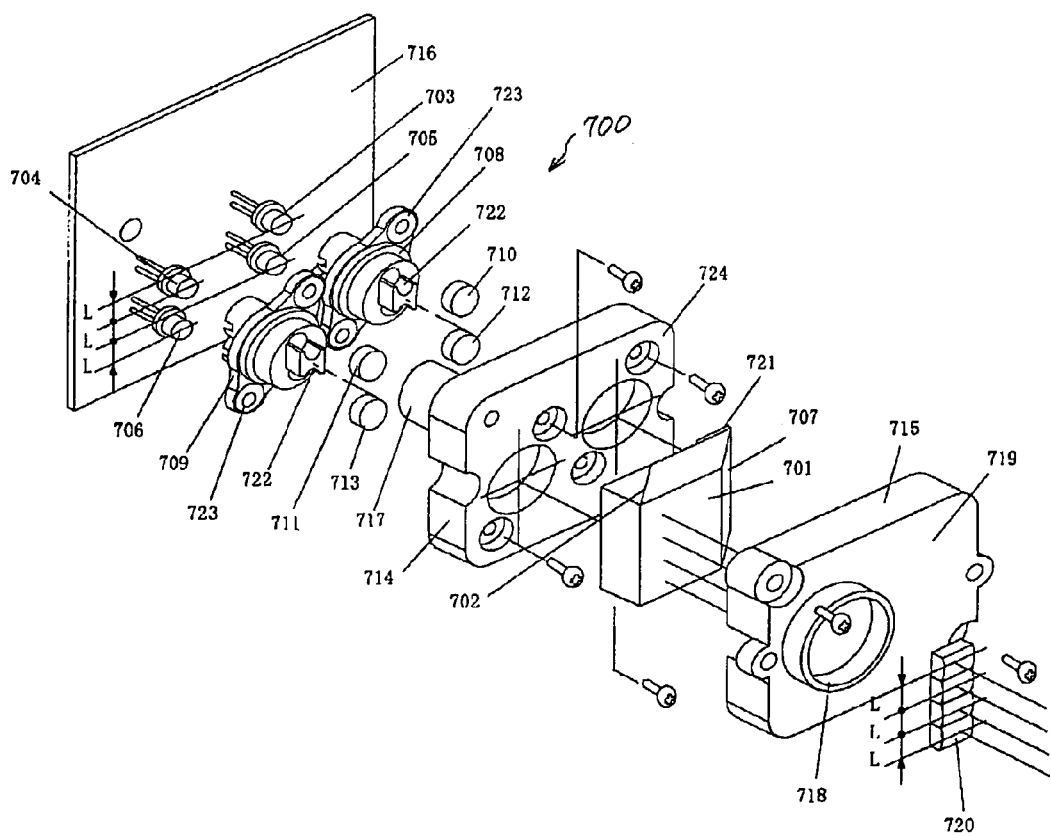
FIG. 10 is an exploded perspective view illustrating still another example of the light source unit and the beam merging unit applicable to the present invention.
Figure 11:
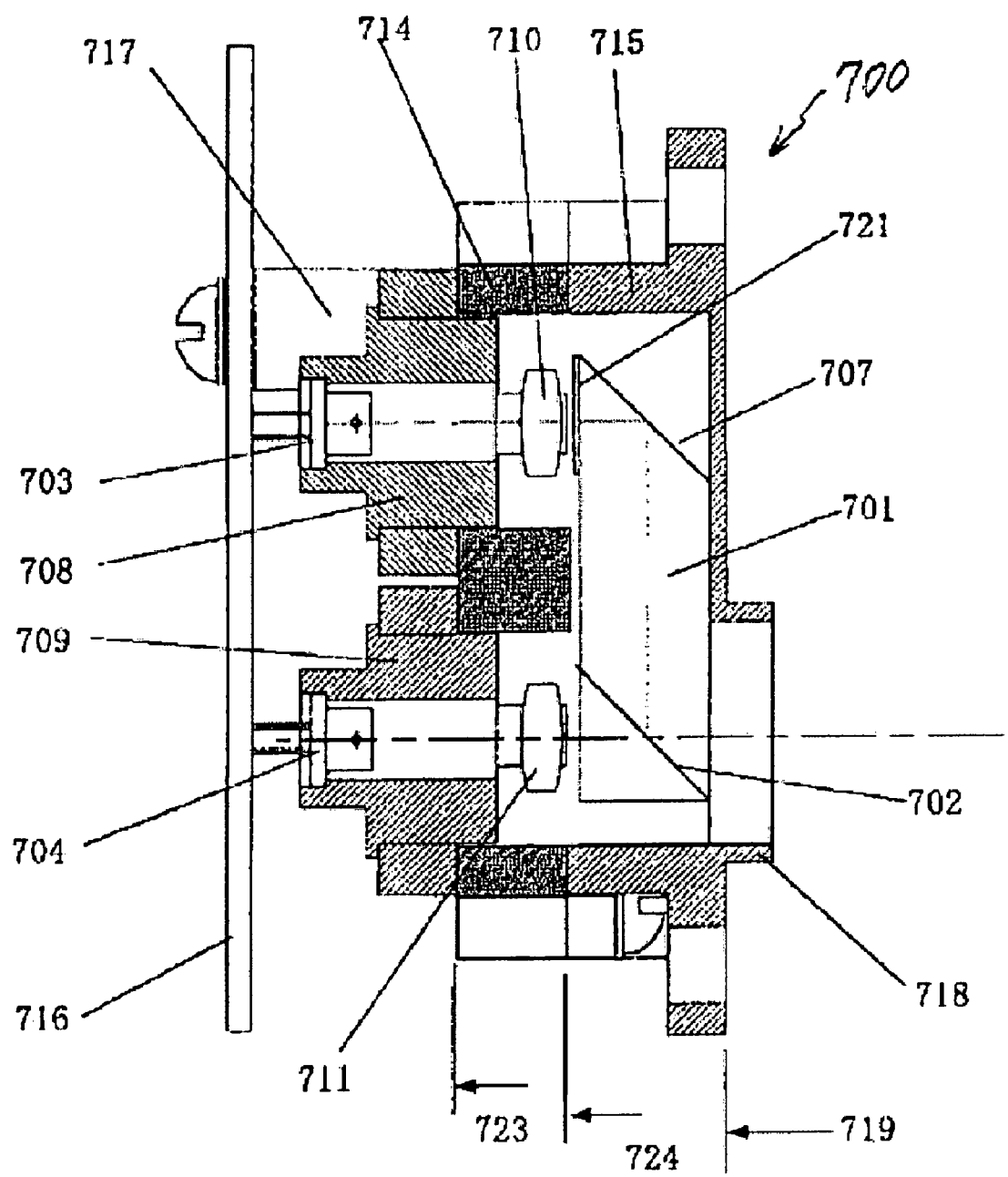
FIG. 11 is a sectional side view of FIG. 10.

FIG. 10 illustrates an example in which the beam merging unit is integrally formed with the light source unit. FIG. 11 is a cross section in a direction corresponding to the main scanning. The beam merging unit 701 includes a prism section having a cross section of parallelogram, and a prism section having a cross section of triangle, and the junction plane 702 thereof forms a polarized beam splitter. A $\lambda/2$ plate 721 is adhered to the beam incident plane of the parallelogram, so as to rotate the polarization direction of the beams from the semiconductor lasers 703 and 704 by 90 degrees. The beams from the semiconductor lasers 703 and 704 enter into the beam merging unit 701, reflected by an inclined plane 707 and then by the junction plane 702, and brought close to the beams, which have directly transmitted from the semiconductor lasers 705 and 706, in the main scanning direction, and emitted.

The semiconductor lasers 703, 704, 705, and 706 corresponding to the respective colors are divided into two for two colors, and as in the above example, held by common support members 708 and 709, together with coupling lenses 710, 711, 712, and 713, respectively forming a pair. In this example, the respective semiconductor lasers are arranged in the sub scanning direction, and semiconductor laser fitting holes on the support members and semi-circular grooves for joining the coupling lenses are designed coaxially, so that the optical axes become parallel with each other. The support members are fixed by a screw, with a pair of flange portions 723 bumped against a base member 714. The respective light emission sources are arranged zigzag on the xy plane orthogonal to the emission axis, and the interval between the semiconductor lasers on the respective support members is 2L. A printed board 716 having a drive circuit for the semiconductor laser formed thereon is fixed by screwing to a cylindrical pedestal 717 arranged in a standing condition on the base member 714.

The beam merging unit 701 is housed in a holder member 715, and joined by a screw to the base member 714, with an abutting surface 724 brought face to face with the base member 714, thereby forming a light source unit 700 integrally. The light source unit 700 is positioned on the wall of the housing, based on a cylindrical protrusion 718, and fixed by screwing with an abutting surface 719 orthogonal to the emission axis bumped against the wall. The abutting surface 719, the bumping face of the flange portion 723, and the abutting surface 724 are parallel with each other.

In this example, the cylindrical lenses 720 have a continuously wavy cross section such that the plane orthogonal to the emission axis is aligned on the same plane, and the other side is adjoined in the sub scanning direction at an equal interval. The respective curvatures thereof are the same, and formed so that the respective focal lines are aligned on a plane orthogonal to the emission axis. The respective beams are allowed to enter within a plane passing through the center of curvature of the respectively corresponding lens section, and the power is set so as to be converged on the deflection reflecting surface of the polygon mirror.

Figure 12:
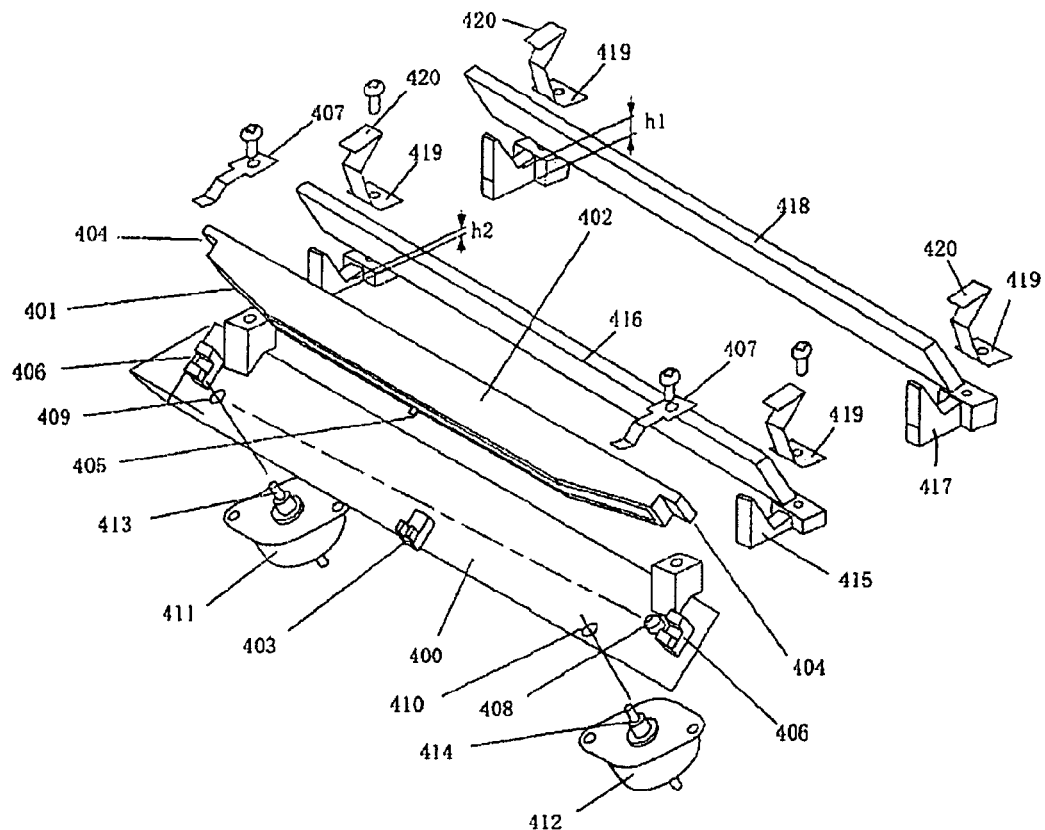
FIG. 12 is an exploded perspective view illustrating an example of a mechanism for correcting inclination and curvature of scan lines applicable to the present invention.

A mechanism for correcting the inclination and bending of the scan line will be explained. FIG. 12 illustrates the first example, in which a support section of a toroidal lens 401 with respect to the bottom 400 of an optical housing is illustrated. The respective toroidal lenses 401 are arranged opposite to the respective photosensitive drums, with the direction of optical axis and the sub scanning direction aligned on the bottom of the optical housing, so that a protrusion 405 provided in the central part of a box-like rib 402 is engaged with a concave portion 403 formed in the optical housing, to regulate the main scanning direction (lengthwise direction), and the bottom ends of flange portions 404 provided at the opposite ends are similarly engaged with concave portions 406, respectively, to regulate the direction of optical axis (widthwise direction). Further, the lower face of the box-like rib 402 is supported such that one end in the main scanning direction is supported at substantially the center in the sub scanning direction (first supporting point), and the other end is supported at two points, on the incident side (second supporting point) and the outgoing side (third supporting point) in the sub scanning direction, in total at three points, and pressed from above by a plate spring 407.

In this example, the box-like rib 402 is positioned by a protrusion 408 protruding from the bottom of the housing, designating the second supporting point as a reference bump, and at the third supporting point, the ends 413 and 414 of shafts extending from stepping motors 411 and 412 are directly bumped from the back through the through holes 409 and 410. The shaft is a built-in feed screw, and the protruding quantity can expand or contract.

Figure 14A:
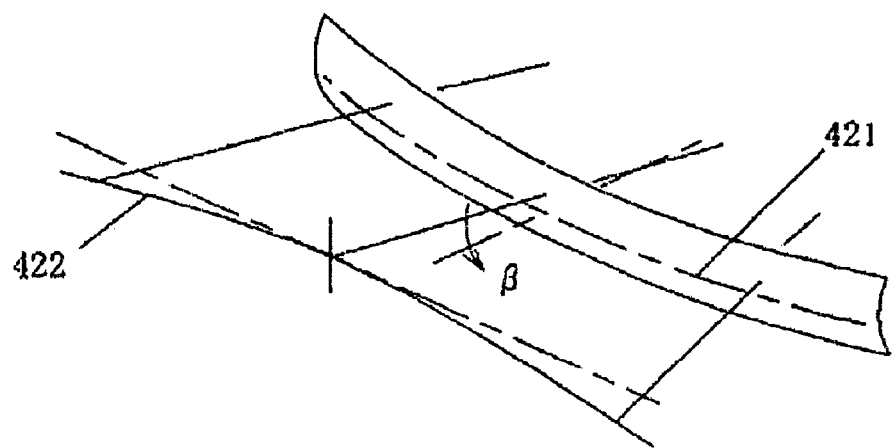
Figure 14B:
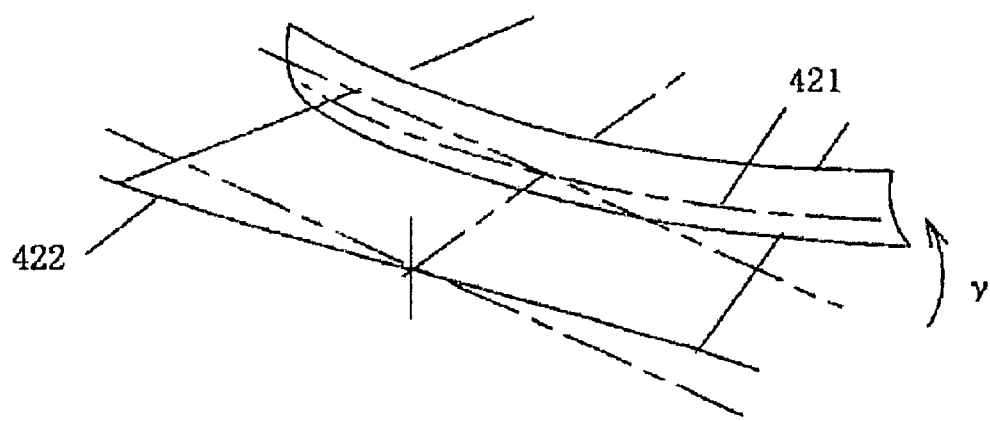

Here, if only the first supporting point is made variable, the toroidal lens 401 can be rotation-adjusted as indicated by sign γ, within a plane orthogonal to the optical axis, about the axis of rotation connecting the second and the third supporting points. As illustrated in FIG. 14A, if only the second supporting point is made variable, as indicated by sign β, the toroidal lens 401 can be rotation-adjusted in the sub scanning cross section including the optical axis, about an axis of rotation connecting the first and the third supporting points, and the focal line 422 can be warped, according to the inclination of the curved surface, by allowing the beam to enter at a position where the eccentricity from a generatrix 421 is different in the main scanning direction. As a result, the warp is intentionally generated and corrected so as to cancel the curvature of the scan line resulting from a machining error or arrangement error of optical elements constituting the optical system, thereby enabling improvement of the linearity of the scan line. In this example, this adjustment mechanism is equipped in the toroidal lens in the optical scanning units, excluding the optical scanning unit for yellow. The axis of rotation connecting the first and the third supporting points is not actually orthogonal to the optical axis, but since the axis is sufficiently long, as compared with the intervals between the second and the third supporting points, it can be regarded as being substantially orthogonal to the optical axis.

In FIG. 12, reference signs 415 and 417 respectively indicate attachment portions of turning mirrors 416 and 418. The attachment portions are provided on the bottom of the housing, forming a pair in the main scanning direction, and the reflecting surfaces of the turning mirrors are pressed against inclined surfaces by a plate spring 419 and supported. An upward deviation is restricted by end bent portions 420, so that a part of the reflecting mirror does not affect the beams passing above the reflecting mirror.

The respective turning mirrors 416 and 418 constituting the beam merging unit can be arranged by providing the installation height h at the attachment portions stepwise, and are supported by aligning the pressing direction by the plate spring to the same side of the housing.

The adjustment of inclination and curvature of the scan line is regularly performed as in the adjustment of the resist position, so as to be adapted to the use environment of the image formation apparatus, by using a preparation period before the printing job, or a waiting period between jobs. Based on the detection result by the detector, the scan lines of the respective colors are automatically corrected so as to be parallel with the yellow scan line, as a reference, and to equalize the bending direction and the bending quantity. By combining this automatic correction with the correction of the image write start timing, the images recorded and formed in the respective stations can be superposed accurately, thereby enabling formation of a high quality color image without out of color registration.

Figure 13:
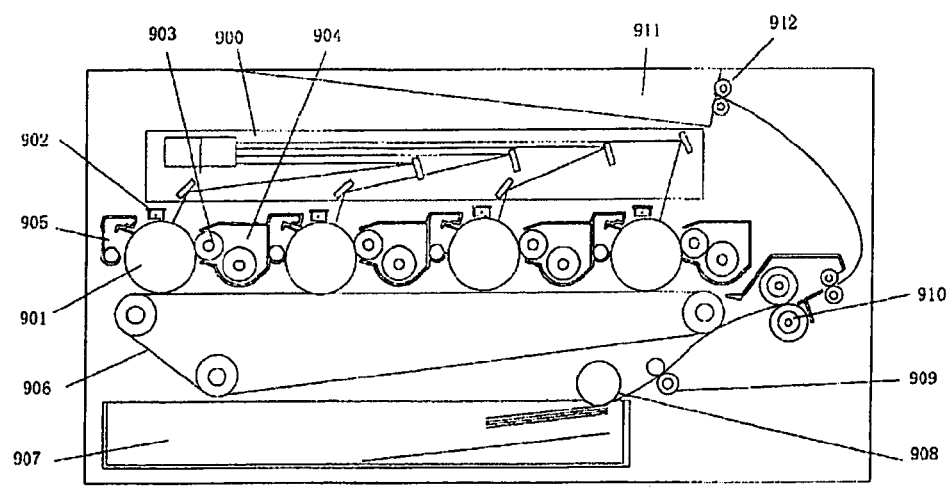
FIG. 13 is a front elevational view schematically illustrating the embodiment of an image formation apparatus according to the present invention.

FIG. 13 illustrates an example of a color image formation apparatus equipped with the optical scanner explained above. In FIG. 13, a charging charger 902 that uniformly charges the surface of the photosensitive drum at a high voltage, a developing roller 903 that adheres the charged toner to an electrostatic latent image recorded by an optical scanner 900 to manifest an image, a toner cartridge 904 that supplies the toner to the developing roller 903, and a cleaning case 905 that scrapes and stores the toner remaining on the photosensitive drum 901 are respectively arranged around the photosensitive drum 901. Image recording is performed onto the photosensitive drum 901 for a plurality of lines, in this example, for two lines at the same time, by scanning for each plane of the deflection reflecting surface of the polygon mirror.

The image forming station has been explained, taking one of four juxtaposed stations as an example. Four image forming stations are arranged in parallel in the moving direction of a transfer belt 906. On the photosensitive drum in each station, an image is formed by executing known electrophotographic processes, including charging, exposure, development, transfer, cleaning, and fixation. However, the transfer process in the illustrated embodiment is such that yellow, magenta, cyan, and black toner images formed on four photosensitive drums are sequentially transferred with the timing adjusted, once on the transfer belt 906, and superposed on each other to form a color image, and the color image is transferred onto recording paper, to form a color image on the transfer paper. The respective image forming stations have basically the same configuration, and only the toner color is different.

The recording paper is fed from a paper feed tray 907 by a paper feed roller 908, fed to an image position on the transfer belt 906, with the timing adjusted, by a resist roller pair 909, so that a color image is transferred to the transfer paper on the transfer belt 906 at a predetermined transfer position. The transferred toner is fixed by a fixing roller 910, and the recording paper is ejected onto a paper ejection tray 911 by an ejection roller 912.

In the first embodiment, the light source units may be integrally held by a common support member, with the directions of the respective emission axes aligned with each other, and detachably held by the housing unit, so that the respective emission positions are at a predetermined interval at least in the sub scanning direction. By such a configuration, the installation position between the respective light sources can be accurately aligned with each other, and even if there is a deviation due to the assembly or replacement of the light source units, the deviation can be immediately corrected, and even if there is a change in the environment, the change can be corrected so as to maintain the relative position of the respective light sources.

The second embodiment corresponds to the fourteenth to the twenty-seventh aspects.

Figure 16:
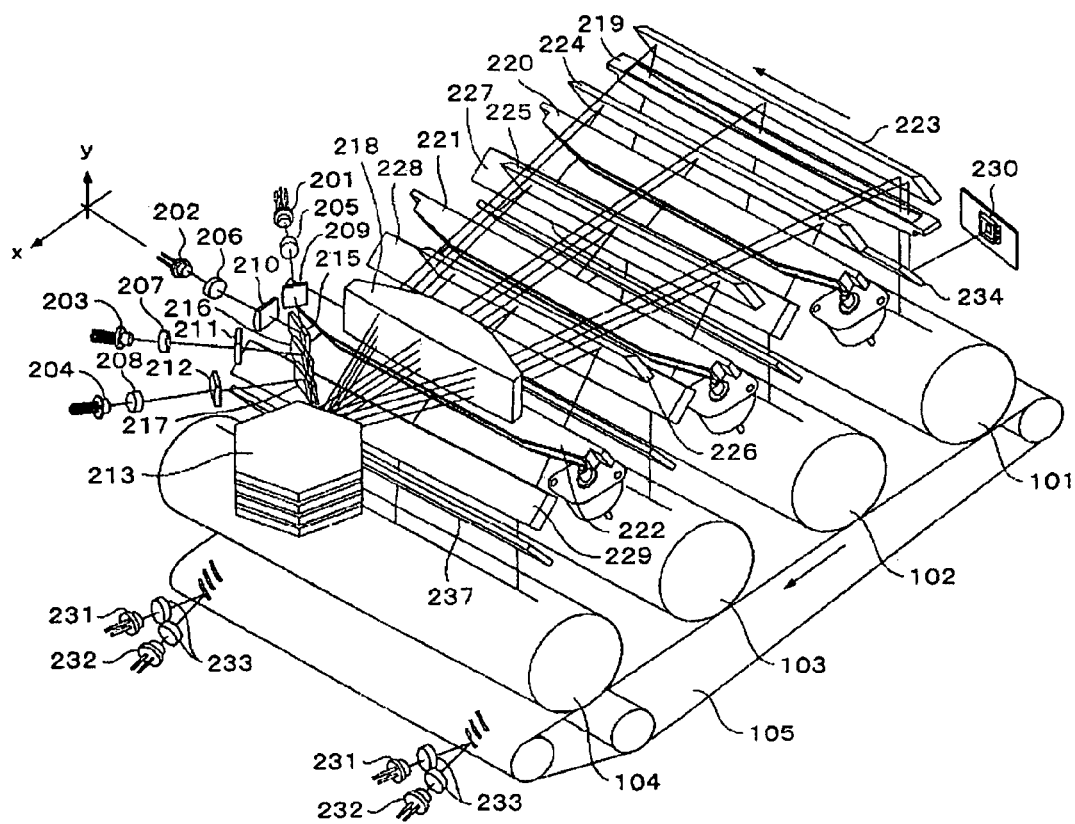
FIG. 16 is a perspective view illustrating an example of a write unit according to the second embodiment.

FIG. 16 is a perspective view illustrating an example of a write unit according to the second embodiment.

Figure 17:
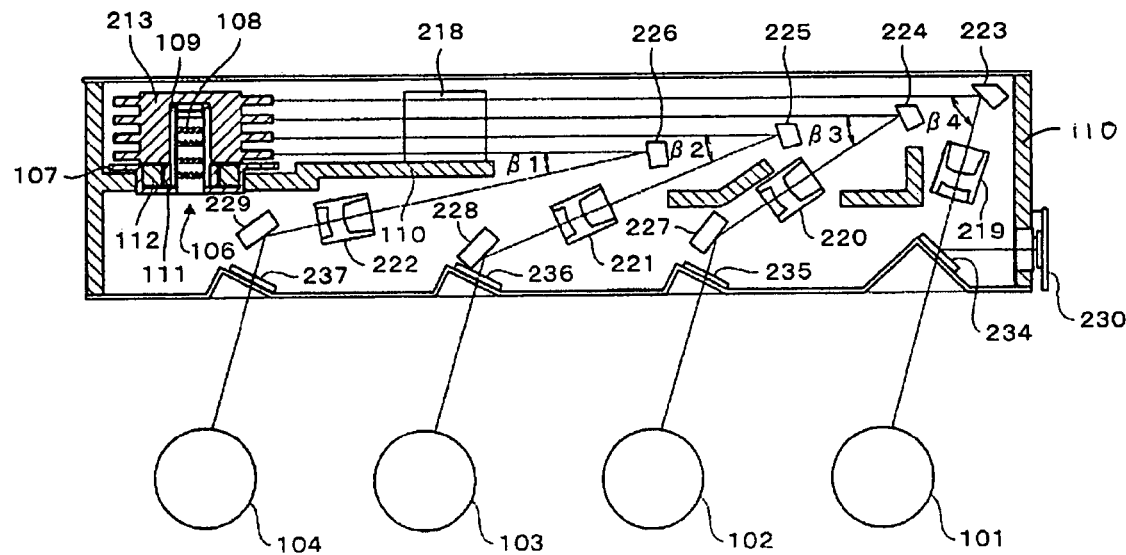
FIG. 17 is a sectional side view of a write unit illustrated in FIG. 16.

FIG. 17 is a sectional side view of a write unit illustrated in FIG. 16.

In these figures, reference signs 101, 102, 103, and 104 denote photosensitive drums, 105 denotes a transfer belt, 106 denotes a polygon motor, 107 denotes a base portion of the polygon motor, 108 denotes a fixed shaft, 109 denotes a cylindrical sleeve, 110 denotes a housing, 111 denotes a magnet, 112 denotes a magnetic coil, 201, 202, 203, and 204 denote semiconductor lasers, 205, 206, 207, and 208 denote coupling lenses, 209, 210, 211, and 212 denote cylindrical lenses, 213 denotes a polygon mirror, 215, 216, and 217 denote reflecting mirrors as a beam merging unit, 218 denotes a fθ lens, 219, 220, 221, and 222 denote toroidal lenses, 223, 224, 225, and 226 denote first turning mirrors, 227, 228, and 229 denote second turning mirrors, 230 denotes a synchronous detection sensor, 231 denotes an LED element, 232 denotes a photo sensor, 233 denotes a pair of condenser lenses, 234, 235, 236, and 237 denote dustproof glasses, and β denotes a folded angle.

In an image formation apparatus in which four photosensitive drums 101, 102, 103, and 104 are arranged along a traveling direction of the transfer belt 105, and toner images of different colors are sequentially transferred to form a color image, the respective optical scanning units are formed integrally, so as to scan all light beams on the same lane of the polygon mirror 213.

The semiconductor lasers 201, 202, 203, and 204 are arranged so that the respective emission positions are at different portions in the sub scanning direction, that is, in FIG. 17, the emission position of the semiconductor laser 201 becomes the highest, and away from the bottom of the housing, and then, are arranged in order of semiconductor lasers 202, 203, and 204, and such that the emission directions in the main scanning direction becomes radial.

The emitted light beams are respectively transformed into parallel beams by the coupling lenses 205, 206, 207, and 208. The cylindrical lenses 209, 210, 211, and 212 have a flat surface on one side, and a common curvature in the sub scanning direction on the other side, and the respective light beams are converged on the deflection surface of the polygon mirror 213 so as to be a long line in the sub scanning direction, and the deflection point and the photosensitive surface are conjugate in the sub scanning direction, and the cylindrical lenses and the toroidal lenses form an optical face tangle error correction optical system.

Since the polygon mirror 213 rotates, the incident points of the light beams are shifted with the rotation. A reflection point of the polygon mirror 213 when the light beam, for example, from the semiconductor laser 201 is reflected toward the center of the main scanning direction is referred to as a reference reflection position.

The reflecting mirrors 215, 216, and 217 as the beam merging unit are disposed so that the distance from the turning point to the reference reflection position becomes shorter as the emission position becomes lower, that is, in sequence in the sub scanning direction, and the angles of the turned light beams are set so that the deflection points are aligned in the main scanning direction. "Coupling" here means that the respective beams substantially agree with each other in the main scanning direction.

The beam from the semiconductor laser 201 is directed to the polygon mirror directly, not through the reflecting mirror, but the reflecting mirror may be disposed so that the light beam is turned back, like other beams.

The respective reflecting surfaces have different heights stepwise, and the beam from the semiconductor laser 201 skims over the respective reflecting mirrors toward the polygon mirror, the beam from the semiconductor laser 202 is turned back by the reflecting mirror 215 so that the main scanning direction thereof is made to come close to the optical path from the semiconductor laser 201, and skim over the reflecting mirrors 216 and 217 toward the polygon mirror. The beam from the semiconductor laser 203 is turned back by the reflecting mirror 216 so that the main scanning direction thereof is made to come close to the optical path from the semiconductor laser 201, and skims-over the reflecting mirror 217 toward the polygon mirror. Thus, the main scanning directions of the respective beams are aligned with each other sequentially from the far side of the polygon mirror, to be coupled and made to enter into the polygon mirror 213.

The respective beams are emitted from the respective semiconductor lasers at an equal interval, in this example, at L=5 millimeters, so that the beams are parallel with each other in the sub scanning direction, and are made to enter into the reflecting surface of the polygon mirror, with the interval L being maintained, vertical to the reflecting surface in the sub scanning direction.

Therefore, it is difficult to superpose the light source units holding the semiconductor lasers and the coupling lenses physically up and down (in the sub scanning direction), and hence the light source units are arranged, shifted in the main scanning direction.

The polygon mirror 213 is formed thick, and in this example, is a hexahedral mirror, and has a shape that can reduce a windage, by providing a groove in a portion between the light beams which does not contribute to the deflection of the light beams, at a depth, which is slightly smaller than the inscribed circle of the polygon mirror. The thickness of one layer of the deflection reflecting surface is about 2 millimeters.

The fθ lens 218 is common to the respective beams, and formed thick as in the polygon mirror, and does not have a converging force in the sub scanning direction. The main scanning direction of the fθ lens 218 is in a shape of a non-circular face, having a power of so-called fθ characteristics, such that beams move at a constant velocity on the respective photosensitive surfaces, with a rotation of the polygon mirror. The fθ lens 218 images the respective beams on the photosensitive surfaces in a spot shape, in cooperation with the toroidal lenses 219, 220, 221, and 222 disposed for each beam, and having an optical face tangle error correction function, thereby forming optical scanning units that records four latent images at the same time.

In the respective optical scanning units, a plurality of turning mirrors are arranged so that the optical path lengths of the respective light beams from the polygon mirror to the photosensitive drum surfaces agree with each other, and the incident positions and the incident angles to the respective photosensitive drums arranged at an equal interval become equal. The optical path is explained for each optical scanning unit. The light beam emitted from the semiconductor laser 201 is deflected by the uppermost surface of the polygon mirror 213, passes through the fθ lens 218, and is reflected by the first turning mirror 223 and guided to the photosensitive 101 via the toroidal lens 219, thereby forming a yellow image as the first optical scanning unit.

The light beam emitted from the semiconductor laser 202 is deflected by the second-stage surface of the polygon mirror, passes through the fθ lens 218, and is reflected by the first turning mirror 224, reflected by the second turning mirror 227 via the toroidal lens 220, and guided to the photosensitive 102, thereby forming a magenta image as the second optical scanning unit.

In these optical scanners, the turning mirrors 224, 225, and 226 constitute a beam turning unit, which sequentially separates the beams in sequence in the sub scanning direction along the flow of the beams, such that at first, a beam from the semiconductor laser 204 lastly coupled by the beam merging unit is separated, and then a beam from the semiconductor laser 203 is separated.

In the illustrated embodiment, the reflection angle of the respective turning mirrors have the following relationship, so that the optical path goes in under the bottom side of a polygon motor 106, by turning back the beams in the order close to the bottom surface of the housing, to reduce the size of the whole housing 110:

$\beta 1 < \beta 2 < \beta 3 < \beta 4$, $\beta 4 - \beta 1 < 90°$.

The four optical scanning units are housed in a single housing 110, as illustrated in FIG. 17.

The polygon motor 106 in the illustrated embodiment is a hydrodynamic air bearing type, and formed by inserting a rotor equipped with a cylindrical sleeve 109 formed by digging out the central part of the polygon mirror 213, into a fixed shaft 108 arranged in a standing condition on a base 107 fixed to the housing 110, and having herringbone grooves on the outer circumference. An annular magnet 111 is disposed at the lower part of the rotor, and the rotor is rotated by the magnet 111 and a magnetic coil 112 opposite to the magnet in the circumferential direction.

The fθ lens and the toroidal lens are fixed to a predetermined position of the housing 110, by bonding, pressing by a plate spring, or the like.

A synchronous detection sensor 230 that turns back the light beams in a part of the dustproof glass 234 and receives light, on the scanning start side of the image recording region, is disposed in the first optical scanning unit. The write start timing in the main scanning direction is planned in the respective scanning units, based on the detection signal.

The transfer belt 105 is rotated by three rollers including a drive roller and driven rollers, so that toner images are sequentially transferred from the respective photosensitive drums. At the time of transfer of the toner images, the resist position is aligned by the write start timing in the sub scanning direction, and the respective toner images are superposed on each other.

As explained above, the resist position is regularly adjusted, and a detector that reads the reference position of each image to be formed is disposed at opposite ends of the transfer belt 105. The detector has an LED element 231 for illumination, a photo sensor 232 that receives reflected light, and a pair of condenser lenses 233. Detected patterns formed by respective toner images of a reference color (black) and other colors (cyan, magenta, and yellow) formed parallel with each other, in the illustrated embodiment, patterns inclined by 45 degrees from the main scanning direction are read, a resist deviation in the sub scanning direction is calculated from the detection timing, and the write start timing in the sub scanning direction is adjusted by the respective optical scanning units based on the detection result, on every other surface of the polygon mirror, that is, by designating one scan line pitch P as a unit.

The dustproof glasses 25, 236, and 237 are mounted to a cover, which covers the bottom side of the housing 110.

Figure 18:
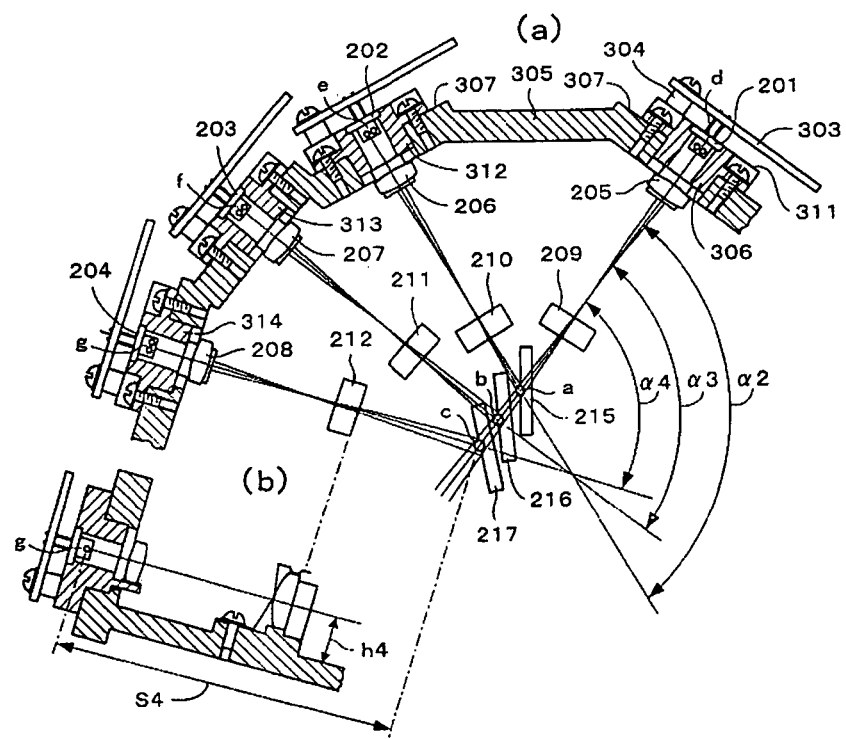
FIG. 18 is a plan view illustrating a light source section in the embodiment.

FIG. 18 is a plan view illustrating a light source section in the second embodiment.

Figure 19:
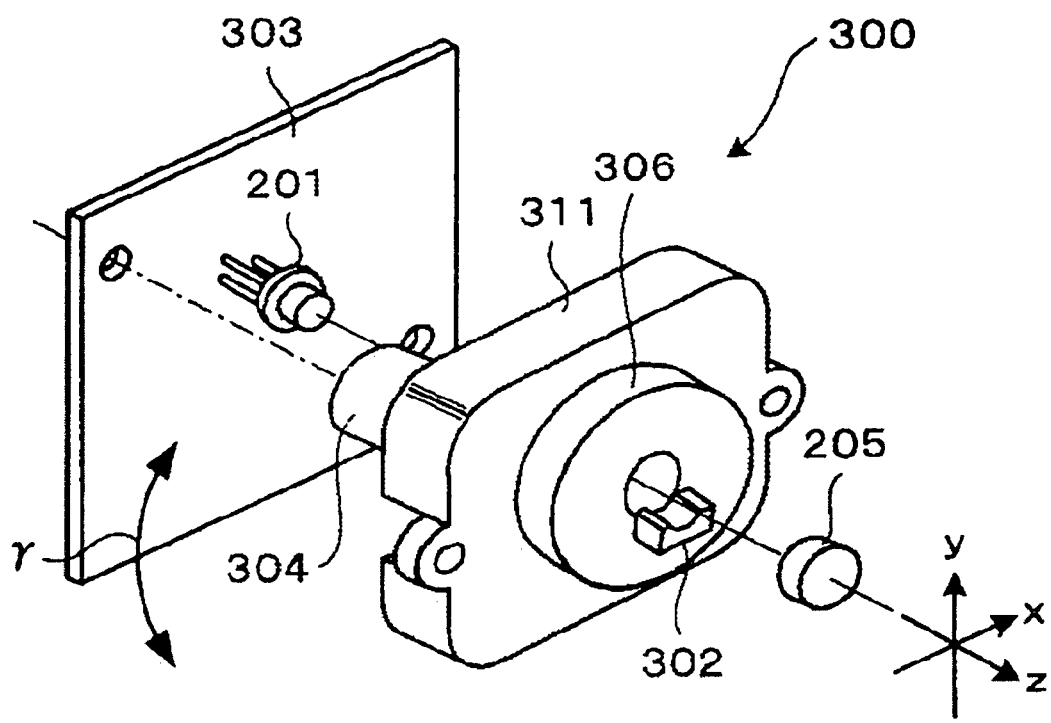
FIG. 19 is a perspective view illustrating a light source unit.

FIG. 19 is a perspective view illustrating a light source unit.

In FIGS. 18 and 19, reference sign 300 denotes a light source unit, 302 denotes a protrusion, 303 denotes a printed board, 304 denotes a cylindrical pedestal, 305 denotes a wall of the housing, 306 denotes a cylindrical protrusion, 307 denotes an abutting surface on the housing side, and 311, 312, 313, and 314 denote support members.

For the semiconductor lasers 201, 202, 203, and 204, a so-called semiconductor laser array is used, in which two light emission sources are formed monolithically on the same plane and away from each other by several tens micrometers. The respective semiconductor lasers are press-fitted and fixed to the support members 311, 312, 313, and 314, by fitting the outer circumference of the package so as to be symmetrical with respect to the emission axis. The coupling lenses 205, 206, 207, and 208 are fixed by photo-curing to the protrusion 302, on which semi-circular grooves are formed back to back on the protrusion 302 provided in the respective support members, by filling a UV hardening-type adhesive in a gap between the outer circumference of the lens and the groove, with the position on an xy plane (a plane orthogonal to the emission axis) adjusted so that the optical axis agrees with the respective emission axes, and the position in a z direction (direction of optical axis) adjusted so that the emitted beams become parallel beams.

On the rear face of each semiconductor laser, a light source unit 300 is formed by fixing by a screw and mounting a printed board 303 having a drive circuit formed thereon on two cylindrical pedestals 304 arranged in a standing condition on the support member, inserting lead terminals of each semiconductor laser into a through hole and applying solder. The respective light source units have the same configuration.

The light source units are positioned in an engaging hole provided on a wall 305 of the housing, on the basis of a cylindrical protrusion 306, bumped against an abutting surface 307 orthogonal to the emission axis and fixed by screwing, and the heights of the respective emission axes are set by making the height h from the bottom of the housing of the engaging hole different from each other.

In the example, the light source units are arranged such that as the turning positions a, b, and c at the beam merging unit become closer to the polygon mirror 213, the reflection angles of the reflecting mirrors 215, 216, and 217 become acute, that is, there is a relationship of $\alpha 2 > \alpha 3 > \alpha 4$.

At the same time, by setting the positions of the reflecting mirrors far from the polygon mirror 213 sequentially, the distance from the turning point to a light emission point can be set as:

$$S2(ae) > S3(bf) > S4(cg).$$

Since the emission axes of the respective light source units can be arranged radially, and the abutting surface 307 of the housing, against which the light source units are bumped, can be arranged stepwise, the flange portion of the adjacent light source units are on different levels in the direction of optical axis, and can be disposed in the main scanning direction so as not to interfere with each other. Further, by setting one side of the printed board to be mounted at the rear thereof so as to overlap on the adjacent light source unit, the space can be efficiently used.

Figure 20A:
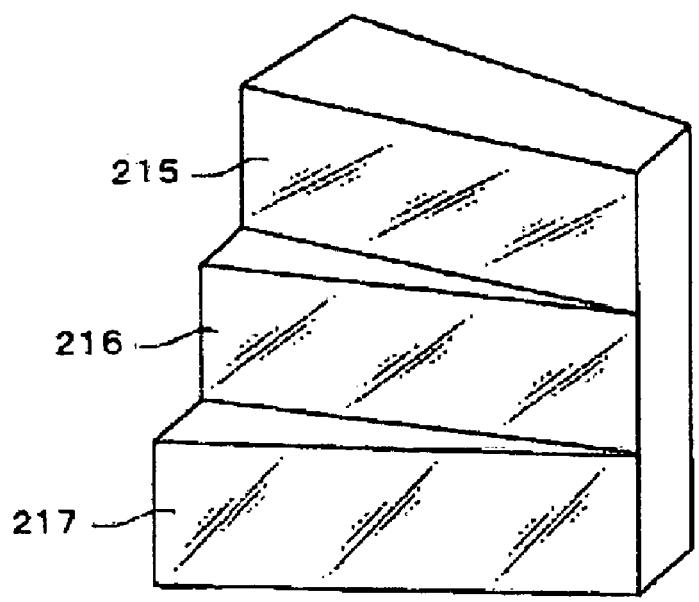
FIGS. 20A and 20B illustrate a specific configuration example of the beam merging unit.
Figure 20B:
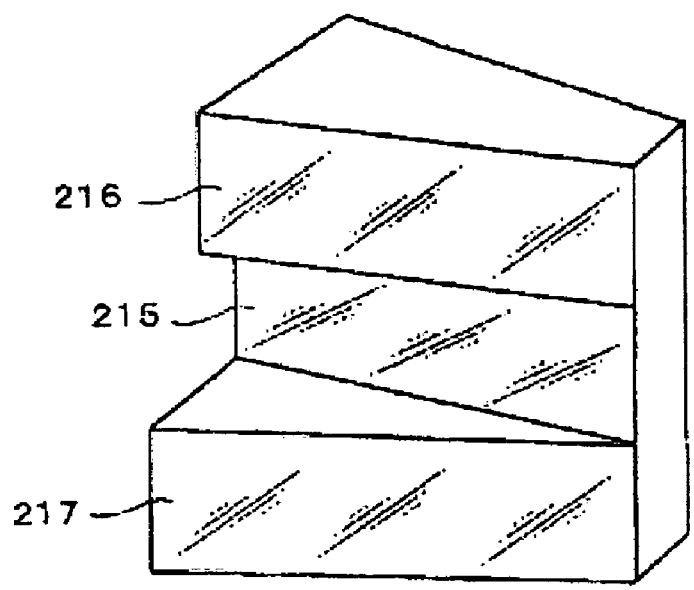

FIGS. 20A and 20B illustrate a specific configuration example of the beam merging unit. FIG. 20A illustrates an example in which the inclination of the reflecting mirrors is in order of height of the beams, and FIG. 20B illustrates an example in which the inclination of the reflecting mirrors is changed alternately.

The configuration illustrated in FIG. 20A is easy to form, but since the adjacent light sources and cylindrical lenses tend to come close, and when the respective parts cannot be made small, the whole configuration becomes large.

In the configuration illustrated in FIG. 20B, the sub scanning direction (the height direction in the figure) of the adjacent light sources and cylindrical lenses are away from each other. With regard to at least the light sources 203 and 204, these are adjacent as seen in plan view, but since a light source 202 is disposed therebetween in the height direction, mutual interference such that in the arrangement of the light sources, the respective light sources bump against each other hardly occurs. Therefore, the arrangement as seen in the main scanning direction, illustrated in FIG. 18, becomes easy, and the apparatus can be made compact. This effect can be also applied to the cylindrical lenses 211 and 212.

Thus, if the respective reflecting mirrors 215, 216, and 217 are formed of an integral member, since individual positioning is not necessary, high precision can be obtained, while keeping the configuration simple. The beam from the semiconductor laser 201 passes above the reflecting mirror 215 in FIG. 20A. However, when the configuration is such that the beam from the semiconductor laser 201 is also turned back, another reflecting mirror needs only to be formed integrally on the reflecting mirror 215. The beam from the semiconductor laser 201 is not necessarily made to pass above the reflecting mirror 215. The overall configuration may be such that the beam from the semiconductor laser 201 passes under the reflecting mirror 217.

Figure 21:
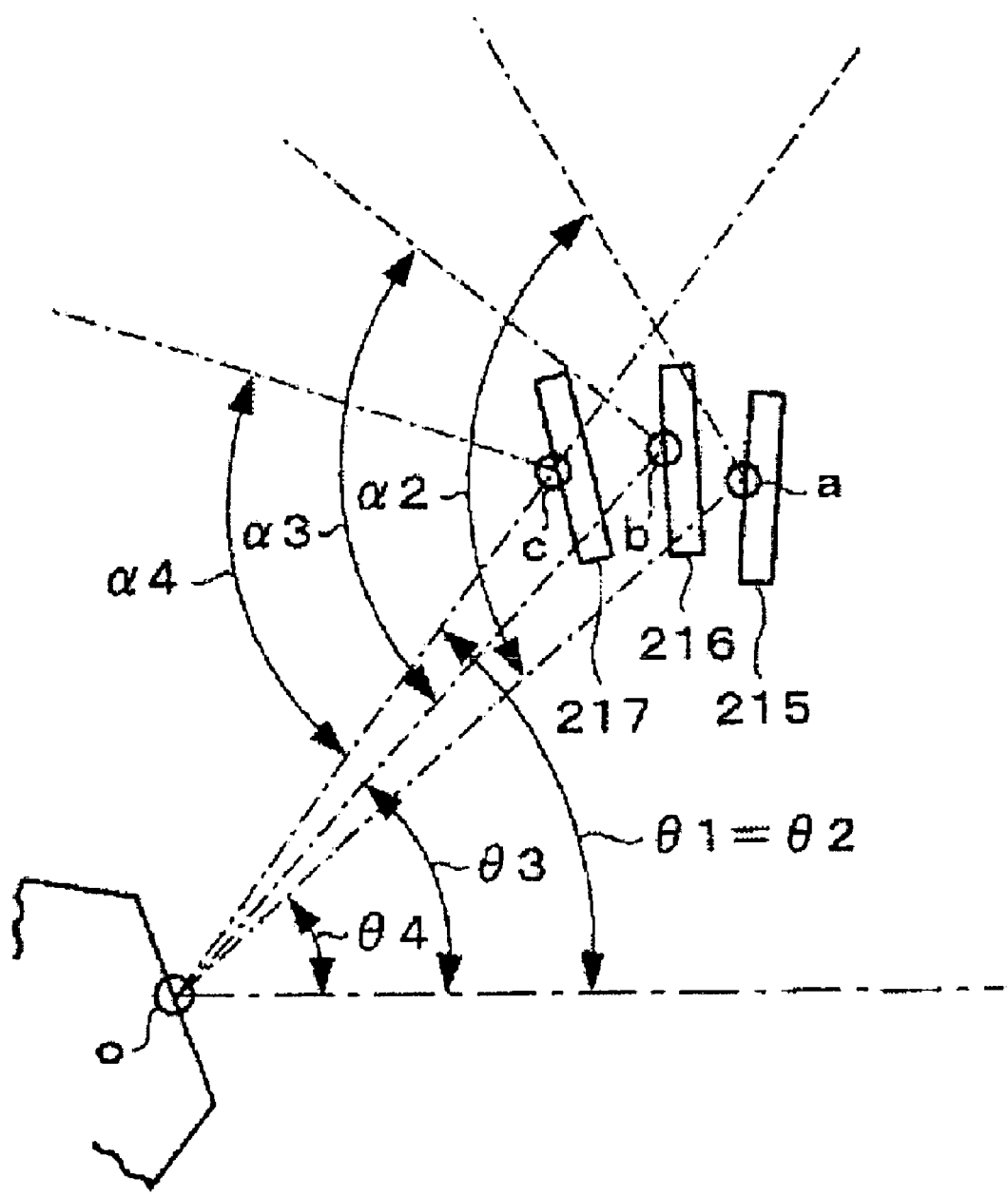
FIG. 21 illustrates another example of the beam merging unit.

FIG. 21 illustrates another example of the beam merging unit.

In the previous example, the optical paths entering into the polygon mirror are aligned on the same sub scanning cross section. However, as in the example illustrated in FIG. 21, the optical paths may be aligned on the same sub scanning cross section only at the deflection point, and may be allowed to enter into the polygon mirror at different angles in the main scanning direction. Also in this example, the integral reflecting mirror as illustrated in FIGS. 20A and 20B can be used.

Generally, when the reflection angle of the reflecting mirror increases, the wave front aberration increases, and the beam spot diameter on the photosensitive surface is likely to increase. A difference in the reflection angles of the reflecting mirrors 215, 216, and 217 can be reduced to improve thickening of the beam spot diameter, by setting the respective incident angles (angles between the incident optical path and the optical path from the deflection point to the central image height) more acute, as the turning positions in the beam merging unit become away from the deflection point, that is, by having a relationship of: $\theta 2 < \theta 3 < \theta 4 = 74$ 1.

However, in this case, since the main scanning start timing is different for each beam, it is desired not to increase the difference in incident angles too much.

Figure 22:
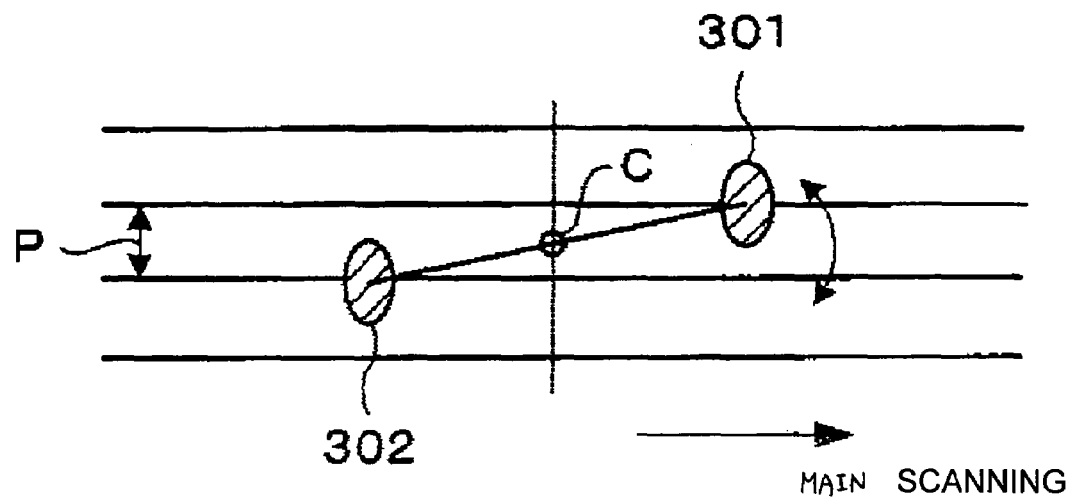
FIG. 22 illustrates a beam spot on a photosensitive surface by each semiconductor laser.

FIG. 22 illustrates a beam spot on the photosensitive surface by each semiconductor laser.

In FIG. 22, reference signs 301 and 302 denote beam spots on the photosensitive surface.

When the light source unit 300 is mounted by bumping it against the abutting surface 307 of the housing, it can be adjusted to a predetermined sub scanning pitch P, by changing the angle of inclination, $\gamma$, on the xy plane.

When it is assumed that the lateral magnification in the sub scanning of the whole optical system including the coupling lenses, the fθ lens, and the toroidal lenses is $\zeta$, and the pitch of the light emission sources is d, the interval P between the beam spots 301 and 302 in the sub scanning direction is expressed by $P = \zeta \cdot d \cdot \sin \gamma$, and a plurality of adjacent lines are simultaneously scanned, according to the pixel pitch P corresponding to the recording density, by changing the angle of inclination, $\gamma$.

Figure 23:
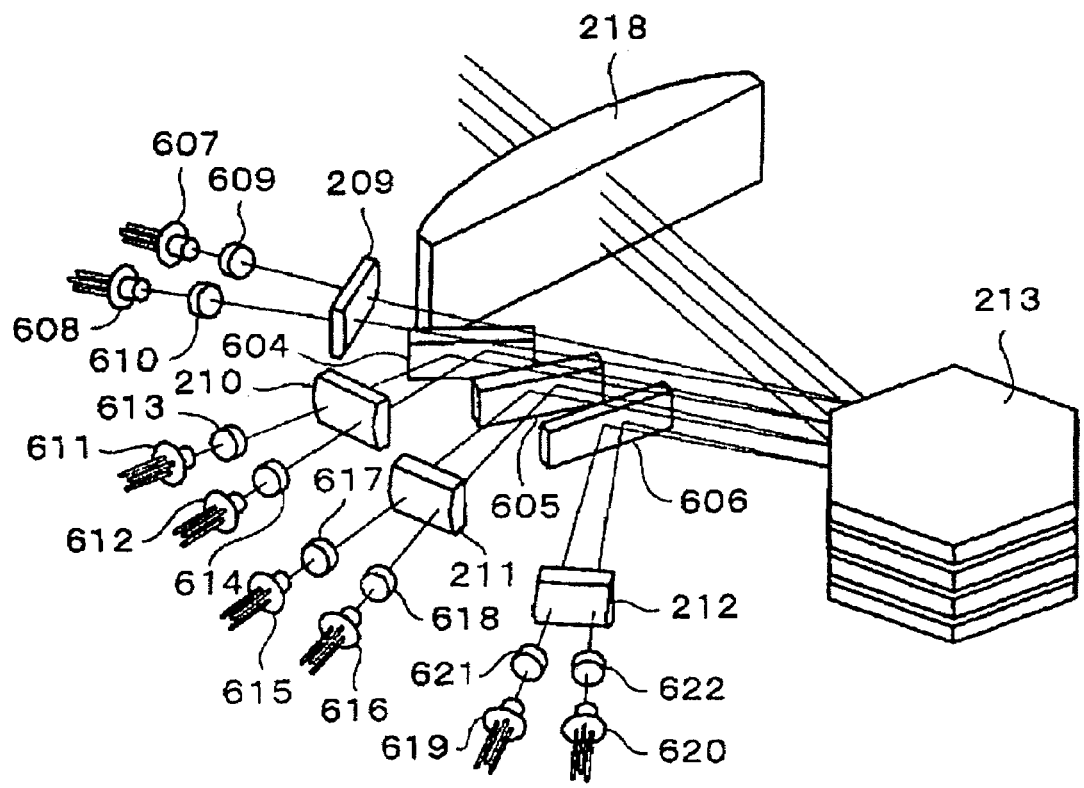
FIG. 23 is a block diagram of the light source section according to another example.

FIG. 23 is a block diagram of the light source section in another example.

Figure 24:
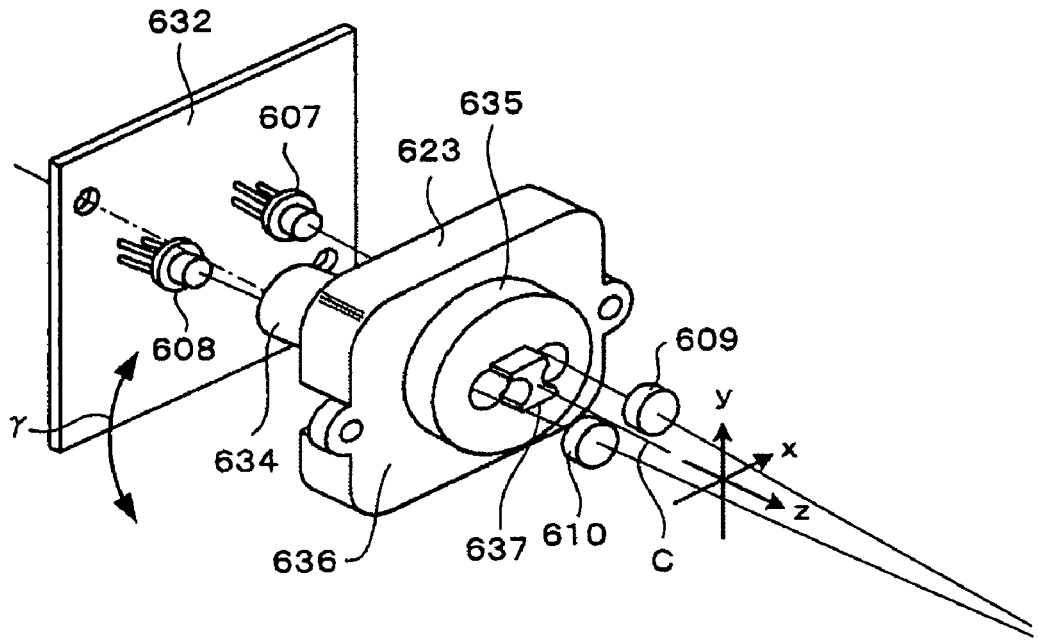
FIG. 24 is a perspective view of the light source unit illustrated in FIG. 23.

FIG. 24 is a perspective view of the light source unit illustrated in FIG. 23.

In FIGS. 23 and 24, reference sign 600 denotes a light source unit, 604, 605, and 606 denote reflecting mirrors in which respective planes have different reflection angles, 607, 608, 611, 612, 615, 616, 619, and 620 denote semiconductor lasers, 609, 610, 613, 614, 617, 618, 621, and 622 denote coupling lenses, 623 denotes a support member, 627 denotes a base member, 634 denotes a cylindrical pedestal, 635 denotes a cylindrical portion, 636 denotes an abutting surface, and 637 denotes a protrusion.

FIG. 23 illustrates an example in which a plurality of semiconductor lasers is provided for each color. According to this example, when the width of the light source unit increases, as illustrated in FIG. 24, the similar effect can be obtained.

The configuration of the beam merging unit is the same as in the previous example, and comprises reflecting mirrors 604, 605, and 606 in which respective planes have different reflection angles. The semiconductor lasers 607, 608, 611, 612, 615, 616, 619, and 620, and the coupling lenses 609, 610, 613, 614, 617, 618, 621, and 622 are disposed in two sets for each color scanning unit, symmetrically in the main scanning direction with respect to the emission axes. The semiconductor laser is press-fitted to each support member 623, by fitting the outer circumference of the package. The coupling lenses are fixed by photo-curing to a protrusion 637, on which a pair of semi-circular grooves are formed back to back on the protrusion 637, by filling a UV hardening-type adhesive in a gap between the outer circumference of the lens and the groove, with the position in the direction of optical axis adjusted so that the emitted beams become parallel beams.

The respective optical axes are inclined so as to be in a direction crossing each other with respect to an emission axis C. In this example, the inclination of the support member is set such that this crossing position is in the vicinity of the reference reflection position of the polygon mirror.

The printed board 632 on which a light source drive circuit is formed is mounted by screwing to a cylindrical pedestal 634 arranged in a standing condition on the base member 627, to integrally form the light source unit 600.

As in the previous example, the light source unit 600 can be adapted to higher speed and higher density image recording, by inserting the cylindrical portion 635 in each support member into an engaging hole formed on the wall of the housing, with the height thereof made different, bumping the abutting surface 636 against the wall, and screwing to increase the number of beams for each color scanning unit.

Figure 25:
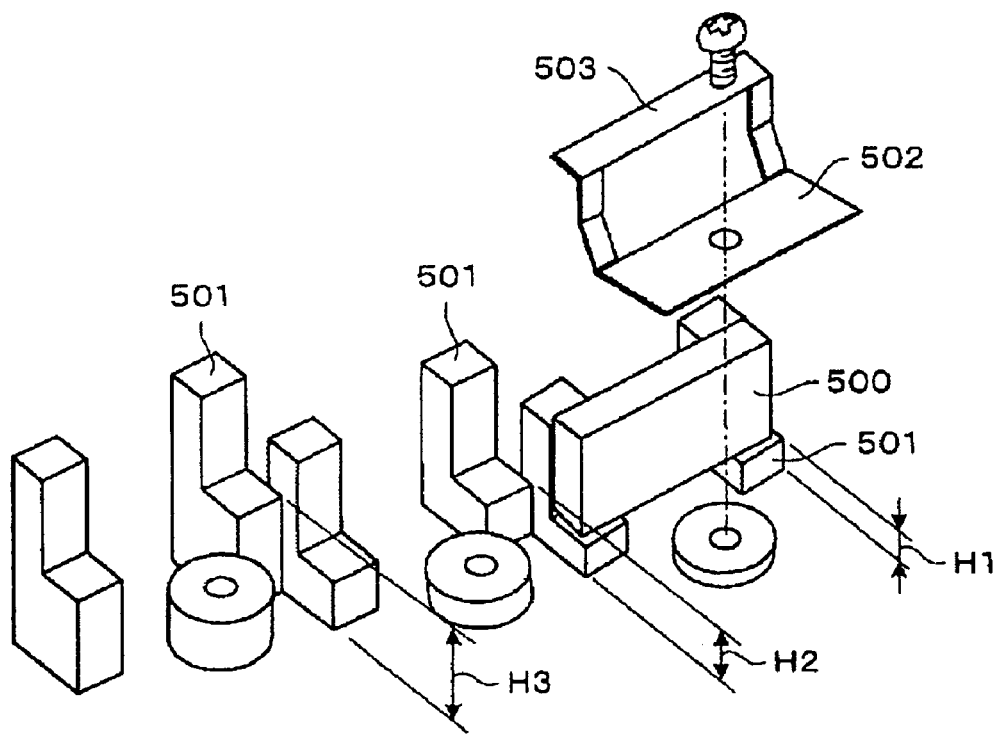
FIG. 25 illustrates a support section of the reflecting mirror in the beam merging unit.

FIG. 25 illustrates the support section of the reflecting mirror in the beam merging unit.

In FIG. 25, reference sign 500 denotes a reflecting mirror as the beam merging unit, 501 denotes an attachment section, 502 denotes a plate spring, and 503 denotes an end bent portion.

Each reflecting mirror is installed on the L-shape attachment portion 501 formed on the bottom of the housing, with the reflecting mirror pressed against a vertical plane of the attachment portion 501 by a plate spring 502. An upward deviation of the reflecting mirror is regulated by the end bent portion 503 of the plate spring, so that a part of the reflecting mirror does not interfere with the beams passing above the reflecting mirror.

The reflecting mirrors can be arranged according to the beam interval in the sub scanning direction, by setting the installation height h of the L-shape attachment portion 501 stepwise, and can be supported by the similar manner, with the pressing direction aligned to the same side of the housing.

Figure 26:
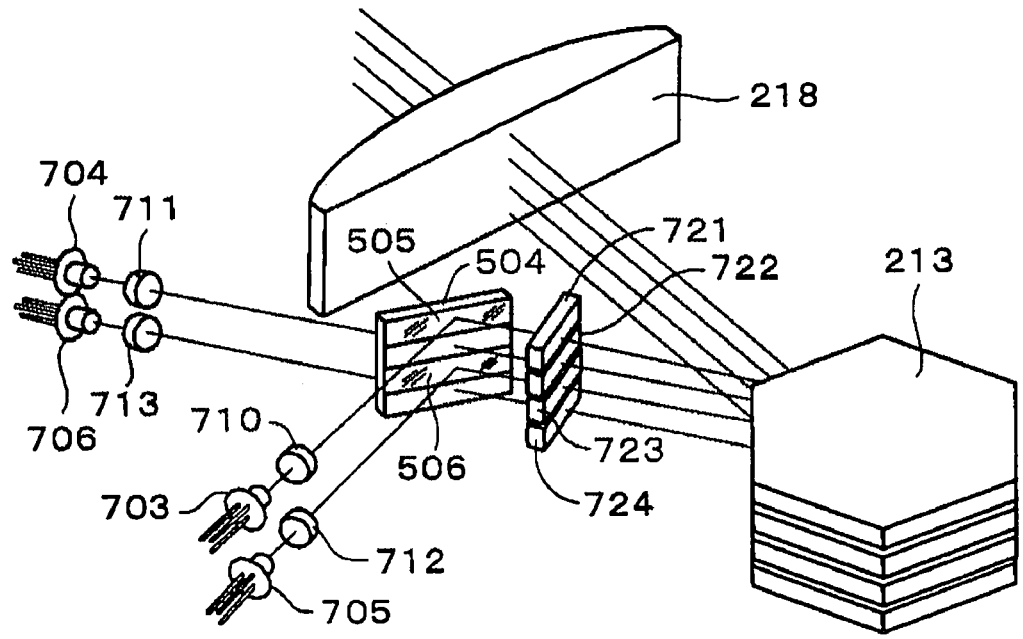
FIG. 26 illustrates still another example of the beam merging unit.

FIG. 26 illustrates still another example of the beam merging unit.

In FIG. 26, reference sign 504 denotes a flat glass as the beam merging unit, 505 and 506 denote a reflecting mirror section, 700 denotes a light source unit, 703, 704, 705, and 706 denote semiconductor lasers, 710, 711, 712, and 713 denote coupling lenses, and 721, 722, 723, and 724 denotes a cylindrical lens.

In this example, the reflecting mirror sections 505 and 506 are formed in layering in the sub scanning direction on the surface of the flat glass 504 by partial vacuum evaporation, so that the beams can pass through above and below the reflecting mirror section. The beam merging unit is formed of a metal plate with an aluminum reflection coating, and a beam transmission section may have a window hole.

When there are only three beams, as three colors, only the center thereof is turned into a reflecting mirror, and the other two beams are allowed to pass through the transmission areas. The relation of the other way around is also possible.

When the beam interval to be arranged in the sub scanning direction is narrowed, it is difficult to arrange the semiconductor lasers and the coupling lenses adjacent to each other vertically. However, if the sizes of the semiconductor laser and the coupling lens are such that these can be arranged vertically, alternately in sequence in the sub scanning direction, that is, with an interval 2L, or such that these can be arranged vertically, every two beams (the uppermost beam and the lowermost beam), that is, with an interval 3L, the light source unit can be consolidated, as described below, and as a result, the beam merging unit can have a simpler configuration.

This example shows the former case, wherein the beam interval is set to 2L in the sub scanning direction and integrated, as illustrated in FIG. 26, with the beams from one light source unit allowed to transmit, and the beams from the other light source unit being reflected.

Figure 27:
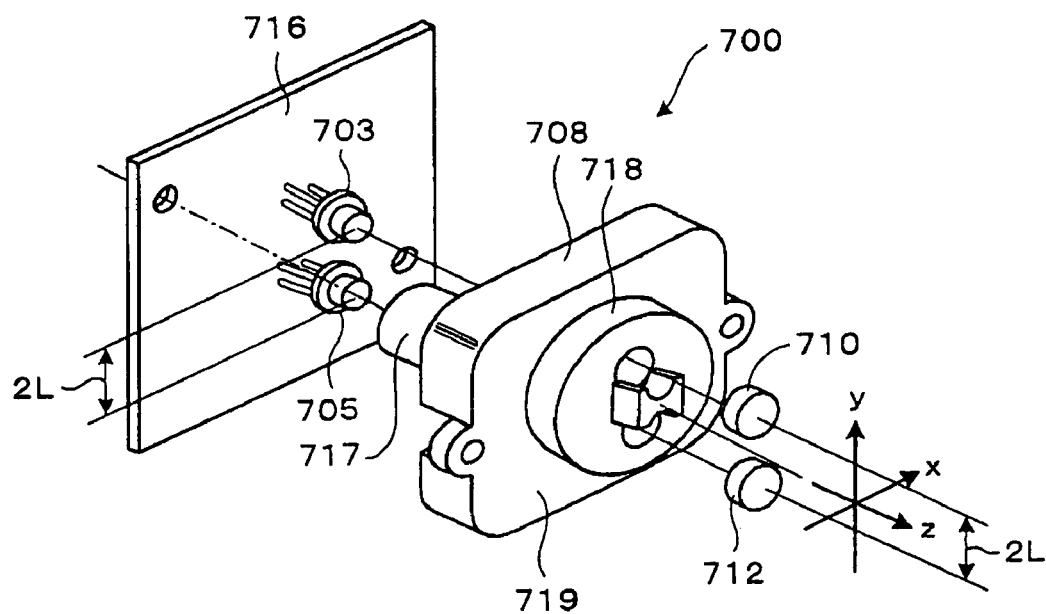
FIG. 27 illustrates an example in which the light source units are disposed vertically.

FIG. 27 illustrates an example in which the light source units are disposed vertically.

In FIG. 27, reference sign 708 denotes a support member, 716 denotes a printed board, 717 denotes a cylindrical pedestal, 718 denotes a cylindrical protrusion, and 719 denotes an abutting surface.

In this example, the respective semiconductor lasers are arranged in the sub scanning direction, and semiconductor laser fitting holes in the support member, and semi-circular grooves for joining the coupling lenses are designed coaxially, so that the optical axes become parallel.

Semiconductor lasers 703, 704, 705, and 706 corresponding to each color are divided into two for two colors, and held by a common support member 708 and a support member (not illustrated), together with coupling lenses 710, 711, 712, and 713, respectively forming a pair.

The interval between the semiconductor lasers on the respective support members is 2L, and the semiconductor lasers 703 and 705, the coupling lenses 710 and 712 are fixed to the support member 708, and the semiconductor lasers 704 and 706, and the coupling lenses 711 and 713 are fixed to the support member similar to the support member 708. The printed board 716 having a drive circuit for the semiconductor laser formed thereon is fixed by screwing to the cylindrical pedestal 717 arranged in a standing condition on the base member 714, to integrally form a light source unit.

The light source unit 700 is positioned on the wall of the housing, on the basis of the cylindrical protrusion 718, and fixed by screwing, with the abutting surface 719 orthogonal to the emission axis bumped against the wall.

FIGS. 28A and 28B illustrate an example of a cylindrical lens holding unit.

In FIGS. 28A and 28B, reference sign 725 denotes a support member, 726 denotes a pair of snap hooks, 727 denotes a guide portion, 728 denotes an abutting surface, 729 denotes a supporting brim, 730 denotes a support, 731 denotes an engaging portion, and 732 denotes a beam passing window.

In the example illustrated in FIG. 26, the respective beams are coupled on the upstream side of a cylindrical lens group constituting the optical system before beam deflection, and the cylindrical lenses 721, 722, 723, and 724 corresponding to the respective beams are arranged at an equal interval L and integrally held, with the upper and lower sides cut and narrowed in the sub scanning direction.

The cylindrical lenses 721, 722, 723, and 724 have a flat surface on the emission side orthogonal to the emission axis, and a cylindrical surface having a curvature only in the sub scanning direction on the incident side. The power of the respective curvatures are set so that the respective beams are converged on the polygon mirror surface, and are respectively formed of glass.

As illustrated in FIG. 28, the support member 725 is obtained by integrally forming, from resin, a pair of snap hooks 726 that vertically hold the respective cylindrical lenses, the guide portion 727 for positioning the upper and lower ends in the sub scanning direction, the abutting surface 728 abutting against the flat surface side, the supporting brim 729 press-fitted between the supports 730 formed in the housing for positioning in the direction of optical axis, and the engaging portion 731 that engages with the backside of the bottom of the housing through a through hole at the time of press-fit and maintains the condition with the bottom end abutting against the bottom of the housing.

The supporting brim 729 has a flat surface on the emission face side, and a semi-circular protrusion on the incident plane, and at the time of press-fit, the emission face side is bumped against the support to perform positioning and held by the support. Reference sign 732 is a beam passing window, and may be formed of a tabular transparent member for transmission or may be a through hole.

FIGS. 29A and 29B are cross sections illustrating an example in which beam passing windows are curved surfaces having a negative curvature.

FIG. 29A illustrates an example in which the cylindrical lens is held and supported by the snap hook, and FIG. 29B illustrates an example in which the cylindrical lens can be adjusted along the guide portion provided between the lenses, wherein the cylindrical lenses are joined by an UV adhesive, with the converged position between the respective lenses adjusted.

When the fθ lens is formed by resin molding, the refractive index fluctuates with a change in the environmental temperature, and the focal position also changes. However, by combining transparent resin-molded lenses having a negative refracting power, the fluctuation direction can be cancelled, thereby suppressing fluctuations in the beam imaging position on the photosensitive surface.

In this example, the beam passing window is a cylindrical surface having a negative curvature in the sub scanning direction, but may be a cylindrical surface or a spherical surface having a negative curvature in the main scanning direction.

Figure 30:
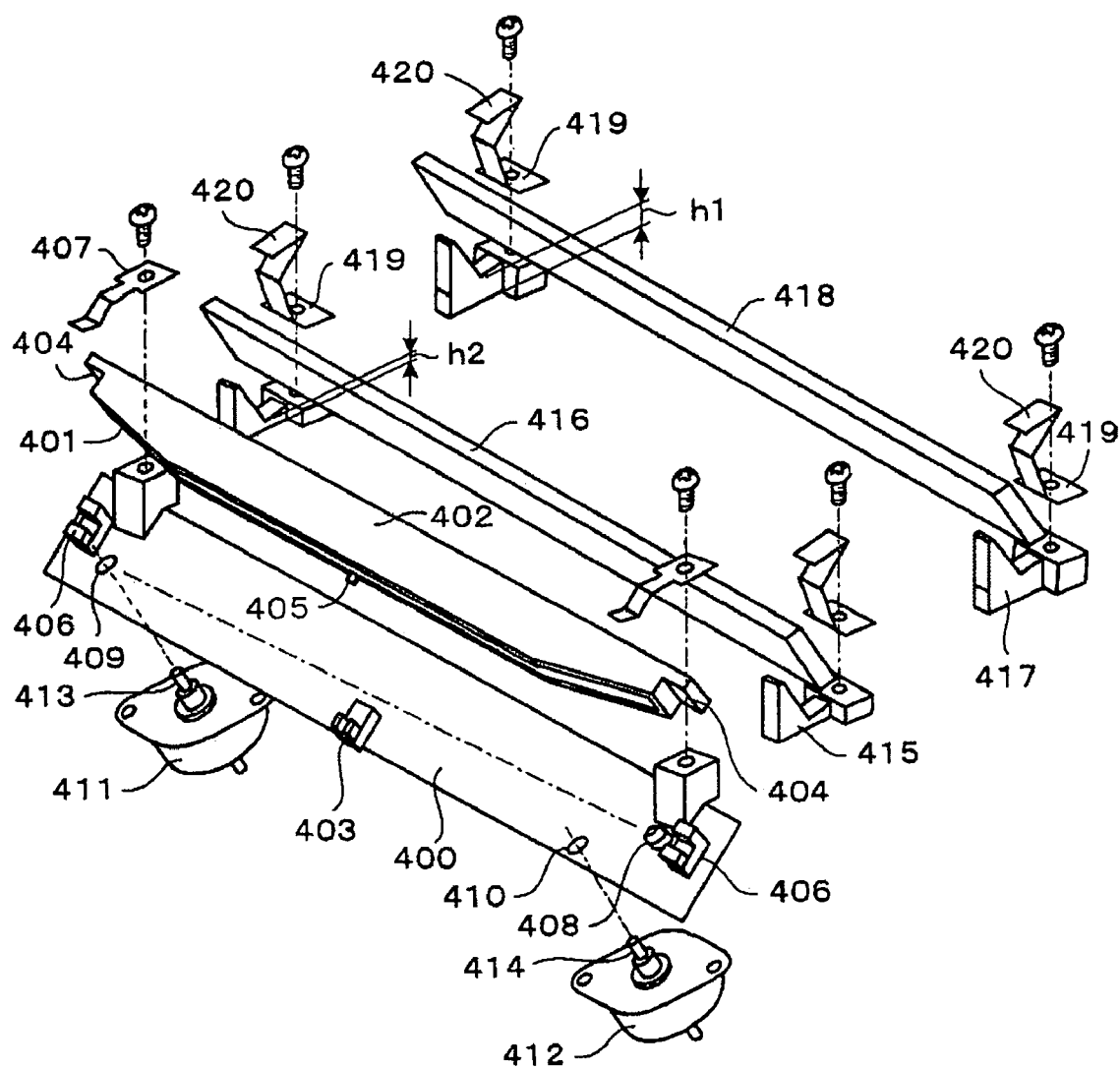
FIG. 30 illustrates still another example.

FIG. 30 illustrates still another example.

In FIG. 30, reference sign 400 denotes the bottom of an optical housing, 401 denotes a toroidal lens, 402 denotes a box-like rib, 403 denotes a concave portion, 404 denotes a flange portion, 405 denotes a protrusion, 406 denotes a concave portion, 407 denotes a plate spring, 408 denotes a protrusion, 409 and 410 denote a through hole, 411 and 412 denote a stepping motor, 413 and 414 denote the end of a shaft, 415 denotes a mirror attachment portion, 416 denotes a turning mirror, 417 denotes a mirror attachment portion, 418 denotes a turning mirror, 419 denotes a plate spring, and 420 denotes an end bent portion.

A mechanism for correcting the inclination and curvature of the scan line will be explained, with reference to this figure.

FIG. 30 illustrates a support portion of the toroidal lens 401 on the bottom 400 of the optical housing.

The respective toroidal lenses 401 are arranged opposite to the respective photosensitive drums, with the direction of optical axis and the sub scanning direction aligned on the bottom of the optical housing, so that the protrusion 405 provided in the central part of the box-like rib 402 is engaged with the concave portion 403 formed in the optical housing to regulate the main scanning direction (lengthwise direction), and the bottom ends of flange portions 404 provided at the opposite ends are similarly engaged with the concave portions 406, respectively, to regulate the direction of optical axis (widthwise direction).

Further, the lower face of the box-like rib 402 is supported such that the first supporting point is provided by drawing the lower face of the box-like rib 402 toward one end in the main scanning direction, and the incident side of the beams at the other end is designated as the second supporting point, and the emission side thereof is designated as the third supporting point, to support the rib 402 at three points, and pressed and supported by the plate spring 407 from above.

In this example, the box-like rib 402 is positioned by the protrusion 408 protruding from the bottom of the housing, designating the second supporting point as a reference bump, and at the first and the third supporting points, the ends 413 and 414 of the shafts extending from the stepping motors 411 and 412 are directly bumped from the back through the through holes 409 and 410. The shafts 413 and 414 are respectively a built-in feed screw, and the protruding quantity expands and contracts.

Figure 31:
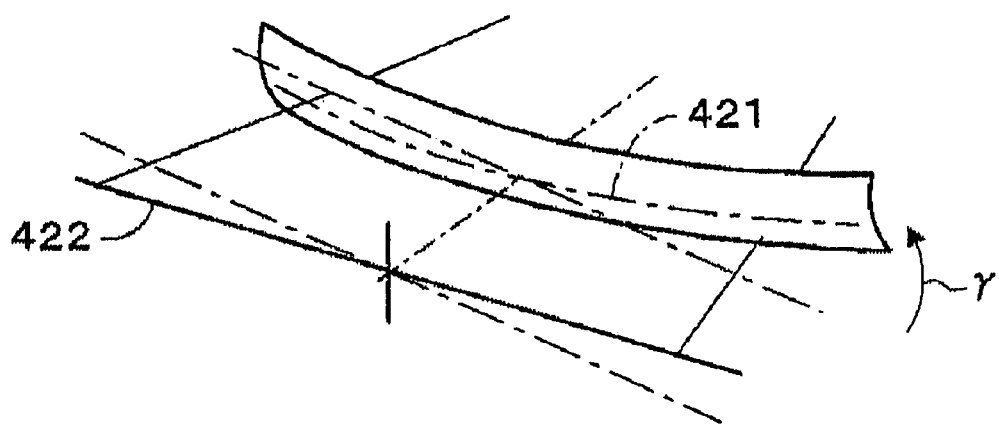
FIG. 31 is a diagram for explaining inclination adjustment of scan lines.

FIG. 31 is a diagram for explaining inclination adjustment of the scan lines.

In FIG. 31, reference sign 421 denotes a generatrix of the toroidal lens, and 422 denotes a focal line after the adjustment.

Here, if only the first supporting point is shifted, the toroidal lens 401 can be rotation-adjusted by an optional angle $\gamma$, within a plane orthogonal to the optical axis, about the axis of rotation connecting the second and the third supporting points. As illustrated in FIG. 31, the focal line 422 is inclined corresponding to the inclination of the generatrix 421 in the main scanning direction, and the scan line is inclined.

In FIG. 30, the general arrangement of the first, the second and the third supporting points is illustrated, but if it is set such that a line connecting the second supporting point and the third supporting point becomes parallel with the optical axis, when the first supporting point is shifted to change the lateral inclination, a change in the inclination back and force of the toroidal lens does not occur.

Figure 32:
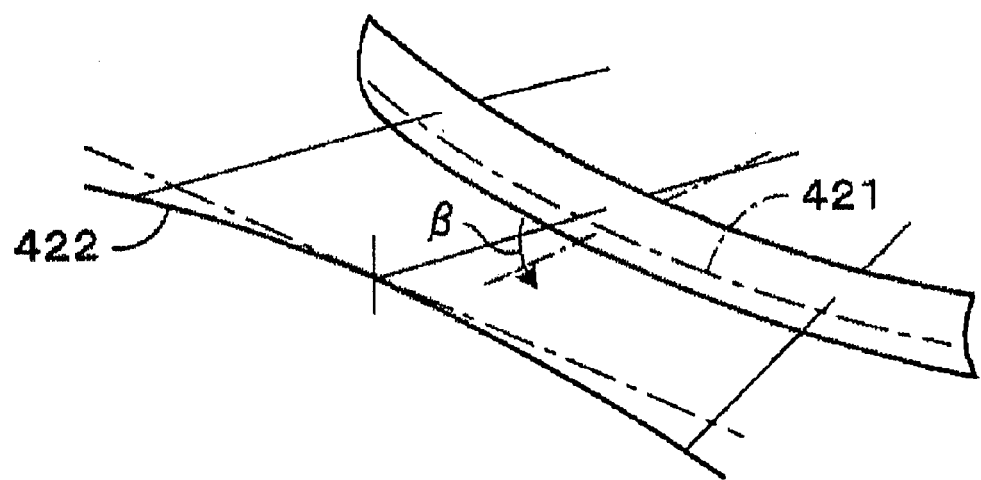
FIG. 32 is a diagram for explaining adjustment for making the scan lines curve in the image surface.

FIG. 32 is a diagram for explaining adjustment for making the scan lines curve in the image surface.

If only the third supporting point is shifted, the toroidal lens 401 can be rotation-adjusted by an optional angle $\beta$, in the sub scanning cross section including the optical axis. As illustrated in FIG. 32, the focal line 422 can be warped, according to the inclination of the curved surface, by allowing the beam to enter at a position where the eccentricity from the generatrix 421 is different in the main scanning direction. As a result, the warp is intentionally generated and corrected so as to cancel the curvature of the scan line resulting from a machining error or arrangement error of optical elements constituting the optical system, thereby enabling improvement of the linearity of the scan line.

If the line connecting the first supporting point and the second supporting point is arranged so as to be a direction orthogonal to the main scanning direction, a change in the focal line occurs symmetrically.

This adjustment mechanism may be equipped in a toroidal lens in other optical scanning units, excluding the one for black, as a reference color.

The axis of rotation connecting the first and the third supporting points is actually not orthogonal to the optical axis, but since the axis is sufficiently long, as compared with the intervals between the second and the third supporting points, it can be regarded as being substantially orthogonal to the optical axis.

In FIG. 32, reference signs 415 and 417 respectively denote attachment portions of the turning mirror 416 and 418, which are provided on the bottom of the housing in pair in the main scanning direction, so as to be supported by pressing the reflecting surface of the turning mirror to the inclined plane by the plate spring 419.

Further, an upward deviation is regulated by the end bending portion 420 of the plate spring, so that a part of the reflecting mirror does not interfere with the beams passing above the reflecting mirror.

The respective turning mirrors constituting the beam turning unit can be arranged by providing the installation height h of the attachment portion stepwise, and supported by the similar manner, with the pressing direction aligned to the same side of the housing.

The adjustment of inclination and curvature of the scan line is regularly performed as in the adjustment of the resist position, so as to be adapted to the use environment of the image formation apparatus, by using a preparation period before the printing job, or a waiting period between jobs. Based on the detection result by the detector, the scan lines of the respective colors are automatically corrected so as to be parallel with the black scan line, as a reference, and to equalize the bending direction and the bending quantity. By combining this automatic correction with the correction of the image write start timing, the images recorded in the respective stations can be superposed accurately, thereby enabling formation of a high quality color image without out of color registration.

Figure 33:
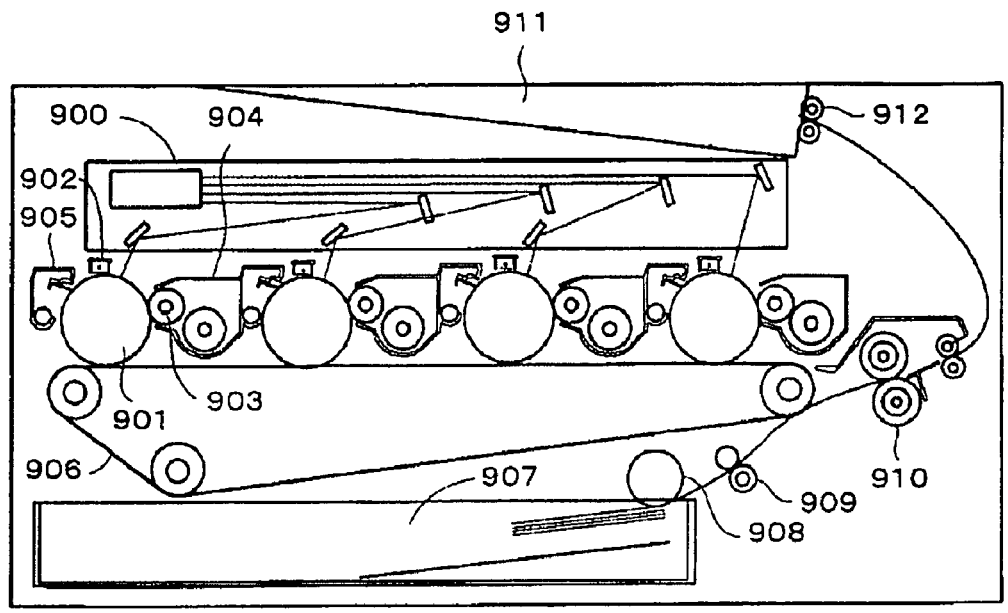
FIG. 33 illustrates an example of a color image formation apparatus equipped with the optical scanner of the present invention.

FIG. 33 illustrates an example of a color image formation apparatus equipped with the optical scanner of the present invention.

In FIG. 33, reference sign 900 denotes an optical scanner, 901 denotes a photosensitive drum, 902 denotes a charging charger, 903 denotes a developing roller, 904 denotes a toner cartridge, 905 denotes a cleaning case, 906 denotes a transfer belt, 907 denotes a paper feed tray, 908 denotes a paper feed roller, 909 denotes a resist roller pair, 910 denotes a fixing roller pair, 911 denotes a paper ejection tray, and 912 denotes a paper ejection roller pair.

The charging charger 902 that charges the surface of the photosensitive drum at a high voltage, the developing roller 903 that adheres the charged toner to an electrostatic latent image recorded by the optical scanner 900 to manifest an image, the toner cartridge 904 that supplies the toner to the developing roller, and the cleaning case 905 that scrapes and stores the toner remaining on the photosensitive drum 901 are respectively arranged around the photosensitive drum 901. Image recording is performed onto the photosensitive drum 901 for a plurality of lines, in this example, for two lines at the same time, by scanning for each plane of the polygon mirror.

The image forming stations are arranged in parallel in the moving direction of a transfer belt 906, and the yellow, magenta, cyan, and black toner images are sequentially transferred onto on the transfer belt, with the timing adjusted, and superposed on each other, thereby forming a color image.

The respective image forming stations have basically the same configuration, and only the toner color is different.

The recording paper is fed from the paper feed tray 907 by the paper feed roller 908, fed to an image position on the transfer belt 906, with the timing adjusted, by the resist roller pair 909, so that a color image is transferred to the transfer paper.

The transferred toner is fixed by the fixing roller 910, and the recording paper is ejected onto the paper ejection tray 911 by the ejection roller 912.

The third embodiment corresponds to the twenty-eighth to the thirty-second aspects.

Hereinafter, the terms, the "main scanning direction" and the "sub scanning direction", are according to the following way of thinking. Normally, the "main scanning direction" and the "sub scanning direction" stand for a direction in which the beam spot is scanned on the surface to be scanned, and a direction orthogonal to this direction. However, in the specification, directions corresponding to the main scanning direction and the sub scanning direction (on the surface to be scanned) in respective spots on the optical path are respectively referred to as the "main scanning direction" and the "sub scanning direction" (in a broad sense).

[1] EXAMPLE 1

Example Corresponding to the Twenty-eighth Aspect

Figure 34:
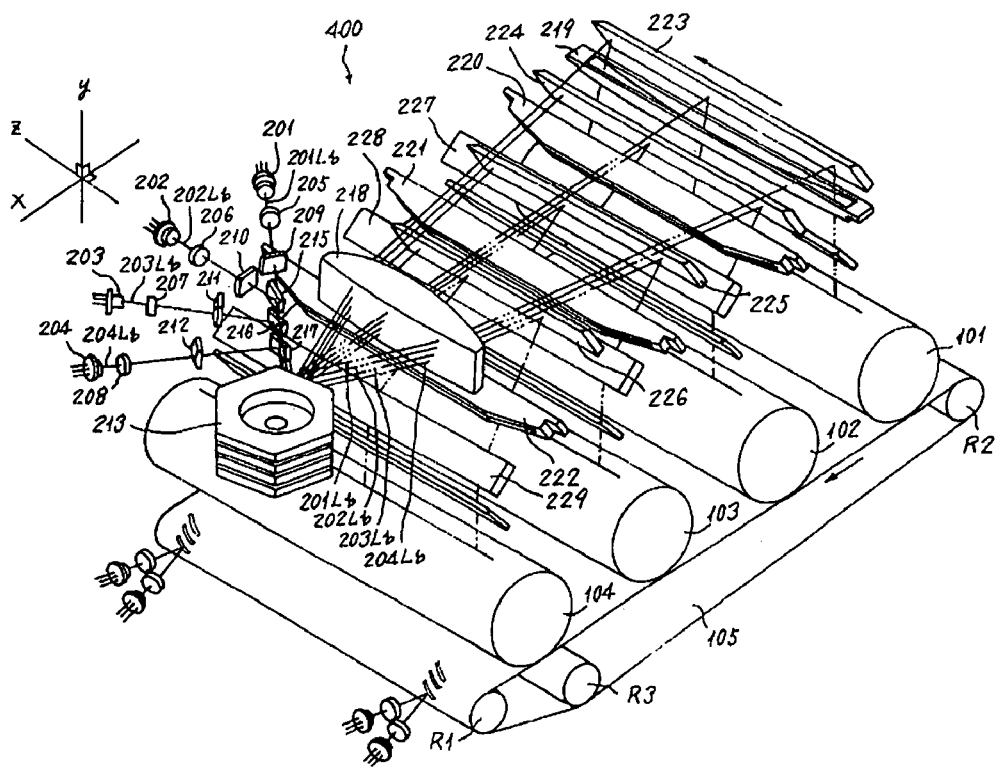
FIG. 34 is a perspective view illustrating the overall configuration of the optical scanner according to the third embodiment.
Figure 35:
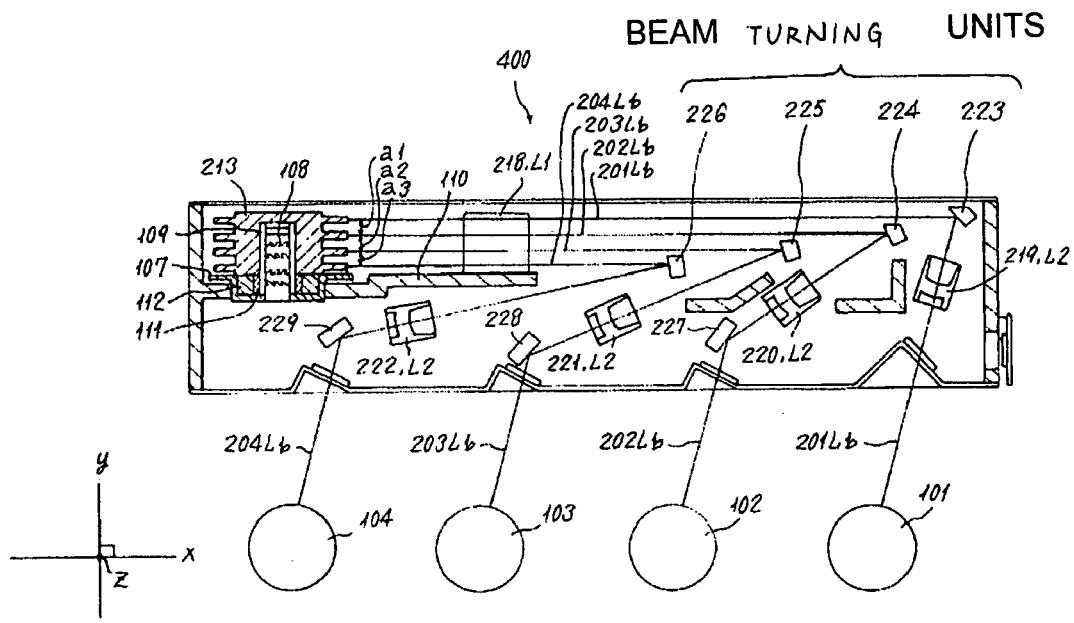
FIG. 35 is a cross section of the optical scanner according to the third embodiment.

FIG. 34 illustrates an optical scanner 400 according to the present invention, together with the photosensitive drums 101, 102, 103, and 104 as image carriers, and the transfer belt 105. This optical scanner is a type of scanning images formed on the four photosensitive drums 101, 102, 103, and 104, for four image stations, in one direction. FIG. 35 is a cross section of the main part of the optical scanner illustrated in FIG. 34.

The peripheral surfaces of the four photosensitive drums 101, 102, 103, and 104 constitute the surface to be scanned. These photosensitive drums 101 to 104 are arranged with an interval in an x-axis direction, with the axial direction thereof corresponding to the main scanning direction, and being parallel with a z-axis in the rectangular coordinates system. On the surface to be scanned, a direction orthogonal to the main scanning direction is the original sub scanning direction.

The respective bottom parts of the photosensitive drums 101 to 104 face the transfer belt 105 supported by supports rollers R1, R2, and R3 in the x-axis direction and provided in a tensioned state, and the transfer belt 105 is rotated such that the upper part thereof moves on the x-axis direction, in the direction indicated by arrow. The lower positions of the photosensitive drums 101 to 104 facing the transfer belt 105 constitute a transfer unit, and toner images (toner images of a different color by the photosensitive drums) formed on the respective photosensitive drums 101 to 104 are sequentially superposed and transferred onto a sheet-like medium (transfer paper) supported and fed by the transfer belt 105, at the respective transfer positions, to form a color image.

Prior to this, the optical scanner 400 scans respective photosensitive drums 101 to 104 with light beams containing color image information to form an electrostatic latent image thereon, respectively. These electrostatic latent images are visualized by toners according to the electrostatic development method by a development apparatus provided for each photosensitive drum, and a color toner image is respectively formed on the respective photosensitive drums.

In this example, in an image formation apparatus in which respective photosensitive drums having a surface to be scanned are respectively scanned to form an electrostatic latent image, these electrostatic latent images are visualized by color toners corresponding to the color image information included in the respective light beams, and these visual images are transferred onto a sheet-like medium, to obtain a color image, the optical scanner 400 is formed as a unit that scans the respective photosensitive drums by emitting a plurality of light beams. It is a matter of course that the optical scanner having a configuration corresponding to this optical scanner can be used for products such as a digital copying machine, a laser printer, and a laser facsimile.

In this example, the optical scanner 400 integrally constitutes the respective optical scanning units corresponding to the photosensitive drums 101 to 104, and scans a plurality of light beams at the same time on the same plane of a single deflection unit (polygon mirror 213).

In this example, a semiconductor laser is used as a light source, and a unit including a support member for supporting the semiconductor laser, a coupling lens, and a support section therefor is referred to as a light source unit. There are a type in which a single beam is emitted from one light source unit, and a type in which a plurality of beams is emitted. In any case, one photosensitive drum corresponds to one light source unit. In the explanation below, in order to avoid complexity, a type in which a single beam is emitted from one light source unit is used.

The respective semiconductor lasers 201, 202, 203, and 204 are arranged such that, for example in the example illustrated in FIGS. 34 and 35, an light beam emitting position of the semiconductor laser 201 occupies the highest position on the y-axis (in the vertical direction), and comes to a position away from the bottom of the housing, and other semiconductor lasers are arranged to a lower position, in order of semiconductor lasers 202, 203, and 204, so that the respective light beam emitting positions are different in the sub scanning direction. The light beam emitting direction is arranged radially in the main scanning direction. As seen in plan view, the arrangement position of the respective semiconductor lasers 202, 203, and 204 are shifted from each other so as to surround the deflection position of the light beams. The optical path lengths from the light emission points of the respective semiconductor lasers 202, 203, and 204 to the deflection points of the polygon mirror 213 are the same.

When the light beams from the respective semiconductor lasers 201, 202, 203, and 204 are denoted by 201Lb, 202Lb, 203Lb, and 204Lb, this order indicates an order of from a higher position to a lower position.

Figure 36:
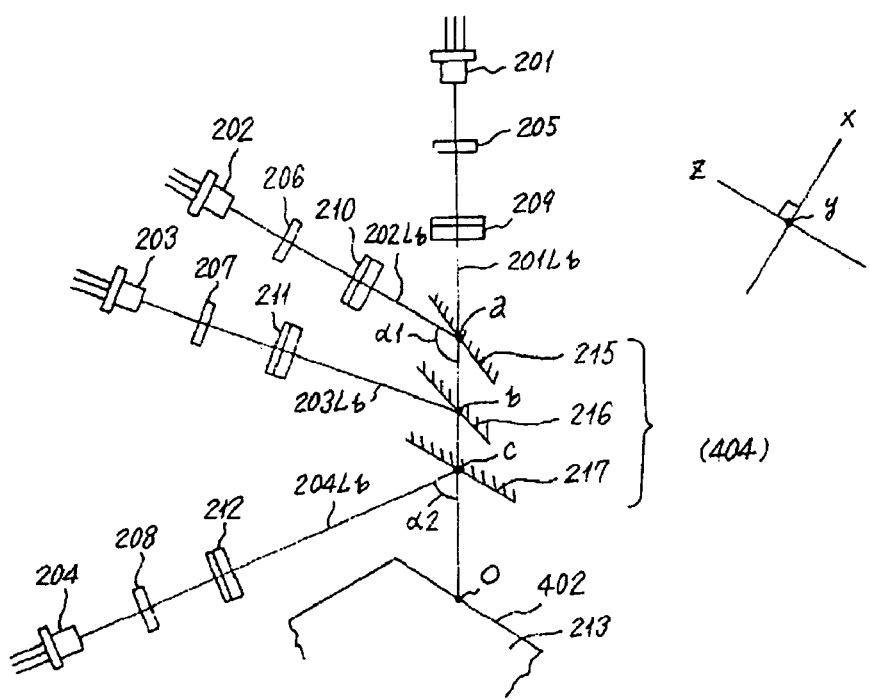
FIG. 36 is a plan view for explaining an optical system and an optical path from the light source to a polygon mirror.
Figure 40:
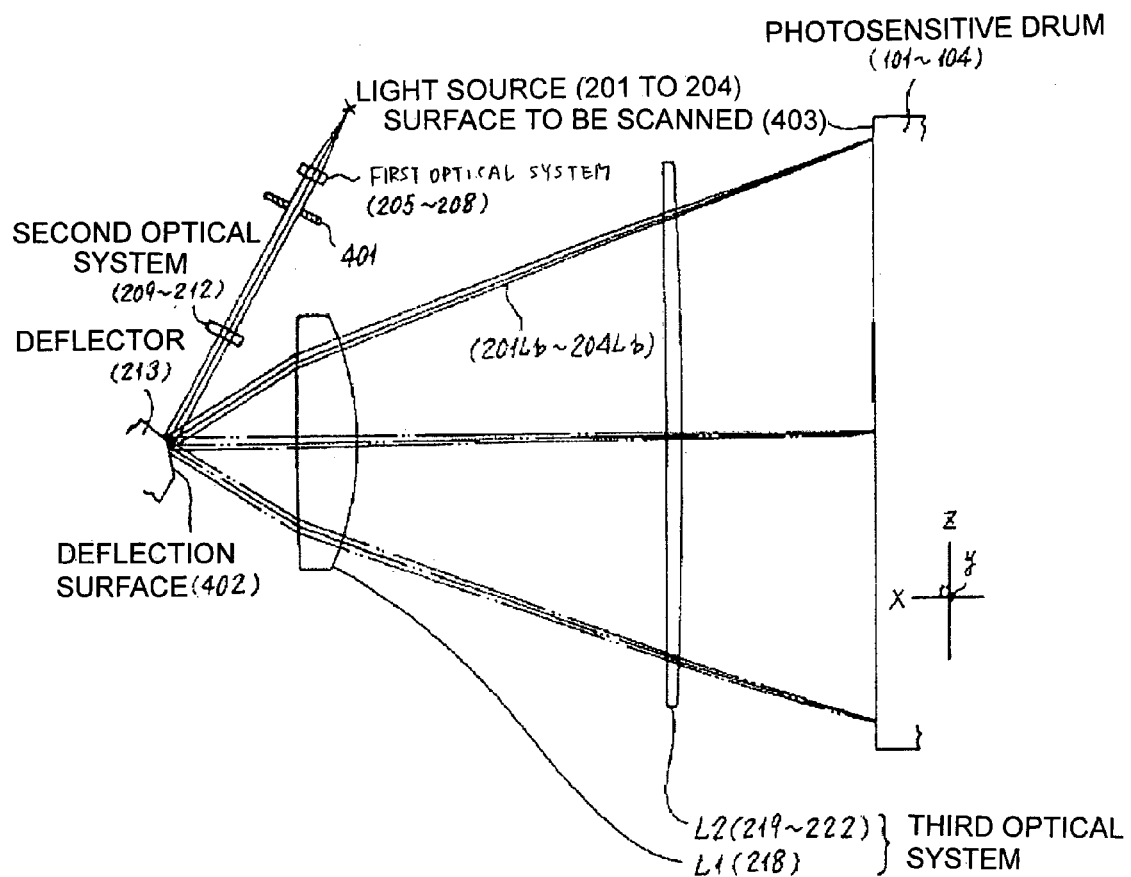
FIG. 40 is a plan view of an optical scanning unit.
Figure 41:
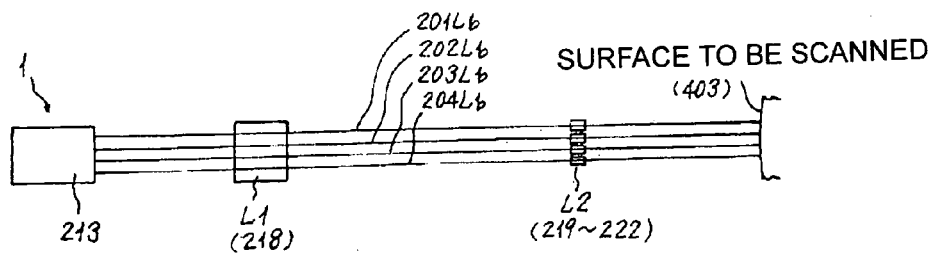
FIG. 41 is a side view of the optical scanning unit.

These light beams 201Lb, 202Lb, 203Lb, and 204Lb emitted from the respective semiconductor lasers 201, 202, 203, and 204 are, as illustrated in FIG. 36, being a plan view of FIG. 34, transformed to parallel beams by the coupling lenses 205, 206, 207, and 208, respectively. The respective light beams coming out from the coupling lenses 205, 206, 207, and 208 are directed toward cylindrical lenses 209, 210, 211, and 212, via a diaphragm unit (a rectangular aperture denoted by reference sign 401 in FIG. 40), not illustrated in FIGS. 34 and 36.

The cylindrical lenses 209, 210, 211, and 212 have a flat surface on one side, and a common curvature in the sub scanning direction on the other side, and arranged so that the optical path lengths to the deflection surface of the polygon mirror 213 become equal to each other.

The light beams 201Lb, 202Lb, 203Lb, and 204Lb are converged so as to be linear in the sub scanning direction on the deflection surface 402 of the polygon mirror 213. The deflection point o and the surface 403 to be scanned, as a circumferential face of the photosensitive drum, are made to be conjugate in the sub scanning direction, thereby forming the optical face tangle error correction optical system, together with the toroidal lenses described later.

Figure 37:
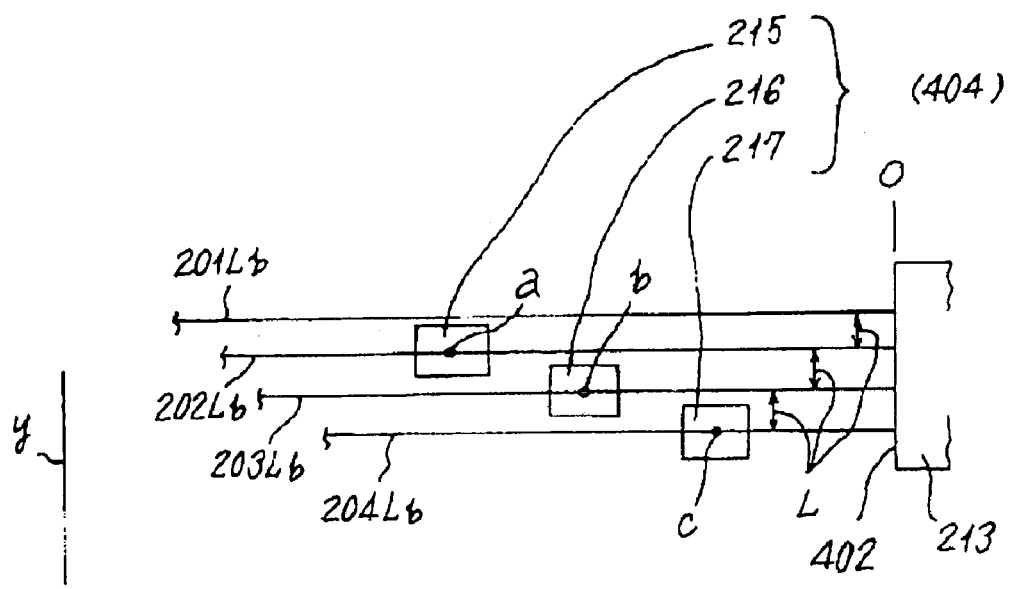
FIG. 37 is a diagram for explaining the beam merging unit.

In FIGS. 36 and 37, the reflecting mirrors 215, 216, and 217 constitute a beam merging unit, and are disposed so that the distances oa, ob, and oc from the deflection point o as seen in the sub scanning direction of the polygon mirror 213 to turning points a, b, and c of the reflecting mirrors 215, 216, and 217 become shorter, as the emission position becomes lower, that is, in sequence in the sub scanning direction, and the angles of the turned light beams are set so that the deflection points are aligned in the main scanning direction.

The light beam 201Lb from the semiconductor laser 201 is directed to the polygon mirror 213 directly, not through the reflecting mirror, but the reflecting mirror may be disposed so that the light beam is turned back, like other beams. In this case, this reflecting mirror also constitutes the beam merging unit.

Further, any of the semiconductor lasers 201 to 204 may be arranged at an optional position so that the light beam therefrom finally reach the deflection point o by a reflecting mirror optionally arranged, without being coupled with other light beams. In this case, the optionally arranged reflecting mirror is not included in the beam merging unit of the present invention.

The beam merging unit turns back the respective light beams 201Lb, 203Lb, and 204Lb from a plurality of light source units (semiconductor lasers 209 to 212) at different positions. In this example, as illustrated in FIG. 36, the turning points of the respective beams are shifted from each other both on the main scanning cross section (as seen in the y-axis direction (vertical direction)) and on the sub scanning cross section as illustrated in FIG. 37, so as to be turned back at different positions.

According to the configuration, the turning points of the respective light beams can be made to agree with each other on the main scanning cross section. In this case, however, since the height in the sub scanning direction of one turning mirror is ruled by the beam interval and becomes low, and hence is likely to be affected by face tangle, which is not practical, but not nonexecutable. The optical paths of the light beams entering into the deflection unit (polygon mirror 213) from the beam merging unit are close to or agrees with each other in the main scanning direction.

As illustrated in FIGS. 36 and 37, the reflecting surfaces of the respective reflecting mirrors 215 to 217 constituting the beam merging unit are at different heights stepwise, and the light beam 201Lb from the semiconductor laser 201 skims over the reflecting mirrors 215, 216, and 217 toward the polygon mirror 213.

The light beam 202Lb from the semiconductor laser 202 is turned back at the turning point a of the reflecting mirror 215, made close to the optical path of the light beam 201Lb from the semiconductor laser 201, skims over the reflecting mirrors 216 and 217 towards the polygon mirror 213.

The light beam 203Lb from the semiconductor laser 203 is turned back at the turning point b of the reflecting mirror 216, made close to the optical path of the light beam 201Lb in the main scanning direction, skims over the reflecting mirror 217 towards the polygon mirror 213.

Likewise, the light beam 204Lb from the semiconductor laser 204 is turned back at the turning point c of the reflecting mirror 217, made close to the optical path of the light beam 201Lb in the main scanning direction, and moves towards the polygon mirror 213.

Thus, the respective beams enter into the polygon mirror 213, with the main scanning directions thereof made to agree with each other in order of semiconductor lasers far from the polygon mirror 213 (in this example, in order of semiconductor lasers 202, 203, and 204).

As illustrated in FIG. 37, the respective light beams 201Lb, 202Lb, 203Lb, and 204Lb are emitted from the respective semiconductor lasers at an equal interval, in the example, at an interval L=5 millimeters between the adjacent light beams, so as to be parallel with each other in the sub scanning direction, and made to enter into the reflecting mirror vertically, while maintaining this interval L on the reflecting surface of the polygon mirror.

Since the light source unit including a unit holding the semiconductor lasers, being light sources, coupling lenses, and the like has a size in the height direction exceeding the interval L, it is physically difficult to obtain the interval L by superposing a plurality of light source units at the same position vertically (in the sub scanning direction). Therefore, the interval L is obtained by providing the beam merging unit to have an arrangement shifted in the main scanning direction.

Figure 38:
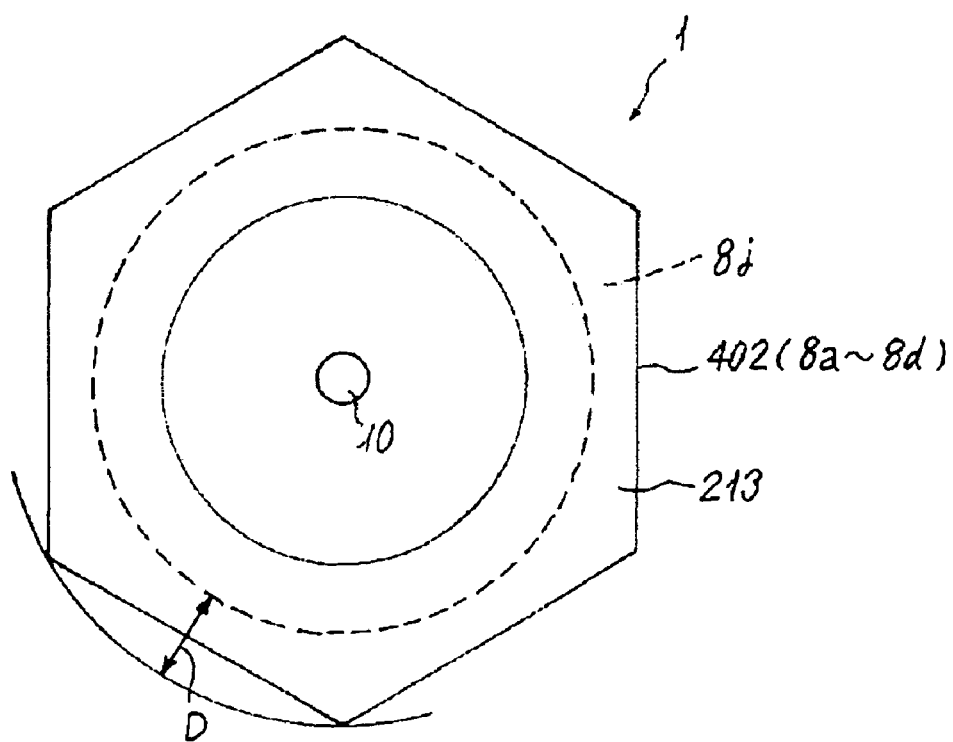
FIG. 38 is a plan view of a polygon scanner.
Figure 39:
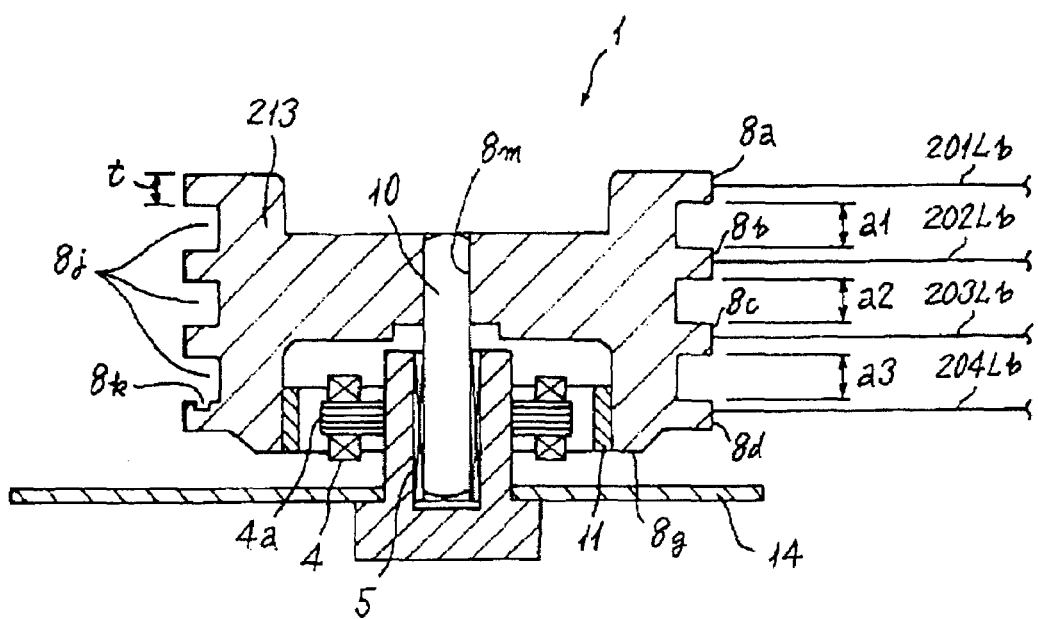
FIG. 39 is a cross section of the polygon scanner.

The polygon mirror 213 is thick in the y-axis direction so that it can simultaneously deflect a plurality of beams arranged with an interval in the y-axis direction, and in this example, the polygon mirror 213 is a hexahedral mirror. As illustrated in FIGS. 38 and 39, the polygon mirror 213 has a shape such that windage is reduced by providing grooves 8j on the circumferential portion thereof between the light beams, which is not used for deflection, so as to be slightly smaller than the inscribed circle of the polygon mirror. In the example, the thickness t of one layer, which allows the light beams to enter into or be reflected from is set to about 2 millimeters.

The scanning lens through which the respective light beams turned back by the polygon mirror 213 pass first, that is the fθ lens 218 closest to the polygon mirror, constitutes an imaging unit together with toroidal lenses 219, 220, 221, and 222, being scanning lenses closest to the surface to the scanned.

The fθ lens 218 is a lens shared by the respective light beams 201Lb, 202Lb, 203Lb, and 204Lb (a lens through which the respective light beams pass to undergo common optical action), which is formed thick like the polygon mirror 213, and does not have a converging force in the sub scanning direction. The fθ lens 218 is in a noncircular arc shape having a power so that the beams move at a constant velocity on the surfaces of the respective photosensitive drums, with a rotation of the polygon mirror 213, in the main scanning direction.

The toroidal lenses 219, 220, 221, and 222 are respectively provided for the respective light beams 201Lb, 202Lb, 203Lb, and 204Lb, and as illustrated in FIGS. 34 and 2, have an optical face tangle error correction function of the polygon mirror 213, and respectively constitute a part of the optical scanning unit, which cooperates with the fθ lens 218 to image the respective light beams 201Lb, 202Lb, 203Lb, and 204Lb on the surfaces of the photosensitive drums, and records four electrostatic latent images at the same time.

The imaging unit that forms an image on the photosensitive drum, as the surface to be scanned, includes, in this example, the fθ lens 218 shared by the light beams from a plurality of light source units, which has a zero power in the sub scanning direction, and the toroidal lenses 219, 220, 211, and 222 respectively provided for each light beam 201Lb, 202Lb, 203Lb, 204Lb.

In each optical scanning unit, turning mirrors 223, 224, 225, 226, 227, 228, 229 and the like having a plurality of pieces are arranged so that the respective optical path lengths to the photosensitive drum surfaces agree with each other, and the incident positions and the incident angles to the respective photosensitive drums 101, 102, 103, and 104 arranged at an equal interval become equal.

The optical path for each optical scanning unit will be explained. In FIGS. 34, 35, and 39, the light beam 201Lb from the semiconductor laser 201 is deflected by a polyhedron 8a in the uppermost layer of the polygon mirror 213, passes through the fθ lens 218, and is reflected by the turning mirror 223, and guided to the photosensitive drum 101 via the toroidal lens 219, thereby forming a yellow image, as the first optical scanning unit.

The light beam 202Lb from the semiconductor laser 202 is deflected by a polyhedron 8b in the second layer of the polygon mirror 213, passes through the fθ lens 218, and is reflected by the turning mirror 224, and guided to the photosensitive drum 102 by the turning mirror 27, via the toroidal lens 220, thereby forming a magenta image, as the second optical scanning unit.

The turning mirrors 224, 225, and 226 constitute a beam turning unit that separate the coupled light beams in the main scanning cross section, which sequentially separates the beams in sequence in the sub scanning direction along the flow of the beams, such that at first, the beam 204Lb from the semiconductor laser 204 lastly coupled by the beam merging unit is separated, and then the beam 203Lb from the semiconductor laser 203 is separated.

(Imaging unit) The imaging unit that images the light beams on the surfaces to be scanned of the photosensitive drums includes at least two kinds of scanning lenses L1 and L2, for each optical scanning unit. In this example, the whole optical scanner includes four optical scanning units, and the scanning lens L1 (fθ lens 218) shared by the respective light beams 201Lb, 202Lb, 203Lb, and 204Lb from the light source units and having a zero power in the sub scanning direction and the scanning lens L2 (toroidal lenses 219, 220, 211, and 222) provided for each light beam 201Lb, 202Lb, 203Lb, 204Lb correspond to the two kinds of lenses.

In other words, the first optical scanning unit that forms the yellow image includes a set of the scanning lens L1 (fθ lens 218) and the scanning lens L2 (toroidal lens 219), the second optical scanning unit that forms the magenta image includes a set of the scanning lens L1 (fθ lens 218) and the scanning lens L2 (toroidal lens 220), the third optical scanning unit that forms the cyan image includes a set of the scanning lens L1 (fθ lens 218) and the scanning lens L2 (toroidal lens 221), and the fourth optical scanning unit that forms the black image includes a set of the scanning lens L1 (fθ lens 218) and the scanning lens L2 (toroidal lens 222).

The scanning lens L1 (fθ lens 218) closest to the polygon mirror 213 has a positive refracting power in the main scanning direction, and a refracting power in the sub scanning direction is zero or close to zero. On the other hand, the scanning lens L2 (toroidal lenses 219, 220, 221, 222) closest to the surface to be scanned have a negative refracting power in the main scanning direction, and a positive refracting power in the sub scanning direction.

As an example, the imaging unit is a two-piece imaging unit. The flux of the light beams emitted from the light source (semiconductor lasers 201 to 204) is coupled to parallel flux (or may be weak convergence or divergent flux) respectively by the first optical systems (coupling lenses 205 to 208). The flux of the coupled light beams passes through a diaphragm unit 401 for obtaining a desired beam spot diameter on the surface 403 to be scanned, and then passes through the second optical system (cylindrical lenses 209 to 212), to form a line image long in the main scanning direction in the vicinity of the polygon mirror 213, as a deflection unit.

The beams scanned on the deflection surface (402) of the polygon mirror 213 pass through the scanning lens L1 (fθ lens 218) and the scanning lens L2 (toroidal lenses 219 to 222) as the third optical system, and are condensed in the vicinity of the surface to be scanned, while scanning the surfaces 403 to be scanned of the respective photosensitive drums at a constant velocity.

In the optical scanner of the present invention, the scanning lens L1 (fθ lens 218) closest to the polygon mirror 402 has a positive refracting power in the main scanning direction, to correct the constant velocity characteristic favorably. The fθ lens 218 has a refracting power of zero or close to zero in the sub scanning direction. Since the fθ lens 218 does not substantially have a refracting power in the sub scanning direction, the main scanning cross section does not change in the sub scanning direction. Therefore, even when the incident beams are shifted in the sub scanning direction, the constant velocity characteristic is not deteriorated. Deterioration in the imaging performance in the main scanning direction can be also suppressed.

Further, since the sub scanning refracting power of the scanning lens (fθ lens 218) closest to the polygon mirror 402 is substantially zero, the scanning lenses (toroidal lenses 219 to 222) closest to the surface to be scanned have a strong positive refractive index. As a result, the sub scanning magnification of the scanning imaging optical system becomes a reduction system, and can suppress performance deterioration due to an assembly error of parts, a shape error of parts, or the like. It is a matter of course that in the sub scanning direction, the base point of the deflection unit and the surface to be scanned are in a conjugate relation, thereby having an optical face tangle error correction function of the deflection unit.

Further, for example, the face shape in the main scanning direction of the scanning lens (fθ lens 218) closest to the deflection unit is made a noncircular shape, and the face shape in the main scanning direction of the other scanning lens (toroidal lenses 219 to 222) is made a noncircular shape, and by using a face in which a radius of curvature in the sub scanning cross section is changed in the main scanning direction, so that the centerline of the curvature obtained by joining the centers of curvature in the sub scanning cross section in the main scanning direction becomes a curve different from the noncircular shape in the main scanning direction in the main scanning cross section, the curvature of field can be favorably corrected both in the main scanning direction and the sub scanning direction.

As a result, according to the present invention, the curvature of field can be favorably corrected both in the main scanning direction and the sub scanning direction, and the stability of the optical spot can be realized, while maintaining excellent "conjugate function" and "constant velocity function".

Further, since the scanning lens (fθ lens 218) closest to the deflection unit (polygon mirror 213) has a configuration such that a plurality of light beams (201Lb to 204Lb) going toward different surfaces to be scanned passes therethrough, misregistration of beam spot in the main scanning direction between the different surfaces to be scanned, that is, between respective colors, can be reduced, thereby enabling suppression of image deterioration due to out of color registration or color change.

The scanning lens (fθ lens 218) closest to the deflection unit (polygon mirror 213) has a strong positive refracting power in the main scanning direction, to correct the constant velocity characteristic. By allowing a plurality of beams going toward different surfaces to be scanned (photosensitive drums 101 to 104) to pass through this lens, misregistration of beam spot in the main scanning direction due to a processing difference of the scanning lens becomes the same on the different surfaces to be scanned, thereby enabling suppression of the occurrence of out of color registration.

Further, the deflection unit (polygon mirror 213) has large heat generation due to a motor section and the base. With regard to the base, a temperature change in the optical box can be reduced by putting the base outside of the optical box, but a temperature rise due to the heat generation of the motor section still occurs. The heat due to a temperature change propagates in the optical box, thereby causing a temperature distribution in the scanning lens, particularly, in the scanning lens (fθ lens 218) closest to the polygon mirror 213. This temperature distribution occurs because a uniform temperature change does not occur in the scanning lens (fθ lens 218) due to the air current in the optical box by the polygon mirror 213, the shape of the scanning lens (fθ lens 218), or the like.

As a result, in the tandem type color copying machine of a counter-scanning type, in which beams going toward the respective surfaces to be scanned pass through different scanning optical elements, relative beam spot positions in the main scanning direction on the respective surfaces to be scanned change at the time of continuous printing, thereby changing the color. In the optical scanner of the present invention, however, since the scanning lens (fθ lens 218) closest to the deflection unit allows a plurality of beams going toward the different surfaces to be scanned to pass therethrough, even when the scanning lens (fθ lens 218) has a temperature distribution in the main scanning direction, misregistration of beam spot in the main scanning direction becomes the same on the different surfaces to be scanned, thereby enabling suppression of a color change and occurrence of out of color registration at the time of continuous printing.

According to the configuration described above, in the optical scanner using a common scanning lens, the sub scanning interval (interval L) of light beams corresponding to the respective colors is brought close to each other, so as to be able to enter into the polygon mirror, while securing the installation space of the light source units and the optical system before deflection (cylindrical lenses 209 to 212, and the like) in the vicinity of the deflection unit (polygon mirror 213). As a result, a compact optical scanner that can obtain stable image quality with respect to an environmental change can be provided.

[2] EXAMPLE 2

Example Corresponding to the Twenty-ninth and the Thirtieth Aspects

It is desired that the reflecting mirror as the beam merging unit be arranged so that the sum of the incident angle to the reflecting mirror and the reflection angle of the light beam become acute.

According to the example illustrated in FIG. 36, $\alpha 1$, being the sum of the incident angle and the reflection angle of the light beam 201Lb with respect to the reflecting mirror 215 is an obtuse angle, and hence the beam width (in the main scanning direction) on the reflecting surface increases, and the distance from the reflecting mirror to the reflecting surface of the optical deflector deviates in the beam (the outermost beam of light in the main scanning direction). The example also applies to the relation of the light beams 203Lb with respect to the reflecting mirror 216.

As a result, when the light beams collapse in the sub scanning direction, due to a tangle of the reflecting mirror at the time of installation, the tangle quantities in the sub scanning direction between the outermost beams in the main scanning direction become different in the beams, when the beams are deflection-reflected toward the surface to be scanned by the deflection unit, thereby deteriorating the wave front aberration. Therefore, it becomes difficult to obtain a favorable beam spot diameter on the surface to be scanned. In order to obtain a favorable beam spot diameter, it becomes necessary to arrange the reflecting mirror with high precision, thereby leading to a cost increase due to an increase in man-hour at the time of assembly.

On the other hand, $\alpha 2$, being the sum of the incident angle and the reflection angle of the light beam 204Lb with respect to the reflecting mirror 217 is an acute angle, and hence the beam width (in the main scanning direction) on the reflecting surface decreases, and the distance from the reflecting mirror to the reflecting surface of the optical deflector does not deviate largely in the beams (the outermost beams of light in the main scanning direction).

In other words, by arranging the reflecting mirror as the beam merging unit so that the sum of the incident angle to the reflecting mirror, constituting the beam merging unit, and the reflection angle of the light beam becomes an acute angle, the assembly characteristic can be improved, while maintaining favorable beam spot diameter. That is to say, an optical scanner that can reduce deterioration in the optical performance at the time of assembly of the beam merging unit can be provided.

In the optical system of the present invention, since the power in the sub scanning direction of the scanning lens (fθ lens 218), which is closest to the optical deflector, and allows the light beams going toward the surfaces to be scanned to pass therethrough, is substantially zero, the scanning lenses (toroidal lenses 219 to 222) close to the surfaces to be scanned have a strong positive power in the sub scanning direction. Therefore, the sub scanning direction of the scanning optical system becomes a reduction system. When the scanning optical system is a reduction system, the diameter of an aperture diaphragm by the diaphragm unit 401 for obtaining a desired beam spot diameter decreases.

As disclosed in Japanese Patent Application Laid-Open No. H7-110451 by the present applicant, when the diameter of the aperture diaphragm is small, if the conjugate point of the aperture diaphragm is close to the surface to be scanned, the influence of diffraction is large, thereby decreasing the depth margin of the beam spot diameter in the sub scanning direction. Accordingly, when the scanning lens is a reduction system, it is necessary to increase the interval between the aperture diaphragm and the cylindrical lens. That is, in the scanning optical system of the present invention, it is necessary to set the distance from the light source unit to the deflection unit to be long.

Therefore, it is difficult to arrange all light source units such that the sum of the incident angle and the reflection angle of the reflecting mirror as the beam merging units becomes acute, and hence the optical scanner becomes large.

Therefore, as illustrated in FIG. 37, a compact optical scanner can be realized, while two semiconductor lasers (actually the light source units, but indicated by the semiconductor laser as a representative), that is the semiconductor lasers 201 and 202, and the semiconductor lasers 203 and 204 are arranged in a symmetrical direction with respect to the optical axis o2 of the scanning lens (fθ lens 218), that is, at the opposite sides, putting the optical axis o2 therebetween, so that the sum of the incident angle and the reflection angle of the reflecting mirrors 214, 215, 216, and 217 as the beam merging unit becomes acute.

Figure 42:
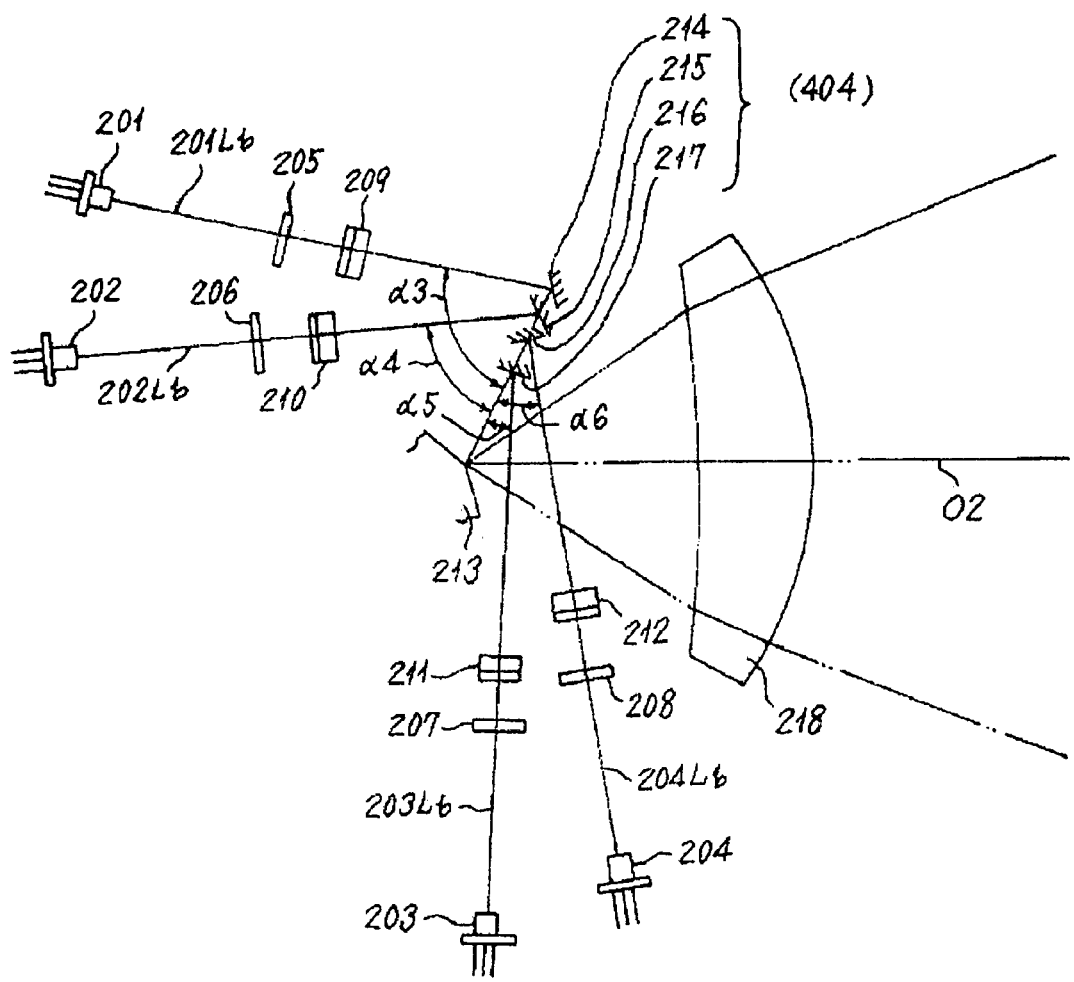
FIG. 42 is a plan view of the optical system, illustrating the beam merging unit in which the arrangement of the reflecting mirrors is changed.

In FIG. 42, since only the arrangement thereof is different, like reference signs are used to the semiconductor lasers, coupling lenses, cylindrical lenses, and the reflecting mirrors, for easy comparison with FIG. 36. The reflecting mirror 214 is newly provided in the example illustrated in FIG. 42, for reflecting the light beam from the semiconductor laser 201, and constitutes the beam merging unit together with other reflecting mirrors.

As illustrated in FIG. 42, angles $\alpha 3$, $\alpha 4$, $\alpha 5$, and $\alpha 6$, expressing the sum of the incident angle and the reflection angle of the light beams 201Lb, 202Lb, 203Lb, and 204Lb with respect to the respective reflecting mirrors 214, 215, 216, and 217 are all acute.

In the example illustrated in FIG. 42, of the light source units, at least two light source units are arranged on the opposite sides with each other, putting the optical axis of the scanning lens (fθ lens 218) as the imaging unit, in the main scanning cross section. By having such an arrangement, all light source units can be arranged so that the sum of the incident angle and the reflection angle of the reflecting mirrors as the beam merging unit becomes acute.

As explained above, in view of layout, the distance from the light source units (semiconductor lasers 201, 202, 203, and 204) to the deflection unit (polygon mirror 213) can be easily set long, while setting the angle expressing the sum of the incident angle and the reflection angle of the light beams acute, and effectively utilizing the free space, thereby enabling realization of a compact optical scanner. A compact optical scanner that can obtain stable image quality with respect to an environmental change can be provided.

[3] EXAMPLE 3

Example Corresponding to the Thirty-first Aspect

The respective light beams 201Lb, 202Lb, 203Lb, and 204Lb fluctuate in the sub scanning direction in the reflecting mirror section (deflection surface 402) of the deflection unit (polygon mirror 213), due to the mounting accuracy and the machining accuracy of the respective light source units including the semiconductor lasers 201 to 204, and optical elements (for example, the cylindrical lenses 209 to 212, and the like) from these light source units to the deflection unit (polygon mirror 213).

Therefore, as illustrated in FIGS. 38 and 39, in the polygon mirror 213 as the deflection unit, the polyhedral deflection surface 402 forming the mirror portion has an axial length (a thickness in the sub scanning direction) sufficient for deflecting the predetermined light beams.

The respective light beams 201Lb, 202Lb, 203Lb, and 204Lb going from the respective semiconductor lasers 201 to 204 toward the respective surfaces 403 to be scanned of the corresponding photosensitive drums 101 to 104 are allowed to enter into one plane of the polyhedron, which is identical in the main scanning direction. However, in order to reduce windage at the time of rotating the polygon mirror 213, it is desired that this incident plane be dug into a shape having a smaller diameter than the circumscribed circle of the polyhedron forming the mirror face, between the light beams adjacent in the sub scanning direction. With respect to this point, it has been already described that grooves 8j are formed, as a cut groove. The axial length (the distance in the sub scanning direction) of the dug portion (grooves 8j) is preferably small in order to miniaturize the deflection unit, and the threshold thereof is determined by the diameter of the machining cutting tool.

In other words, the minimum height of the light beams (light beams 201Lb, 202Lb, 203Lb, and 204Lb) entering from the respective light source units (semiconductor lasers 201 to 204) to the deflection unit (polygon mirror 213) in the sub scanning direction (in the y-axis direction) is determined by the mirror portion of the deflection unit (polygon mirror 213), the distance of the dug portion (grooves 8j) in the sub scanning direction, and the layout of the reflecting mirrors that separate the light beams 201Lb, 202Lb, 203Lb, and 204Lb from the respective light source units (semiconductor lasers 201 to 204) to the corresponding respective surfaces (403) to be scanned of the photosensitive drums (101 to 104). When the deflection surface 402 of the polygon mirror 213 is made a flat surface without grooves, a problem such as an increase in power consumption or an increase in noise due to windage occurs, which is not desirable.

An example of the polygon mirror 213, being the deflection unit, illustrated in FIGS. 38 and 39 will be explained. The light beams 201Lb, 202Lb, 203Lb, and 204Lb corresponding to the respective colors are made to enter into four polyhedrons, that is, the uppermost polyhedron 8a, the second-stage polyhedron 8b, the third-stage polyhedron 8c, and the lowermost polyhedron 8d, respectively formed away from each other in the axial direction of the polygon mirror 213 (in FIG. 38, in a direction penetrating through the page), that is, arranged in the direction of rotation axis (in the y-axis direction), and are deflection-scanned at a high speed.

The polygon mirror 213 is formed by combining a rotor, obtained by integrally forming the polyhedral mirror portion, and a motor that rotates the mirror portion, and constitutes a polygon scanner 1 as a whole. The polygon scanner 1 will be explained below in detail. The inner diameter section 8m of the polygon mirror 213 including a material with aluminum purity of not less than 99.9%, constituting the polygon mirror 213 section, is fixed by shrinkage fit on the upper outer circumference of a bearing shaft 10 including martensitic stainless steel.

The martensitic stainless steel (for example, SUS420J2) is preferable as the bearing shaft 10, because it is capable of hardening and can have high surface hardness and excellent wear resistance. A rotor magnet 11 is fixed below the polygon mirror 213, and constitutes the polygon motor, as an outer-rotor type brushless motor, together with a coil 4 and a stator core 4a integrally formed with an immovable member, inside of the rotor magnet 11.

The respective reflecting surfaces of the uppermost polyhedron 8a, the second-stage polyhedron 8b, the third-stage polyhedron 8c, and the lowermost polyhedron 8d constituting the polygon mirror 213 respectively have an axial length (thickness) sufficient for deflecting the predetermined light beam, and specifically, the thickness is set to 1 to 3 millimeters. It is because when the thickness is not larger than 1 millimeter, it becomes a thin plate, and hence the rigidity at the time of machining the mirror surface is low, thereby deteriorating the flatness. If the thickness is not smaller than 3 millimeters, inertia increases as the rotor, and causing a problem in that the starting time increases.

With regard to the grooves 8j as cut grooves, if it is assumed that the groove width between the uppermost polyhedron 8a and the second-stage polyhedron 8b is a1, the groove width between the second-stage polyhedron 8b and the third-stage polyhedron 8c is a2, the groove width between the third-stage polyhedron 8c and the lowermost polyhedron 8d is a3, a1=a2=a3 in this example.

The depth of these respective grooves 8j is set to be a circular shape having a smaller diameter than the circumscribed circle diameter of the regular hexahedral polyhedrons 8a, 8b, 8c, and 8d having the same phase in FIG. 38, thereby decreasing the windage. The windage of the grooves 8j is determined by the circumscribed circle diameter circumscribed about the regular hexagon, and six corners coming in contact with the circumscribed circle have a large influence.

Therefore, it is desired to round the portions corresponding to these corners. On the other hand, by making the circle smaller than the inscribed circle diameter, the windage can be reduced further. However, since the grooves are put between the polyhedral portions, the reduction effect becomes relatively small.

With regard to the respective grooves 8j, a difference D between the circle diameter circumscribed about the hexagon and the maximum outer diameter of the groove 8j is set to be not larger than five times as large as the groove width, taking the workability into consideration (when the difference is larger than five times, since the cut amount increases, the life span of the machining cutting tool becomes short, and the working time increases.

A circumferential groove 8k is formed on the circumferential part of the lowermost groove 8j, of the grooves 8j. The groove width al to a3 is set to 1 millimeter, taking the workability into consideration, since it is necessary to apply an adhesive on this circumferential grooves 8j, at the time of correcting the balance. When the groove width is not larger than 1 millimeter, the point of the adhesive applicator and the swollen adhesive come in contact with the polygon mirror 213, thereby damaging or staining the mirror portions.

It can be also considered to provide the circumferential groove 8k on the opposite face (on the bottom face 8g side of the polygon mirror 213), but at the time of applying the adhesive to the groove open downward, it is necessary to detach the polygon mirror 213, as a rotor, from the bearing 5, set and fix the polygon mirror 213 upside down and then apply the adhesive. Therefore, not only a complicated step is required, but also since a detaching step from the bearing 5 is required, oils are dispersed each time, thereby causing deterioration in the bearing. Hence, the circumferential groove 8k is provided on the side circumferential part of the groove 8j.

The interval in the sub scanning direction between the light beams entering into the deflection unit (polygon mirror 213) from the respective light source units (semiconductor lasers 201 to 204) is made equal (a1=a2=a3), matched with the diameter of the machining cutting tool, within a range in which the turning mirrors (turning mirrors 223 to 226 as the beam turning unit illustrated in FIG. 35) that separate the light beams from the respective light source units (semiconductor lasers 201 to 204) to each surface 403 to be scanned of the corresponding photosensitive drum (101 to 104) can be laid out. As a result, the width of the light beams 201Lb, 202Lb, 203Lb, and 204Lb entering into the deflection unit from the respective light source units can be made the smallest, thereby enabling a reduction in size of the deflection unit and the scanning unit.

The interval between the light beams 201Lb, 202Lb, 203Lb, and 204Lb referred to herein stands for an interval in the sub scanning direction between adjacent single light beams emitted from each light source unit (semiconductor lasers 201 to 204). Further, when the respective light source units have the configuration such that a plurality of light beams is emitted from one light source unit, the interval is an interval at centers in the sub scanning direction between the adjacent light beams in one light source unit.

In this example, the sub scanning interval of the light beams corresponding to the respective colors can be made the smallest, and the polygon mirror is made thin, thereby enabling a reduction in size of the deflection unit and the scanning unit. Further, since the polygon mirror is made thin to suppress generation of heat by the polygon motor so that an environmental change hardly occurs, a stable color image can be obtained, which does not have out of color registration or color change accompanying the printing operation, and the power consumption can be reduced.

[4] EXAMPLE 4

Example Corresponding to the Thirty-second Aspect

In the example in Example 3, the interval in the sub scanning direction between adjacent single light beams emitted from each light source unit, or the interval at centers between adjacent light beams in the sub scanning direction respectively emitted from each light source unit is the same. However, in this example, the interval at the central part in the sub scanning direction is made larger than the interval at the circumferential part away from the central part in the sub scanning direction.

The scanning lens (fθ lens 218) through which all light beams commonly pass after the deflection unit (polygon mirror 213) has a lens height in the sub scanning direction (thickness) larger than the normal scanning lens, since the light beams 201Lb, 202Lb, 203Lb, and 204Lb going toward different surfaces to be scanned pass therethrough, with an interval in the sub scanning direction. As an example, when the fθ lens 218 is molded by using a plastic material, it is required that the volume of the lens is small in order to improve the molding accuracy and shorten the molding time.

Figure 43:
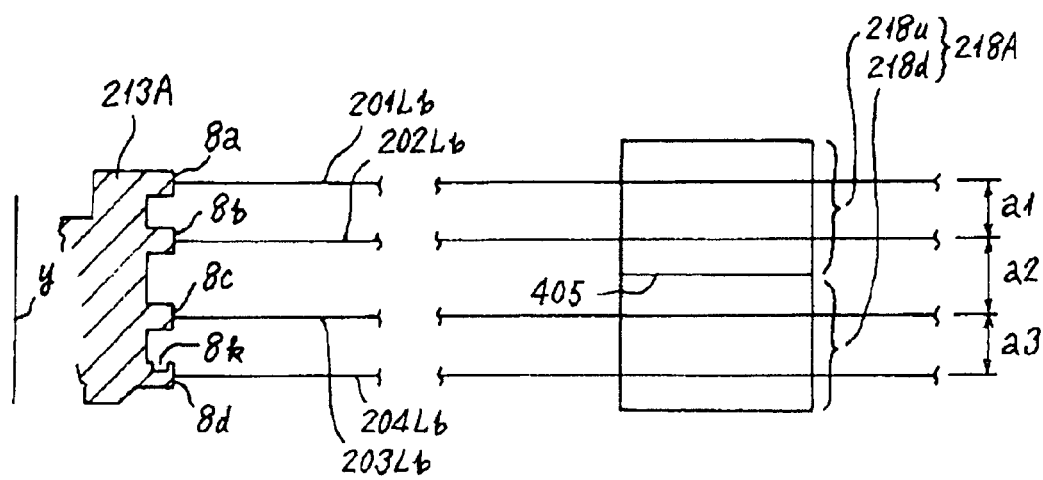
FIG. 43 illustrates an fθ lens obtained by integrally forming two lenses and a polygon mirror forming a pair therewith.

Therefore, as illustrated in FIG. 43, the fθ lens 218A has a two-body configuration including an upper lens 218u and a lower lens 218d, and these two lenses are superposed in the sub scanning direction, thereby improving the molding accuracy for each lens, and enabling a cost reduction due to shortening of the molding time. In other words, the accuracy of the imaging unit can be improved, and the manufacturing time can be shortened.

In this case, in order to avoid the influence of internal distortion in the circumferential portion, which occurs at the time of molding the lens, an effective dimension in the sub scanning direction is set, and the interval between the light beam 202Lb and the light beam 203Lb (corresponding to the groove width a2) adjacent, putting a joint portion 405 between the upper lens 218u and the lower lens 218d (the central position in the sub scanning direction of the fθ lens 218A) therebetween (the interval at the central portion of the fθ lens 218A in the sub scanning direction) is set larger than the interval between the light beam 201Lb and the light beam 202Lb (corresponding to the groove width a1), and the interval between the light beam 203Lb and the light beam 204Lb (corresponding to the groove width a3) (both the groove widths a1 and a3 are intervals in the peripheral portion of the fθ lens 218A in the sub scanning direction).

Accompanying this, also in the polygon mirror, the groove width is made different, like a2>(a1=a2), as illustrated in FIG. 43.

At this time, it is a matter of course that the narrowest interval (the interval between adjacent light beams passing through the same lens), of the intervals between the adjacent light beams, is desirably set as in the explanation of Example 3. Further, when the two lenses are used, since the influence of a temperature change or a temperature distribution occurs equally as in the integrated lens, out of color registration can be reduced as explained above.

[5] EXAMPLE 5

Example Corresponding to the Thirty-third Aspect

This example relates to an image formation apparatus in which a plurality of light beams including color image information emitted from the optical scanner is scanned on the image carrier (photosensitive drum) having a surface to be scanned, respectively, to form an electrostatic latent image, and after these electrostatic latent images are visualized by a color toner corresponding to the color image information of each light beam, these visual images are finally transferred onto a sheet-like medium to obtain a color image, wherein the optical scanner according to the respective examples of the present invention is used as the optical scanner.

Figure 44:
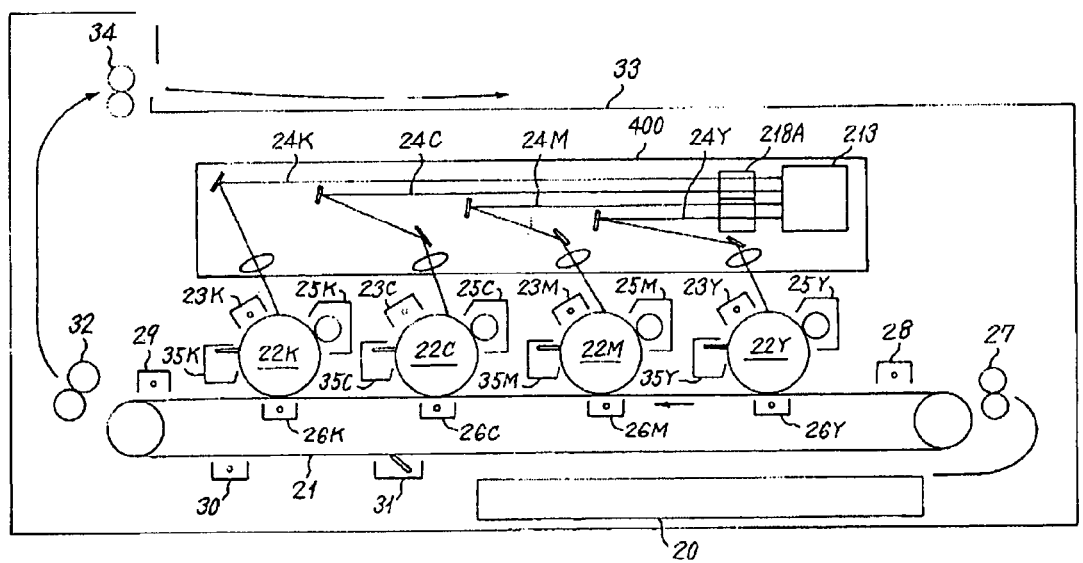
FIG. 44 is a front elevational view illustrating the outline of the overall configuration of the image formation apparatus.

The image formation apparatus according to this example is configured as a tandem type full color laser printer. The schematic configuration thereof is explained with reference to FIG. 44. At first, a carrier belt 21 arranged in the horizontal direction on the lower part of the apparatus, which carries a sheet-like medium (not illustrated) fed from a paper feed cassette 20, is provided.

On this carrier belt 21, a photosensitive drum 22Y for yellow (Y), a photosensitive drum 22M for magenta (M), a photosensitive drum 22C for cyan (C), and a photosensitive drum 22K for black (B) are arranged at an equal interval in order from the upstream side in the transport direction of the sheet-like medium indicated by arrow. Hereinafter, subscripts Y, M, C, and K are appropriately attached to reference numbers to differentiate the parts.

These photosensitive drums 22Y, 22M, 22C, and 22K are all formed to have the same diameter, and process members are arranged around the photosensitive drum in order according to the electrophotographic process. When the photosensitive drum 22Y is explained as an example, a charging charger 23Y, a first optical scanning unit 24Y, a development apparatus 25Y, a transfer charger 26Y, a cleaning apparatus 35Y, and the like are arranged in order. The other photosensitive drums 22M, 22C, and 22K are provided with these members likewise.

For the photosensitive drum 22M, a charging charger 23M, a second optical scanning unit 24M, a development apparatus 25M, a transfer charger 26M, a cleaning apparatus 35M, and the like are arranged in order. For the photosensitive drum 22C, a charging charger 23C, a third optical scanning unit 24C, a development apparatus 25C, a transfer charger 26C, a cleaning apparatus 35C, and the like are arranged in order. For the photosensitive drum 22K, a charging charger 23K, a fourth optical scanning unit 24K, a development apparatus 25K, a transfer charger 26K, a cleaning apparatus 35K, and the like are arranged in order. The photosensitive drums 22Y, 22M, 22C, and 22K correspond to the photosensitive drums 101, 102, 103, and 104 in Examples 1 to 4, and the optical scanner 400 in Examples 1 to 4 is arranged above these photosensitive drums 22Y, 22M, 22C, and 22K.

In other words, the circumferential faces of the photosensitive drums 22M, 22C, and 22K are designated as the surfaces to be scanned set for each color, and the first optical scanning unit 24Y, the second optical scanning unit 24M, the third optical scanning unit 24C, and the fourth optical scanning unit 24K are provided with respect to the respective surfaces to be scanned, in the one-to-one relation.

However, as explained in Example 4, the scanning lens (fθ lens 218) is commonly used by the first optical scanning unit 24Y, the second optical scanning unit 24M, the third optical scanning unit 24C, and the fourth optical scanning unit 24K.

Around the carrier belt 21, a resist roller pair 27 and a belt charging charger 28 are provided, located on the upstream side than the photosensitive drum 22Y, and a belt separating charger 29, a discharging charger 30, and a cleaning apparatus 31 are provided in order, located on the downstream side than the photosensitive drum 22K. A fixing apparatus 32 is provided on the downstream side in the transport direction than the belt separating charger 29, and connected to the paper ejection roller pair 34 toward a paper ejection tray 33.

For example, in a full color mode (plural color mode), electrostatic latent images are respectively formed by optical scanning of the light beams by the first optical scanning unit 24Y, the second optical scanning unit 24M, the third optical scanning unit 24C, and the fourth optical scanning unit 24K, being respective optical scanning units, based on the image signal for each color, that is, yellow, magenta, cyan, and black, with respect to the respective photosensitive drums 22Y, 22M, 22C, and 22K.

These electrostatic latent images are developed by the corresponding color toners to obtain toner images, sequentially transferred onto the sheet-like medium electrostatically attracted and carried on the carrier belt 21, superposed on each other, and after being fixed as a full color image, the sheet-like medium is ejected.

The optical scanner 400 including the first optical scanning unit 24Y, the second optical scanning unit 24M, the third optical scanning unit 24C, and the fourth optical scanning unit 24K, being the optical scanning units of the image formation apparatus, is equipped and used, thereby realizing a compact image formation apparatus that can ensure high quality image reproducibility, without having out of color registration.

In the respective examples, one surface to be scanned is made to correspond to one image carrier (photosensitive drum), and one light beam going toward one surface to be scanned is explained excluding Examples 3 and 4, but the present invention is not limited thereto, and the light beam going toward one surface to be scanned may be a plurality of beams.

When the position is largely different, even on the surface to be scanned on the same image carrier (photosensitive drum), it is included as an object on which the light beams from a plurality of different light source units are imaged. That is, an example in which the surfaces to be scanned, on which the respective light beams from a plurality of light source units are imaged, are on the same photosensitive member is also included within the scope of the present invention.

According to the present invention, when beams from the respective light sources are aligned in one line in the sub scanning direction and deflected, the interval between the light beams can be narrowed, regardless of the size of the light source units. Further, since the installation position of the light source units can be aligned, even if there is a positional change in the respective light sources due to a thermal deformation of the housing, the shifted directions of the emitted beams are aligned. Therefore, by applying this optical scanner to the image formation apparatus, a high quality color image can be formed without out of color registration or color change, while maintaining the relative arrangement between the light beams.

According to the present invention, the installation position can be accurately adjusted between the respective light sources. Therefore, a deviation due to the assembly or replacement of the light source units does not occur, and even if there is an environmental change, the relative positions of the respective light sources are maintained at all times. As a result, by applying this optical scanner to the image formation apparatus, a high quality color image can be formed without out of color registration or color change.

According to the present invention, the emission direction of the respective beams can be accurately aligned, and hence a deviation due to the assembly or replacement of the light source units does not occur.

According to the present invention, the respective beam intervals at the position of the deflection unit including the polygon mirror can be narrowed, and reliably separated after being deflected. As a result, the thickness of the deflection unit can be made the smallest, to suppress generation of heat, so that an environmental temperature change does not occur.

According to the present invention, the emission direction of the respective beams can be accurately aligned, and by providing regulation units therefor, the relative positions of the respective light sources can be maintained at all times, even if there is an environmental change.

According to the present invention, the emission direction of the respective beams can be more accurately aligned, thereby suppressing a deviation due to the assembly or replacement of the light source units.

According to the present invention, at the time of assembly of the light source units, the position of the beam spot can be adjusted by a simple operation of inclining the light source units on a plane orthogonal to the emission axis. Therefore, the scan line pitch that cannot be aligned between light beams by adjusting the write start timing, for example, in a multi-beam scanner that scans a plurality of beams at the same time, can be accurately aligned, and by applying this optical scanner to the image formation apparatus, a high quality image can be formed without density non-uniformity.

According to the present invention, since the respective beam spots can be separated on the surface to be scanned, and can be recorded at the same time by a plurality of scan lines, an optical scanner that can be adapted to high-speed and high-density image recording can be provided without making the configuration complicated.

According to the present invention, at the time of assembly of the light source units, the scan line pitch can be accurately aligned between respective colors by a simple operation of inclining the light source units on a plane orthogonal to the emission axis. As a result, an optical scanner that can perform a high quality color image recording without out of color registration or color change can be provided.

According to the present invention, since the pre-deflection imaging unit of the respective light sources can be shifted in the main scanning direction, and the light source positions can be aligned and arranged on the plane orthogonal to the emission axis, the beam interval in the sub scanning direction can be narrowed, regardless of the size of the pre-deflection imaging unit or the diameter of the bundle of rays. As a result, the thickness of the deflection unit can be made the smallest, to suppress generation of heat, so that an environmental temperature change does not occur, and the influence of generation of heat can be made the same between the light sources. Therefore, by applying this to the image formation apparatus, a high quality image can be formed without out of color registration or color change.

According to the present invention, by providing a difference in converging force of the pre-deflection imaging unit corresponding to a difference in optical path length from the beam merging unit to the deflection unit, even if the interval between the light sources in the main scanning direction increases, the optical path lengths from the respective light sources to the imaging unit before deflection can be made the smallest, and the positions of the light sources can be aligned and arranged on the plane orthogonal to the emission axis. As a result, the housing can be downsized and unlikely to be affected by the thermal deformation, and the difference between the light sources can be decreased.

According to the present invention, even when the housing is affected by thermal deformation to cause a positional change of the pre-deflection imaging unit, the relative configurational deviation does not occur between the respective imaging units. As a result, the difference between the light sources can be reduced, and a high quality color image can be recorded without out of color registration or color change.

According to the present invention, the structural elements can be easily assembled onto a single support member, and the respective light sources can be directly mounted on a common substrate for the drive circuit. As a result, the number of parts can be decreased, the working man-hour, for example for wiring connection, can be reduced, to improve the production efficiency, and the optical scanner can be provided at a low cost.

According to the present invention, in the configuration in which beams from the respective light source units are turned so as to enter substantially into the same position in the main scanning direction of the deflection unit, since the distances from the light sources to the turning points are made different from each other on the optical axis, the arrangement of the light sources and the cylindrical lenses becomes easy, without causing mutual interference.

According to the present invention, since the beam merging unit includes a reflection area and a transmission area, the light sources of the adjacent beams in the sub scanning direction can be arranged at different positions in the main scanning direction, and hence a compact configuration can be obtained as a whole, without the arrangement of the light source units causing mutual interference.

According to the present invention, cylindrical lenses attached to a common support member are arranged on the optical path after beam coupling, so as to be stably held, and adjustably in the direction of optical axis as required. Further, if the support member is formed of a transparent resin, the passing window can be formed of a negative lens, and hence a high quality optical scanner can be obtained.

According to the present invention, a compact optical scanner that can obtain stable image quality against an environmental change can be obtained. Further, according to the present invention, an optical scanner that can reduce deterioration in the optical performance at the time of assembling the beam merging unit can be provided.

According to the present invention, a compact optical scanner that can obtain stable image quality against an environmental change can be obtained. Further, according to the present invention, the size of the deflection unit and the optical scanner can be decreased.

According to the present invention, the precision of the imaging unit can be improved, and the manufacturing time can be shortened. According to the present invention, a compact image formation apparatus that can form a high quality image can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:
   a plurality of light source units spaced from each other along a first direction, each having an optical axis along which a light beam from the light source unit is emitted;
   a deflection unit that deflects the light beams together in a single plane at an angle with respect to the light beams and scans the light beams along a second direction perpendicular to the first direction;
   a plurality of imaging units that form an image with each of the light beams on a corresponding surface to be scanned;
   a housing unit that holds the light source units, the deflection units, and the imaging units, the housing unit including a beam merging unit located on the axes between the light source units and the deflection unit, configured to direct the light beams to the deflection unit such that distances between the light beams along the second direction are decreased in a sequence in which the light beams are arranged, wherein
   the beam merging unit includes a plurality of separate mirrors each located on one of the optical axes between the light source units and the deflection unit, each of the plurality of separate mirrors is disposed on a separate bracket that is staggered with respect to other brackets, and
   a beam turning unit that turns the light beams scanned by the deflection unit in a sequence corresponding to the sequence,
   wherein the plurality of imaging units include a plurality of toroidal lenses having an optical face tangle error correction function of the deflection unit, and
   each of the plural toroidal lenses images respective light beams deflected by the deflection unit in a spot on the corresponding surface to be scanned.

2. The optical scanner according to claim 1, wherein each of the light source unit comprises an abutting surface along a direction perpendicular to the optical axis of the light source unit, and abutting against a common support member configured to hold the light source units together.

3. The optical scanner according to claim 2, wherein the abutting surfaces are held so as to be substantially on a same plane.

4. The optical scanner according to claim 1, wherein at least one of the light source units comprises a light emission source from which the light beam is emitted, and the light beam is emitted from the light emission source along a direction not parallel to the optical axis instead of along the optical axis.

5. The optical scanner according to claim 4, wherein at least one of the light source units comprises a plurality of light emission sources, and light beams are emitted as the light beam from the light emission sources so as to intersect with each other.

6. The optical scanner according to claim 5, wherein inclinations of planes with respect to a plane perpendicular to the optical axis, the planes on which the light emission sources are located, are adjustable.

7. The optical scanner according to claims 1, further comprising:
   a plurality of pre-deflection imaging units each located on one of the optical axes between the beam merging unit and the light source unit corresponding to the optical axis, and that converges the light beam from the light source unit in the first direction on a deflection plane of the deflection unit,
   wherein respective distances between light source units and the pre-deflection imaging units differ from each other relatively to a sequence in which the light source units are aligned in the first direction.

8. An optical scanner comprising:
   a plurality of light source units spaced, from each other along a first direction, each having an optical axis along which a light beam from the light source unit is emitted;
   a deflection unit that deflects the light beams together in a single plane at an angle with respect to the light beams and scans the light beams along a second direction perpendicular to the first direction;

a plurality of imaging units that form an image with each of the light beams on a corresponding surface to be scanned;

a housing unit that holds the light source units, the deflection units, and the imaging units, the housing unit including a beam merging unit located on the axes between the light source units and the deflection unit, configured to direct the light beams to the deflection unit such that distances between the light beams along the second direction are decreased in a sequence in which the light beams are arranged, a beam turning unit that turns the light beams scanned by the deflection unit in a sequence corresponding to the sequence, and a plurality of pre-deflection imaging units each located on one of the optical axes between the beam merging unit and the light source unit corresponding to the optical axis, and that converges the light beam from the light source unit in the first direction on a deflection plane of the deflection unit, wherein convergences of the pre-deflection imaging units differ from each other relatively to a sequence in which the light source units are aligned in the first direction.

9. The optical scanner according to claim 1, wherein the beam merging unit converges the light beam from the light source unit corresponding to the one of the optical axes in the first direction on a deflection plane of the deflection unit, arranged on a plane parallel to the first direction.

10. The optical scanner according to claim 7, wherein each of the light source units comprises at least a light emission source, and the light emission sources are disposed substantially on a same plane.

11. The optical scanner according to claim 8, wherein each of the light source units comprises at least a light emission source, and the light emission sources are disposed substantially on a same plane.

12. The optical scanner according to claim 9, wherein each of the light source units comprises at least a light emission source, and the light emission sources are disposed substantially on a same plane.

13. An optical scanner comprising:
a plurality of light source units spaced from each other along a first direction and configured to emit light beams;
a deflection unit that deflects the light beams together in a single plane at an angle with respect to the light beams and scans the light beams along a second direction perpendicular to the first direction;
a plurality of imaging units that form an image with each of the light beams on a corresponding surface to be scanned, and include a lens shared by the light beams and having no defractive power in the first direction; and
a beam merging unit configured to turn at least one of the light beams at a different position, wherein a distance from a turning point on the beam merging unit to a deflection point on the deflection unit decreases for each consecutive light beam along the first direction,
wherein the beam merging unit includes a plurality of separate mirrors each located on one of the optical axes between the light source units and the deflection unit, each of the plurality of separate mirrors is disposed on a separate bracket that is staggered with respect to other brackets,
wherein the plurality of imaging units include a plurality of toroidal lenses having an optical face tangle error correction function of the deflection unit, and
each of the plural toroidal lenses images the respective light beams deflected by the deflection unit in a spot on the corresponding surface to be scanned.

14. The optical scanner according to claim 13, wherein the beam merging unit is positioned such that a sum of an incident angle and a reflection angle to and from a turning mirror of the beam merging unit is acute.

15. The optical scanner according to claim 13, wherein at least two of the light source units are positioned opposite to each other relative to an optical axis of the lens in a cross section in the second direction.

16. The optical scanner according to claim 13, wherein distances between centers of the light beams are equal.

17. The optical scanner according to one of claim 13, wherein a distance in the first direction between centers of a pair of central light beams of the light beams is greater than distances between centers of other pairs of adjacent light beams of the light beams.

18. An image formation apparatus comprising:
an optical write unit that forms latent images on image carriers, a development unit that develops the latent images as toner images; and
a transfer unit that transfers the toner images onto a sheet of paper,
wherein the optical write unit includes an optical scanner having:
a plurality of light source units spaced from each other along a first direction and configured to emit light beams;
a deflection unit that deflects the light beams together and scans the light beams along a second direction perpendicular to the first direction;
a plurality of imaging units that form an image with each of the light beams on a corresponding surface to be scanned, and include a lens shared by the light beams and having no refractive power in the first direction; and
a beam merging unit configured to turn at least one of the light beams at a different position, wherein a distance from a turning point on the beam merging unit to a deflection point on the deflection unit decreases for each consecutive light beam along the first direction,
wherein the beam merging unit includes a plurality of separate mirrors each located on one of the optical axes between the light source units and the deflection unit, each of the plurality of separate mirrors is disposed on a separate bracket that is staggered with respect to other brackets,
wherein the plurality of imaging units include a plurality of toroidal lenses having an optical face tangle error correction function of the deflection unit, and
each of the plural toroidal lenses images the respective light beams deflected by the deflection unit in a spot on the corresponding surface to be scanned.

19. The image formation apparatus according to claim 18, wherein the latent images formed by the optical write unit is electrostatic, the image carriers are photosensitive bodies having the surfaces to be scanned, the optical write unit scans the light beams emitted from the optical scanner and including color image information respectively onto the surfaces to be scanned to form the latent images, the developing unit converts the latent images to visual images as the toner images using color toners corresponding to the color image information of the light beams respectively, and the transfer unit transfers the toner images onto the sheet of paper to obtain a color image.

20. The optical scanner according to claim 1, further comprising:
an optical face tangle error correction optical unit provided on the optical axis of each respective light beam deflected by the deflection unit.

21. The optical scanner according to claim 20, wherein each optical face tangle error correction optical unit includes a cylindrical lens and one of the plurality of toroidal lens.

22. The optical scanner of claim 1, wherein the plurality of separate mirrors are configured to each branch off a light beam and to have the toroidal lenses with the optical face tangle error correction function on a light path for respective branched-off light beams.

23. The optical scanner of claim 13, wherein the plurality of separate mirrors are configured to each branch off a light beam and to have the toroidal lenses with the optical face tangle error correction function on a light path for respective branched-off light beams.

24. The image formation apparatus of claim 18, wherein the plurality of separate mirrors are configured to each branch off a light beam and to have the toroidal lenses with the optical face tangle error correction function on a light path for respective branched-off light beams.

* * * * *